(12) United States Patent
Farag et al.

(10) Patent No.: US 12,089,195 B2
(45) Date of Patent: Sep. 10, 2024

(54) METHOD AND APPARATUS FOR UPLINK REFERENCE SIGNAL-BASED BEAM MANAGEMENT

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 17/301,155

(22) Filed: Mar. 26, 2021

(65) Prior Publication Data

US 2021/0314931 A1    Oct. 7, 2021

Related U.S. Application Data

(60) Provisional application No. 63/142,808, filed on Jan. 28, 2021, provisional application No. 63/010,204, (Continued)

(51) Int. Cl.
*H04W 72/044*  (2023.01)
*H04L 5/00*     (2006.01)
*H04W 24/10*    (2009.01)

(52) U.S. Cl.
CPC ......... *H04W 72/046* (2013.01); *H04L 5/0048* (2013.01); *H04W 24/10* (2013.01)

(58) Field of Classification Search
CPC .................. H04W 24/08; H04W 24/10; H04W 52/365; H04W 72/23
See application file for complete search history.

(56) References Cited

U.S. PATENT DOCUMENTS

| | | | |
|---|---|---|---|
| 2019/0075599 A1* | 3/2019 | Xia | ...................... H04B 7/0695 |
| 2019/0174466 A1 | 6/2019 | Zhang et al. | |
| 2019/0190582 A1 | 6/2019 | Guo et al. | |
| 2020/0112355 A1 | 4/2020 | Park et al. | |

(Continued)

FOREIGN PATENT DOCUMENTS

| | | |
|---|---|---|
| WO | 2018/143721 A1 | 8/2018 |
| WO | 2019140639 A1 | 7/2019 |
| WO | 2019/193581 A2 | 10/2019 |

OTHER PUBLICATIONS

"3rd Generation Partnership Project; Technical Specification Group Radio Access Network; NR; Physical channels and modulation (Release 16)", 3GPP TS 38.211 v16.4.0, Dec. 2020, 133 pgs.

(Continued)

*Primary Examiner* — Michael Thier
*Assistant Examiner* — Prince A Mensah

(57) ABSTRACT

Methods and apparatuses for UL reference signal-based beam management. A method of operating a UE includes receiving configuration information for UL reference signals for beam management, source reference signals for spatial relation, and a beam report; receiving the source reference signals; and measuring a signal quality metric for the source reference signals for spatial relation. The method further includes transmitting a beam report based on measured signal quality metric and receiving, in response to the beam report, updated configuration information for the UL reference signals for beam management. The method further includes determining a time for update of the UL reference signals for beam management and transmitting the UL reference signals for beam management based on the updated configuration information at the determined time.

17 Claims, 28 Drawing Sheets

Related U.S. Application Data filed on Apr. 15, 2020, provisional application No. 63/005,786, filed on Apr. 6, 2020.

(56) References Cited

U.S. PATENT DOCUMENTS

| | | | |
|---|---|---|---|
| 2021/0143922 A1* | 5/2021 | Jin | H04W 24/08 |
| 2021/0266942 A1* | 8/2021 | Zhou | H04W 72/23 |
| 2022/0377680 A1* | 11/2022 | Yuan | H04W 52/365 |

OTHER PUBLICATIONS

"3rd Generation Partnership Project; Technical Specification Group Radio Access Network; NR; Multiplexing and channel coding (Release 16)", 3GPP TS 38.212 v16.4.0, Dec. 2020, 152 pgs.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 V16.0.0, Dec. 2019, 147 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

LG Electronics, "Outcome of email thread [100e-NR-eMIMO-MB-03]", 3GPP TSG RAN WG1 #100, Feb. 24-Mar. 6, 2020, R1-2001261, 9 pages.

Huawei et al., "On MPE enhancement for Rel-16", 3GPP TSG-RAN WG4 Meeting #92bis, R4-1912404, 3 pages.

Notification of Transmittal of the International Search Report and the Written Opinion of the International Searching Authority, or the Declaration dated Jul. 21, 2021 in connection with International Patent Application No. PCT/KR2021/004263, 10 pages.

Partial European Search Report issued Jul. 25, 2023 regarding Application No. 21784941.3, 16 pages.

Extended European Search Report issued Oct. 25, 2023 regarding Application No. 21784941.3, 13 pages.

* cited by examiner

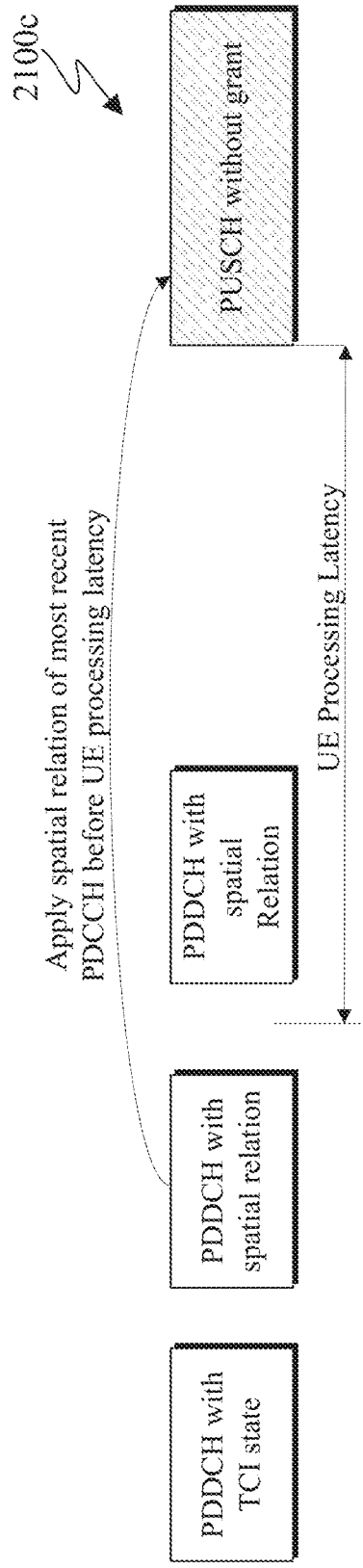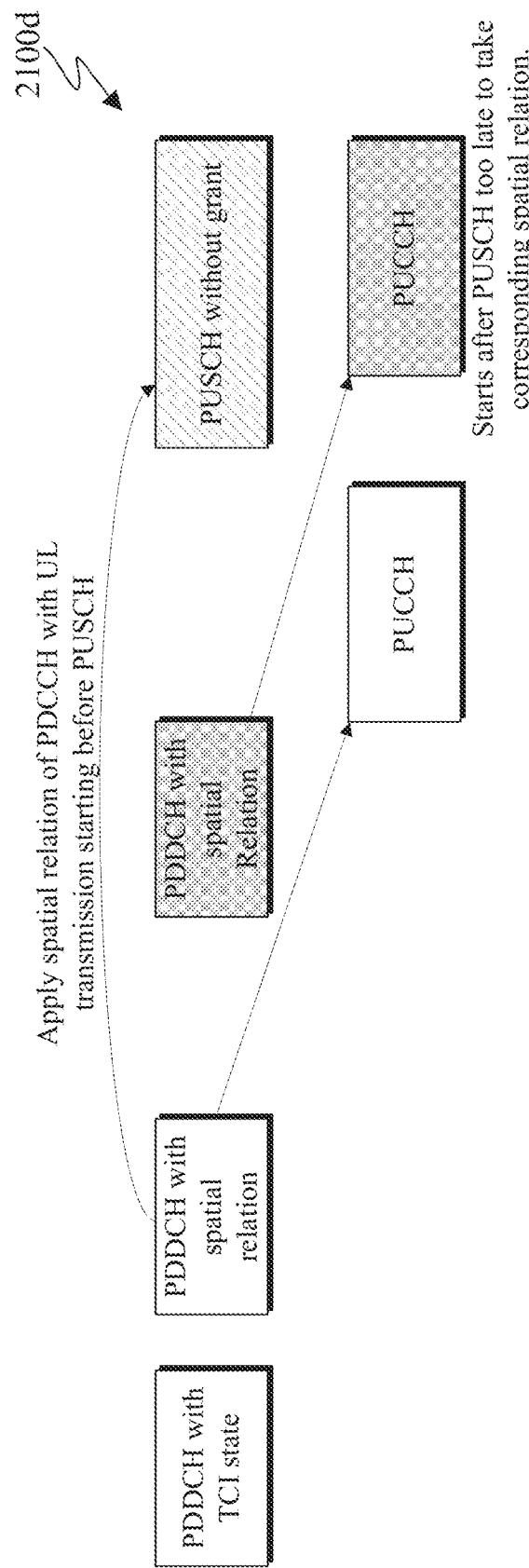
FIG. 21C
FIG. 21D

METHOD AND APPARATUS FOR UPLINK REFERENCE SIGNAL-BASED BEAM MANAGEMENT

CROSS-REFERENCE TO RELATED APPLICATION AND CLAIM OF PRIORITY

This application claims priority under 35 U.S.C. § 119(e) to U.S. Provisional Patent Application No. 63/005,786 filed on Apr. 6, 2020, U.S. Provisional Patent Application No. 63/010,204 filed on Apr. 15, 2020, and U.S. Provisional Patent Application No. 63/142,808 filed on Jan. 28, 2021. The above-identified provisional patent applications are hereby incorporated by reference in its entirety.

TECHNICAL FIELD

The present disclosure relates generally to wireless communication systems and, more specifically, the present disclosure relates to uplink (UL) reference signal-based beam management.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to uplink (UL) reference signal-based beam management.

In one embodiment, a user equipment (UE) is provided. The UE includes a transceiver configured to receive configuration information for uplink (UL) reference signals for beam management, source reference signals for spatial relation, and a beam report, and to receive the source reference signals. The UE further includes a processor operably connected to the transceiver. The processor is configured to measure a signal quality metric for the source reference signals for spatial relation. The transceiver is further configured to transmit the beam report based on the measured signal quality metric, and receive, in response to the beam report, updated configuration information for the UL reference signals for beam management. The processor is further configured to determine a time for update of the UL reference signals for beam management. The transceiver is further configured to transmit the UL reference signals for beam management based on the updated configuration information at the determined time.

In another embodiment, a base station (BS) is provided. The BS includes a transceiver configured to transmit configuration information for UL reference signals for beam management, source reference signals for spatial relation, and a beam report; to transmit the source reference signals; and to receive the beam report. The BS further includes a processor operably connected to the transceiver. The processor is configured to determine, in response to the beam report, updated configuration information for the UL reference signals for beam management; and determine a time of update of the UL reference signals for beam management. The transceiver is further configured to transmit updated configuration information for the UL reference signals for beam management; and to receive the UL reference signals for beam management based on the updated configuration information at the determined time.

In yet another embodiment, a method of operating a UE is provided. The method includes receiving configuration information for UL reference signals for beam management, source reference signals for spatial relation, and a beam report; receiving the source reference signals; and measuring a signal quality metric for the source reference signals for spatial relation. The method further includes transmitting a beam report based on measured signal quality metric and receiving, in response to the beam report, updated configuration information for the UL reference signals for beam management. The method further includes determining a time for update of the UL reference signals for beam management and transmitting the UL reference signals for beam management based on the updated configuration information at the determined time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 13A, 13B, 13C, 13D, and 13E illustrate example beam measurement reports according to embodiments of the present disclosure;

FIGS. 21A, 21B, 21C, and 21D illustrate example embodiments of UEs determining special relationships according to embodiments of the present disclosure;

DETAILED DESCRIPTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation," 3GPP TS 38.212 v16.4.0, "NR; Multiplexing and Channel coding," 3GPP TS 38.213 v16.4.0, "NR; Physical Layer Procedures for Control," 3GPP TS 38.214 v16.0.0, "NR; Physical Layer Procedures for Data," 3GPP TS 38.321 v16.3.0, "NR; Medium Access Control (MAC) protocol specification," and 3GPP TS 38.331 v16.3.1, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post LTE system."

The 5G communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (COMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
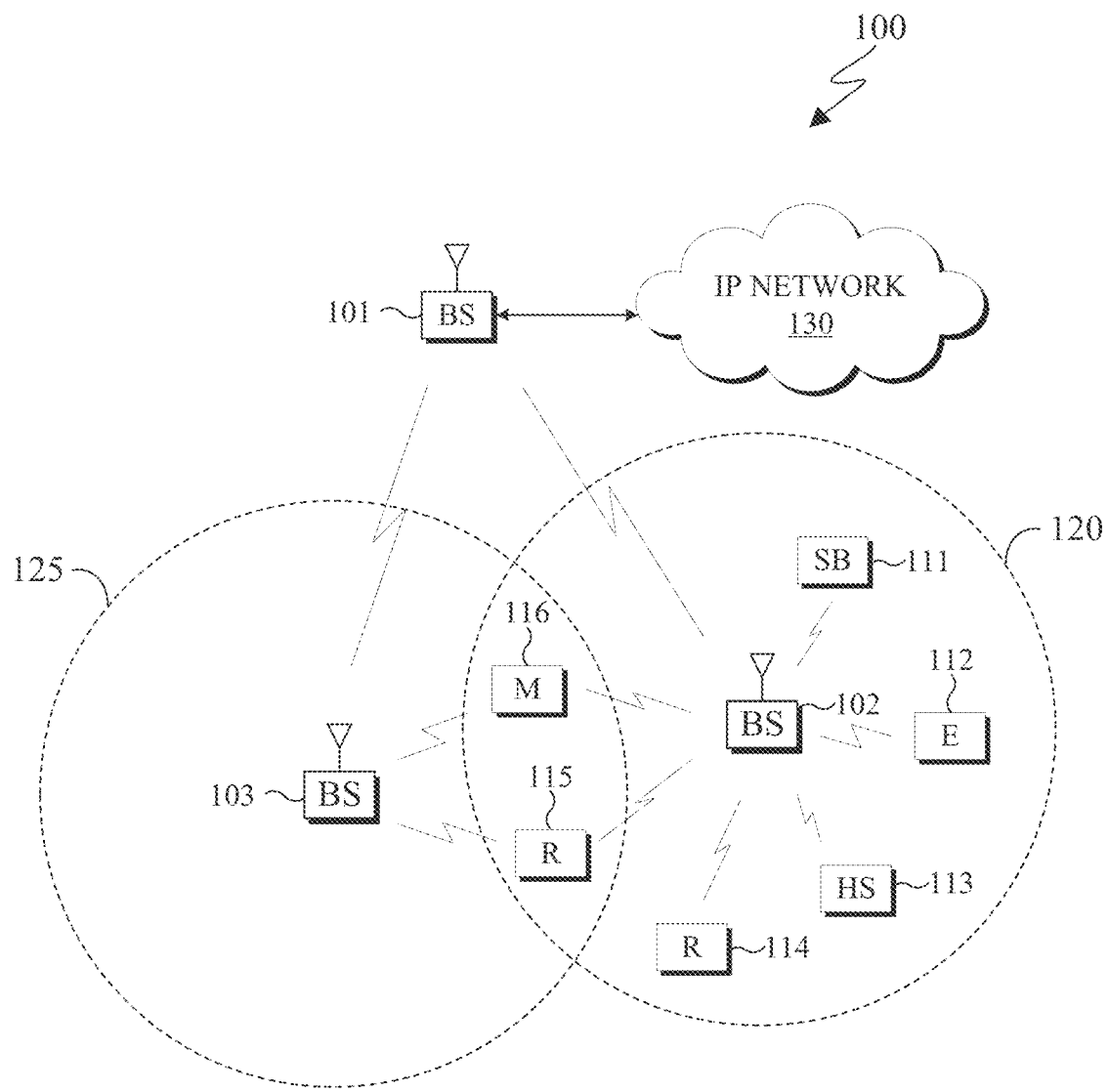
FIG. 1 illustrates an example wireless network according to embodiments of the present disclosure.
Figure 2:
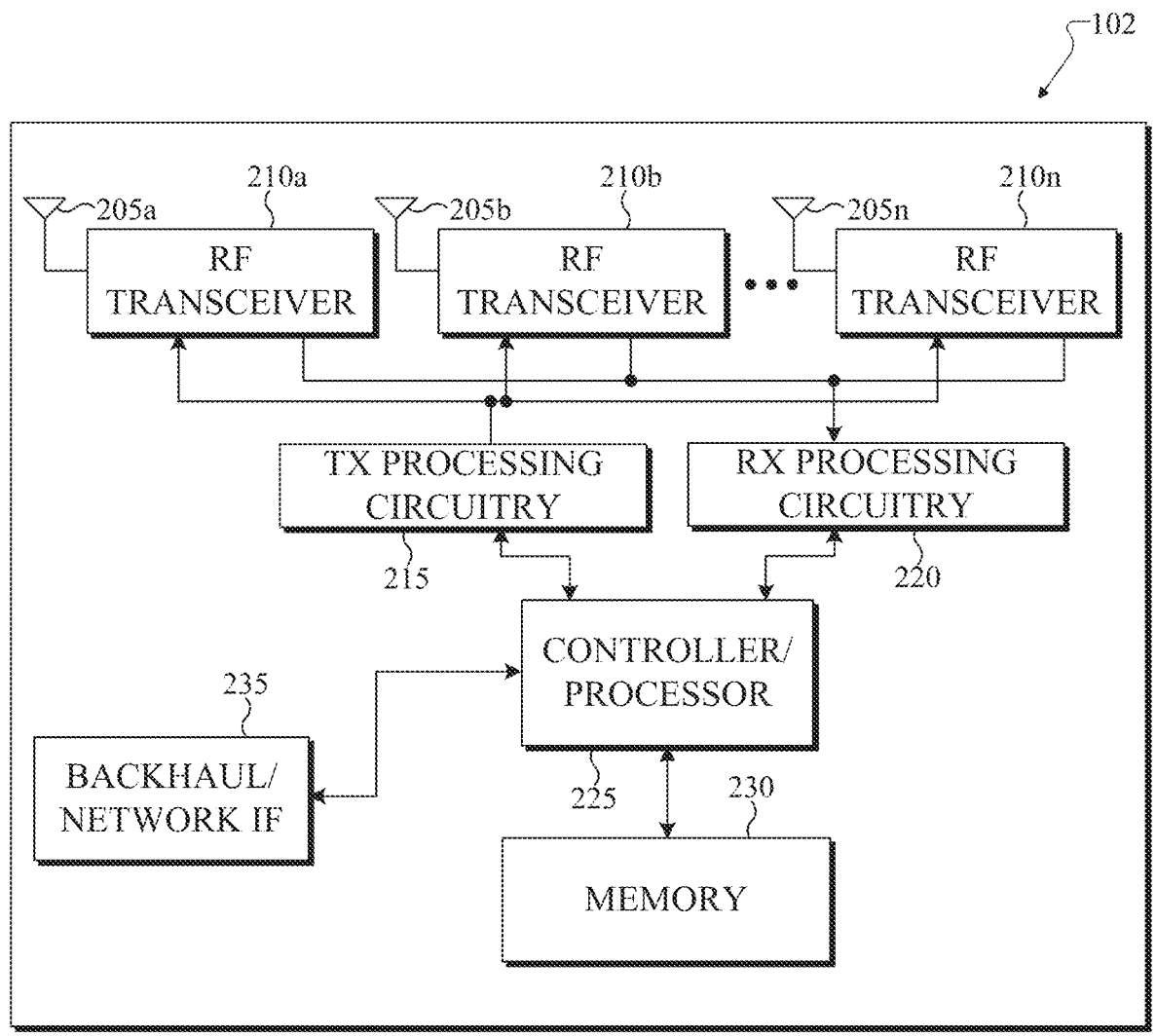
FIG. 2 illustrates an example gNB according to embodiments of the present disclosure.
Figure 3:
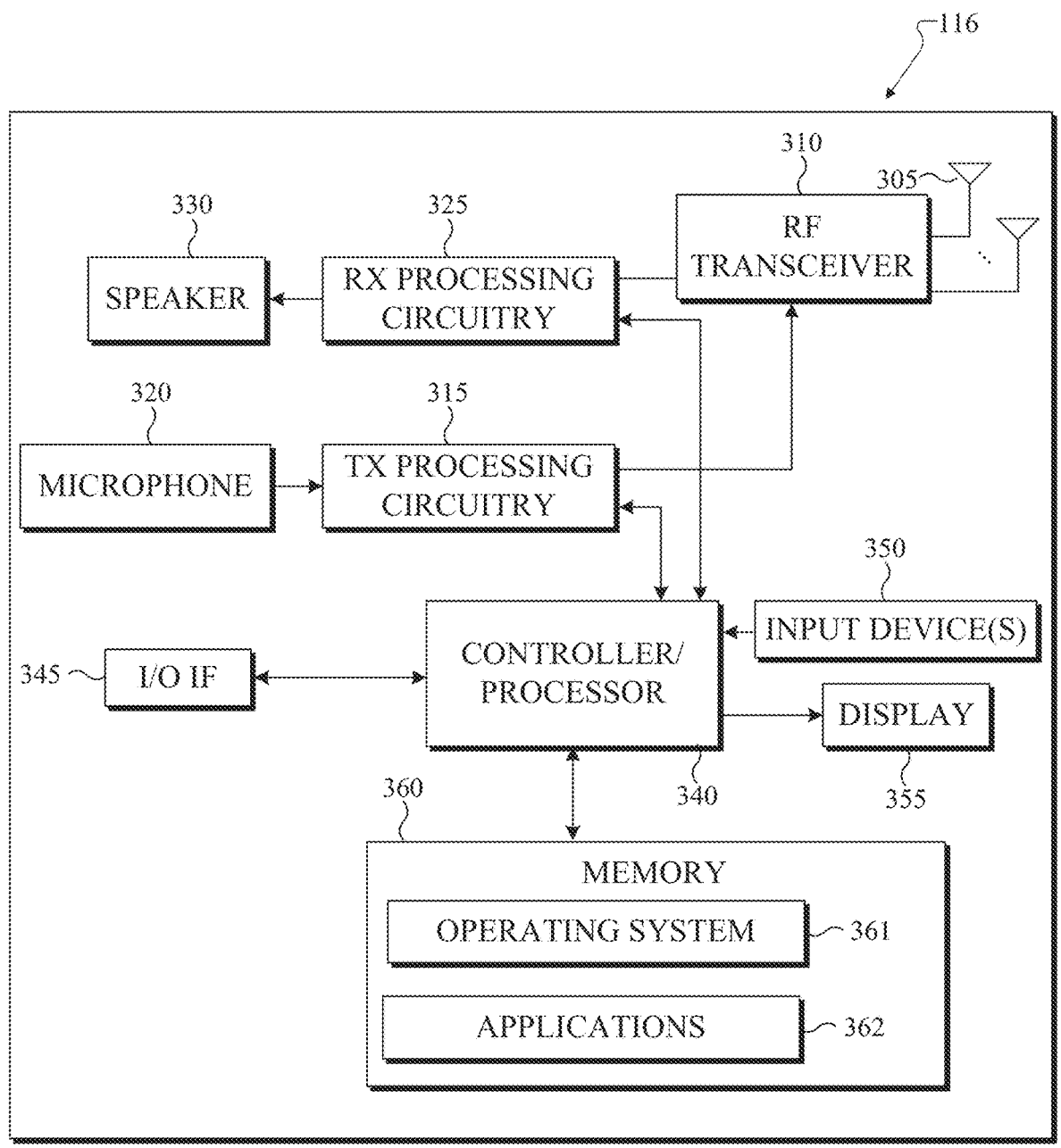
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipment's (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, LTE, LTE-A, high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine). For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for UL reference signal-based beam management. In certain embodiments, and one or more of the gNBs 101-103 includes circuitry, programing, or a combination thereof for UL reference signal-based beam management.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support a blind interference sensing (BIS) process, such as performed by a BIS algorithm, and decodes the received signal subtracted by the interfering signals. Any of a wide variety of other functions could be supported in the gNB 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web RTC. The controller/processor 225 can move data into or out of memory 230 according to a process that is being executed.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted in the BW of a respective PDCCH or PDSCH and a UE can use the DMRS to demodulate data or control information.

Figure 4:
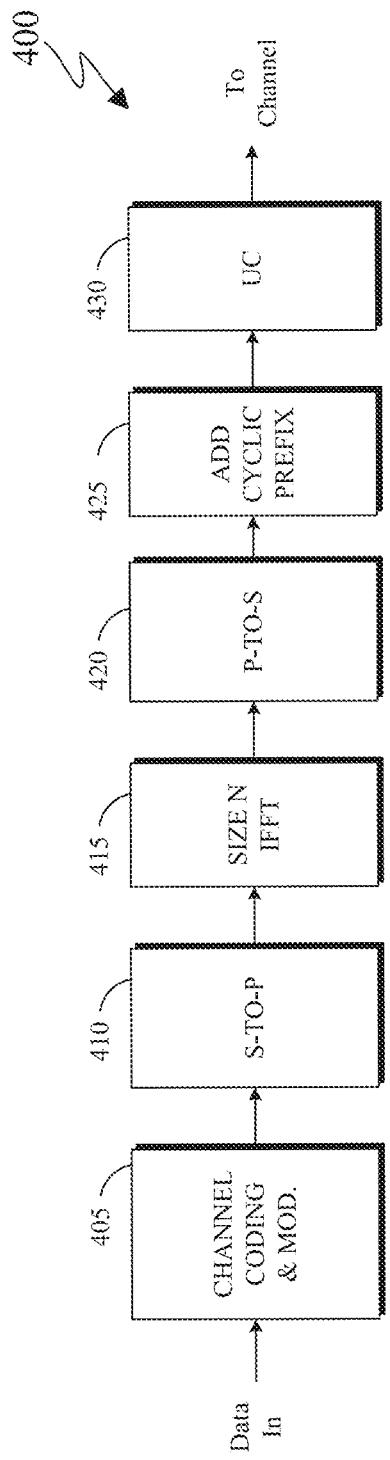
FIGS. 4 and 5 illustrate example wireless transmit and receive paths according to this disclosure.
Figure 5:
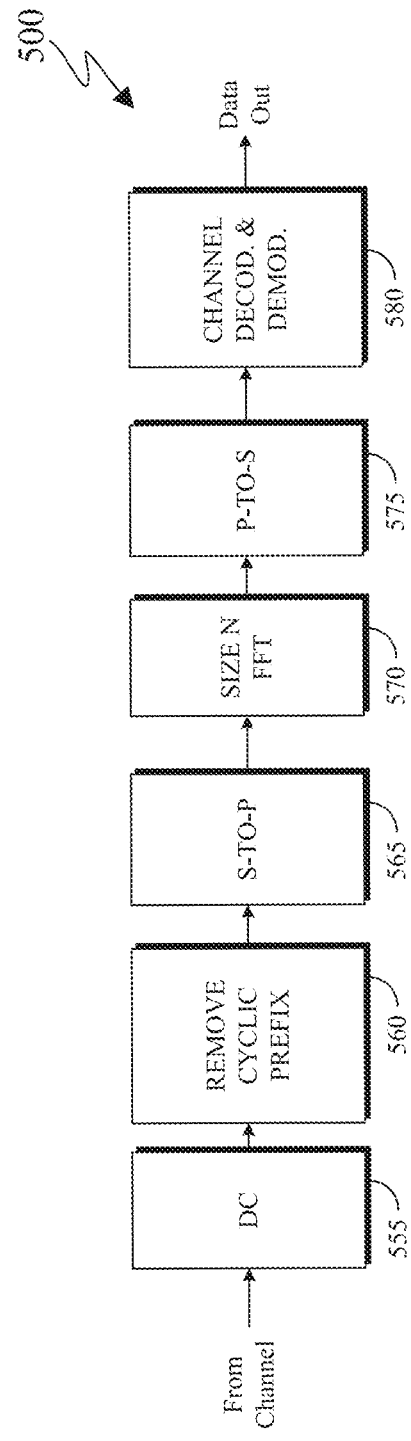

FIG. 4 and FIG. 5 illustrate example wireless transmit and receive paths according to this disclosure. In the following description, a transmit path 400, of FIG. 4, may be described as being implemented in a gNB (such as the gNB 102), while a receive path 500, of FIG. 5, may be described as being implemented in a UE (such as a UE 116). However, it may be understood that the receive path 500 can be implemented in a gNB and that the transmit path 400 can be implemented in a UE. In some embodiments, the receive path 500 is configured to support UL reference signal-based beam management as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
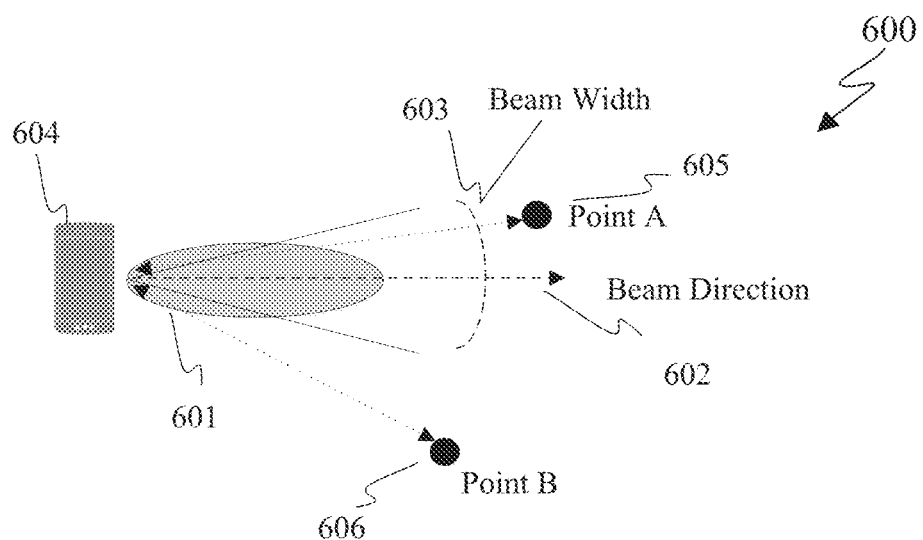
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only and other embodiments can be used without departing from the scope of the present disclosure.

The wireless system 600 of FIG. 6A includes a beam 601 and a device 604. The device 604 can be similar to the UE 116. The beam 601, form the device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B 606 cannot receive from and transmit to device 604 as Point B is outside a beam width and direction of a beam 601 from device 604. While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
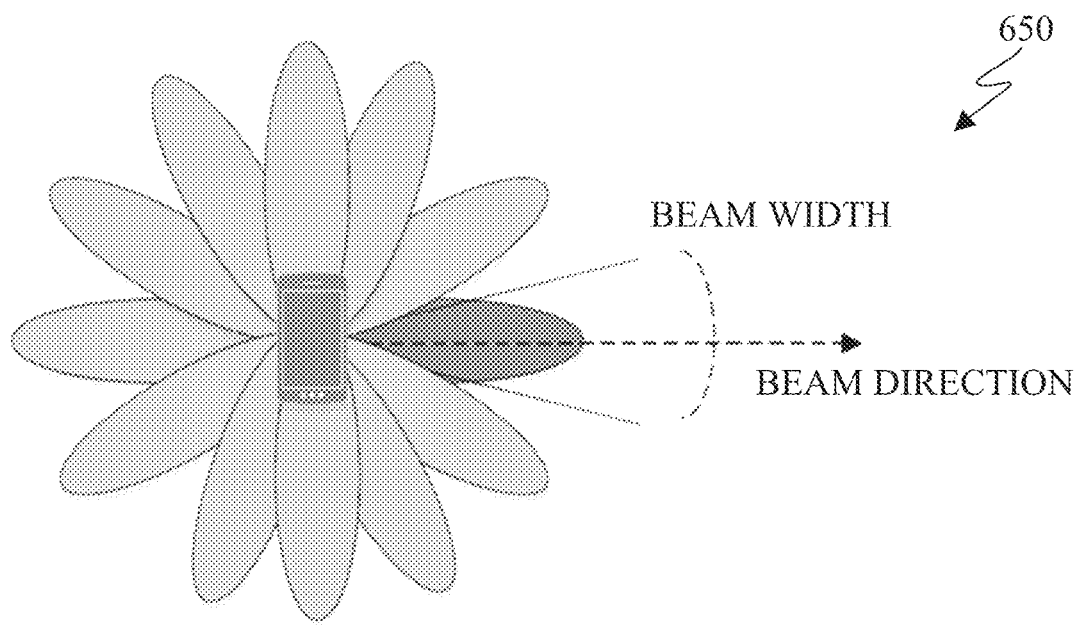
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only and other embodiments can be used without departing from the scope of the present disclosure. The multi-beam operation 650 of FIG. 6B includes a device, similar to the device 604 of FIG. 6A and multiple beams similar to the beam 601 of FIG. 6A.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB or a gNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7, described in greater detail below.

Although FIGS. 6A and 6B illustrate example beam operations, various changes may be made to FIGS. 6A and 6B. For example the width and direction of the beams may differ.

Figure 7:
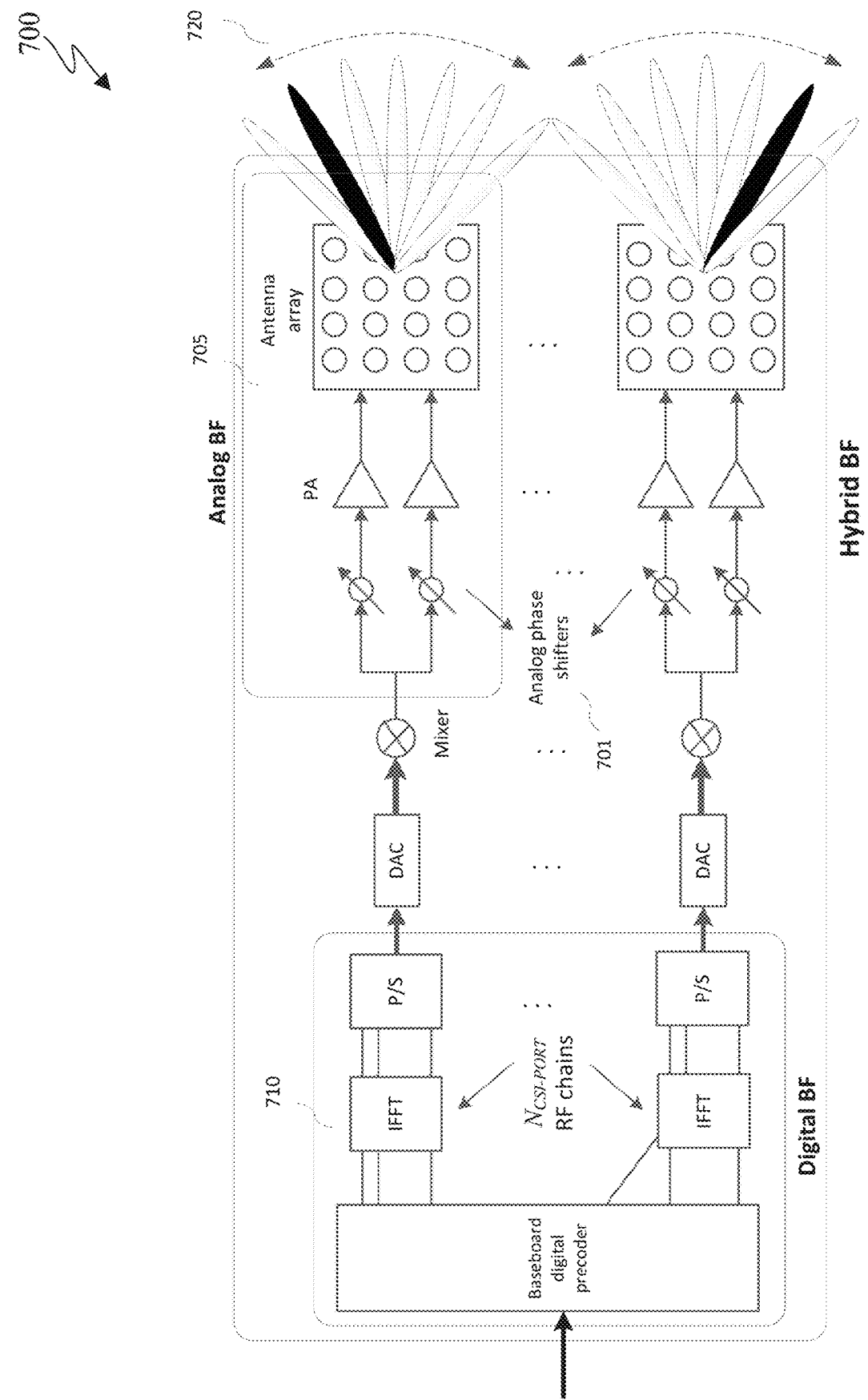
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only and other embodiments can be used without departing from the scope of the present disclosure. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports NCSI-PORT. A digital beamforming unit 710 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The described system is also applicable to higher frequency bands such as >52.6 GHz. In this case, the system employs analog beams. Due to the 02 absorption loss around 60 GHz frequency (~10 dB additional loss @100 m distance), larger number and narrower analog beams (hence larger number of radiators in the array) may be needed to compensate for the additional path loss.

In Rel-15 NR, multi-beam operation is designed primarily for a single TRP and a single antenna panel. Therefore, the specification supports beam indication for one TX beam wherein a TX beam is associated with a reference RS.

A DL beam indication and measurement, the reference RS can be a NZP (non-zero power) CSI-RS and/or a SS/PBCH block (synchronization signal/primary broadcast channel block) or SSB for brevity, that includes a primary synchronization signal, a secondary synchronization signal, and a PBCH.

A DL beam indication is done via the transmission configuration indicator (TCI) field in a DCI format where the indication includes an index to one (and only one) assigned reference RS. A set of hypotheses, or so-called TCI states, is configured via higher-layer (e.g., RRC) signaling and, when applicable, a subset of those TCI states is selected/activated via MAC control element (CE) for the TCI field code points. For UL beam indication and measurement, the reference RS can be NZP CSI-RS, SSB, and/or SRS.

An UL beam indication is done via the SRS resource indicator (SRI) field in a DCI format where the indication is linked to one (and only one) reference RS. The link is configured via higher-layer signaling using a SpatialRelationInfo higher layer (e.g., RRC) parameter. Essentially, only one TX beam is indicated to the UE.

Furthermore, a purpose-designed DL channel for beam indication can be used by a NW/gNB to indicate to a UE a TCI state for receptions and/or a TCI-state and/or joint TCI-state for receptions and transmissions that couples DL and UL beam indications, and/or SRI for an upcoming DL channel(s) and/or UL channel(s) transmissions.

Furthermore, the beam of the beam indication channel can be designed to provide wider beam coverage than a beam coverage for data or control channels and can be additionally designed such that adjacent beams of the beam indication channel partially overlap to provide for more robust coverage in a dynamic multi-path environment.

Furthermore, for a dispersive and fast changing multi-path environment, the TCI-state of a beam indication channel can comprise of multiple beams. A gNB can transmit and a UE can receive the TCI indication channel on one or more of these beams. Furthermore, when the beam indication channel is intended to be received by a group of UEs, the TCI-state of the beam indication channel is comprised of the beams covering the group of UEs.

Furthermore, as described in this disclosure, a UE can initiate a beam report or request resources for a beam report. In response to a beam report, the network/gNB can update an SRS resource set for beam management, or DMRS resources configured for beam management. The update can include a spatial relation reference RS, or number of SRS/DMRS ports with a same spatial relation reference RS or number of SRS/DMRS resources for beam management.

Embodiments of the present disclosure describes additional design aspects related to uplink beam management. For example, a UE, such as the UE 116 of FIG. 1, can initiate a beam report and/or request resources for a beam report. To assist with uplink beam management, a UE can be configured with a sounding reference signal (SRS) resource set(s) and/or additional demodulation reference signal (DMRS) ports/resources for beam management. For an SRS resource set(s), the association between an SRS resource and a reference RS, for example established through a spatial relation, as well as the number of SRS resources in an SRS resource set and the number of SRS ports associated with an SRS resource can be dynamically updated as the channel conditions change, for example based on a beam report. For a DMRS resource for beam management, the DMRS resource can be associated with a PUSCH transmission or a PUCCH transmission, wherein DMRS ports are organized in DMRS port groups and DMRS port groups are organized into DMRS port super groups. The association between a DMRS port group and a reference RS, for example established through a spatial relation, as well as the number of DMRS port groups in a DMRS port super group and the number of DMRS ports associated with a DMRS port group can be dynamically updated as the channel conditions change, for example based on a beam report.

In the following, both frequency division duplexing (FDD) and time division duplexing (TDD) are considered as a duplex method for DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure considers several components that can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands (or frequency range 2 (FR2)) or for higher frequency bands (such as >52.6 GHz) where multi-beam operation is especially relevant, a transmission-reception process includes a receiver selecting a RX beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam.

In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence.

In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

Figure 8:
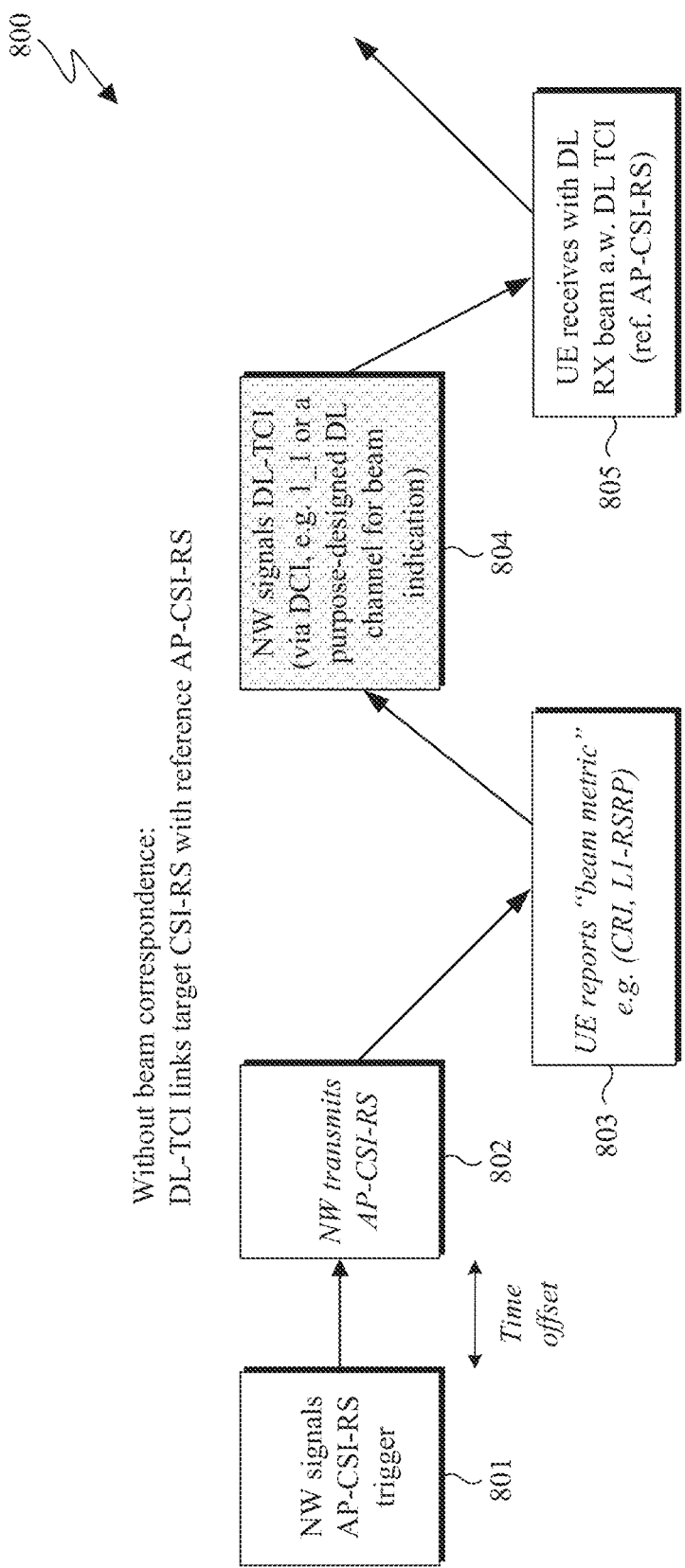
FIG. 8 illustrates an example DL multi-beam operation according to embodiments of the present disclosure.

FIG. 8 illustrates an example DL multi-beam operation 800 according to embodiments of the present disclosure. The embodiment of the UL multi-beam operation 800 shown in FIG. 8 is for illustration only and other embodiments can be used without departing from the scope of the present disclosure.

In one example illustrated in FIG. 8 (embodiment A-1), a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated layer 1-received signal received power (L1-RSRP)/L1-received signal received quality (L1-RSRQ)/L1-signla to interference ratio (L1-SINR)/channel quality indicator (CQI).

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Figure 9:
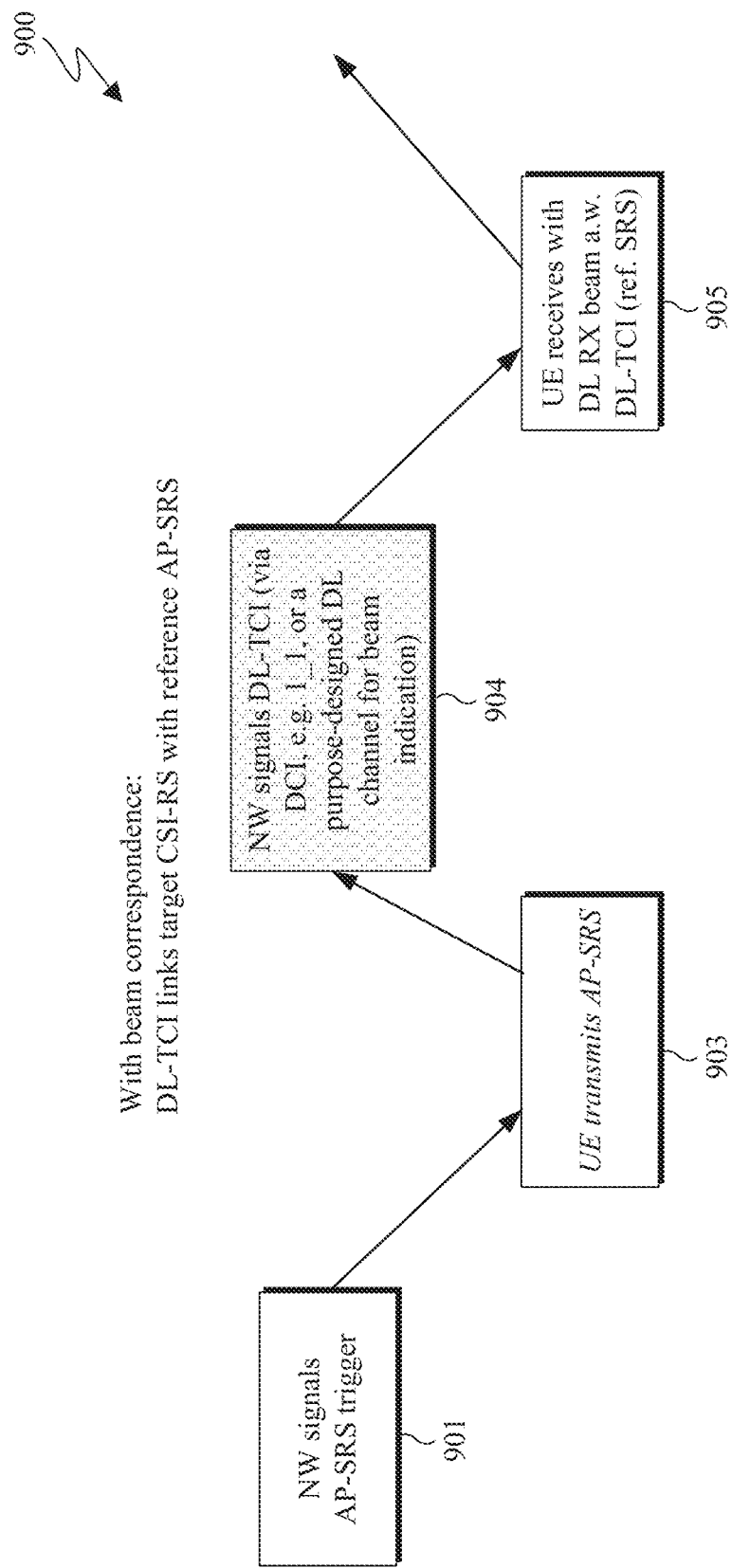
FIG. 9 illustrates another example DL multi-beam operation according to embodiments of the present disclosure.

FIG. 9 illustrates another example DL multi-beam operation 900 according to embodiments of the present disclosure. An embodiment of the UL multi-beam operation 900 shown in FIG. 9 is for illustration only and other embodiments can be used without departing from the scope of the present disclosure.

In another example illustrated in FIG. 9 (embodiment A-2), an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similar, for an UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RSs, either per reference RS or by "beam sweeping," and determine all the TX-RX beam pairs associated with all the reference RSs configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS, and a UE receives and measures the CSI-RS. This embodiment can be used, for instance, at least when there is reciprocity between the UL and DL beam-pair-link (BPL). This condition is termed "UL-DL beam correspondence." In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 10:
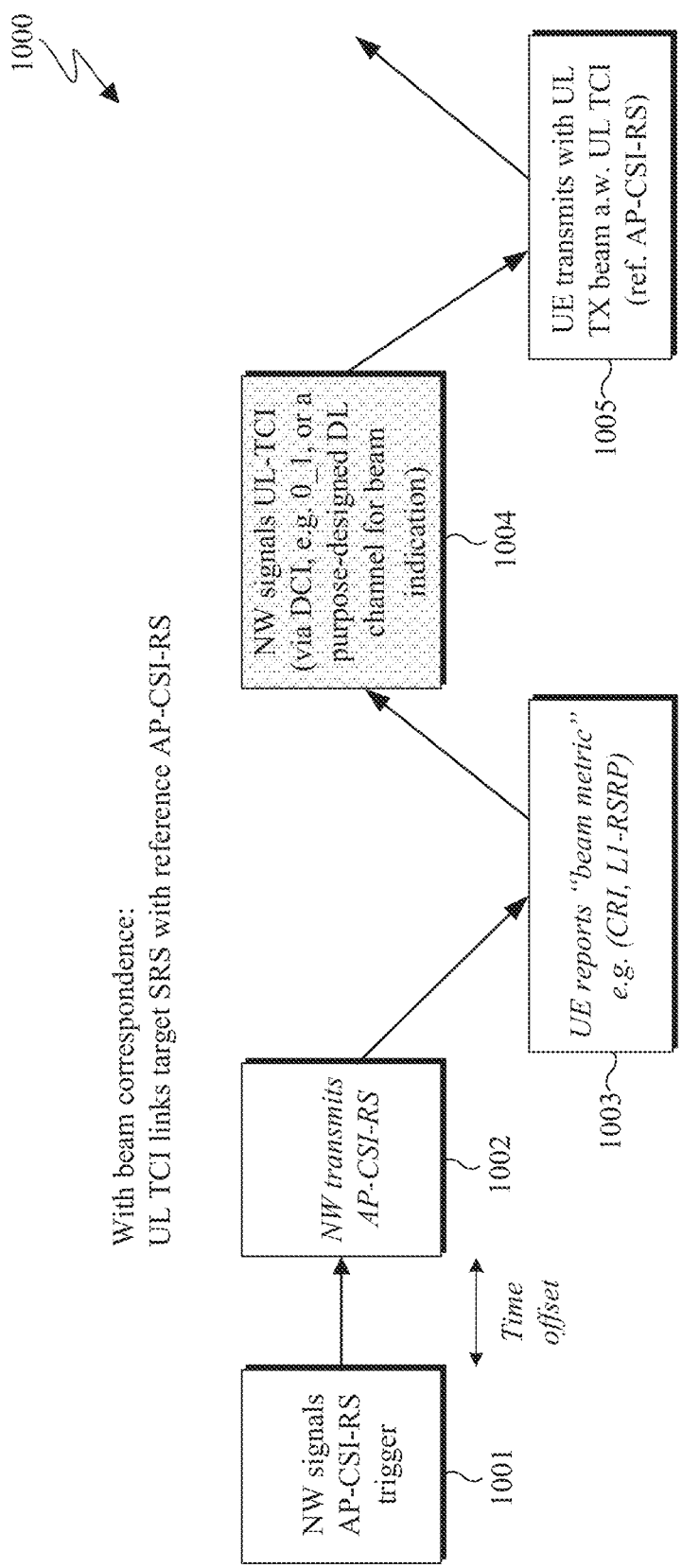
FIG. 10 illustrates an example UL multi-beam operation according to embodiments of the present disclosure.

FIG. 10 illustrates an example UL multi-beam operation 1000 according to embodiments of the present disclosure. An embodiment of the UL multi-beam operation 1000 shown in FIG. 10 is for illustration only and other embodiments can be used without departing from the scope of the present disclosure.

In one example illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB-RI together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 11:
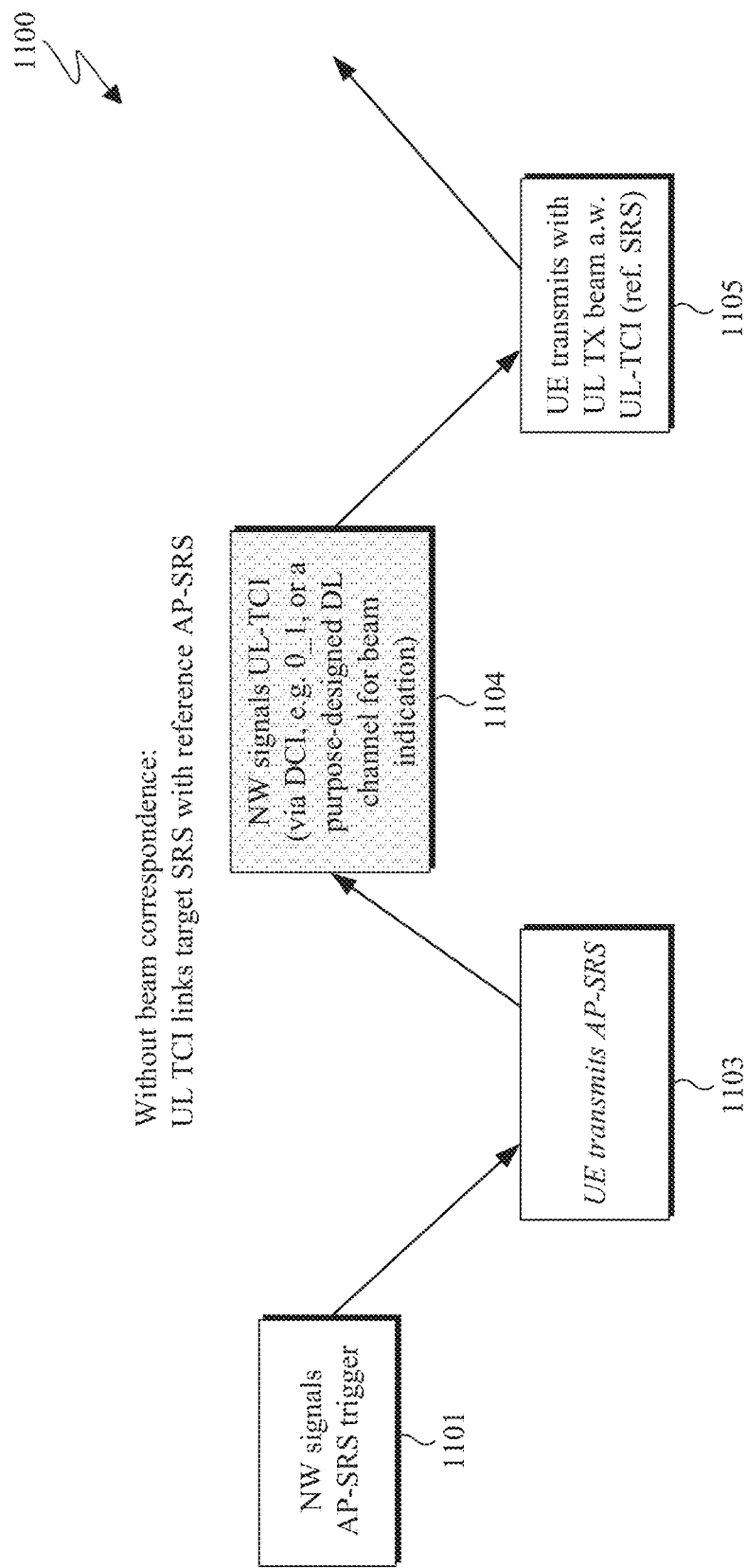
FIG. 11 illustrates another example UL multi-beam operation according to embodiments of the present disclosure.

FIG. 11 illustrates another example UL multi-beam operation 1100 according to embodiments of the present disclosure. An embodiment of the UL multi-beam operation 1100 shown in FIG. 11 is for illustration only and other embodiments can be used without departing from the scope of the present disclosure.

In another example illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

Figure 12:
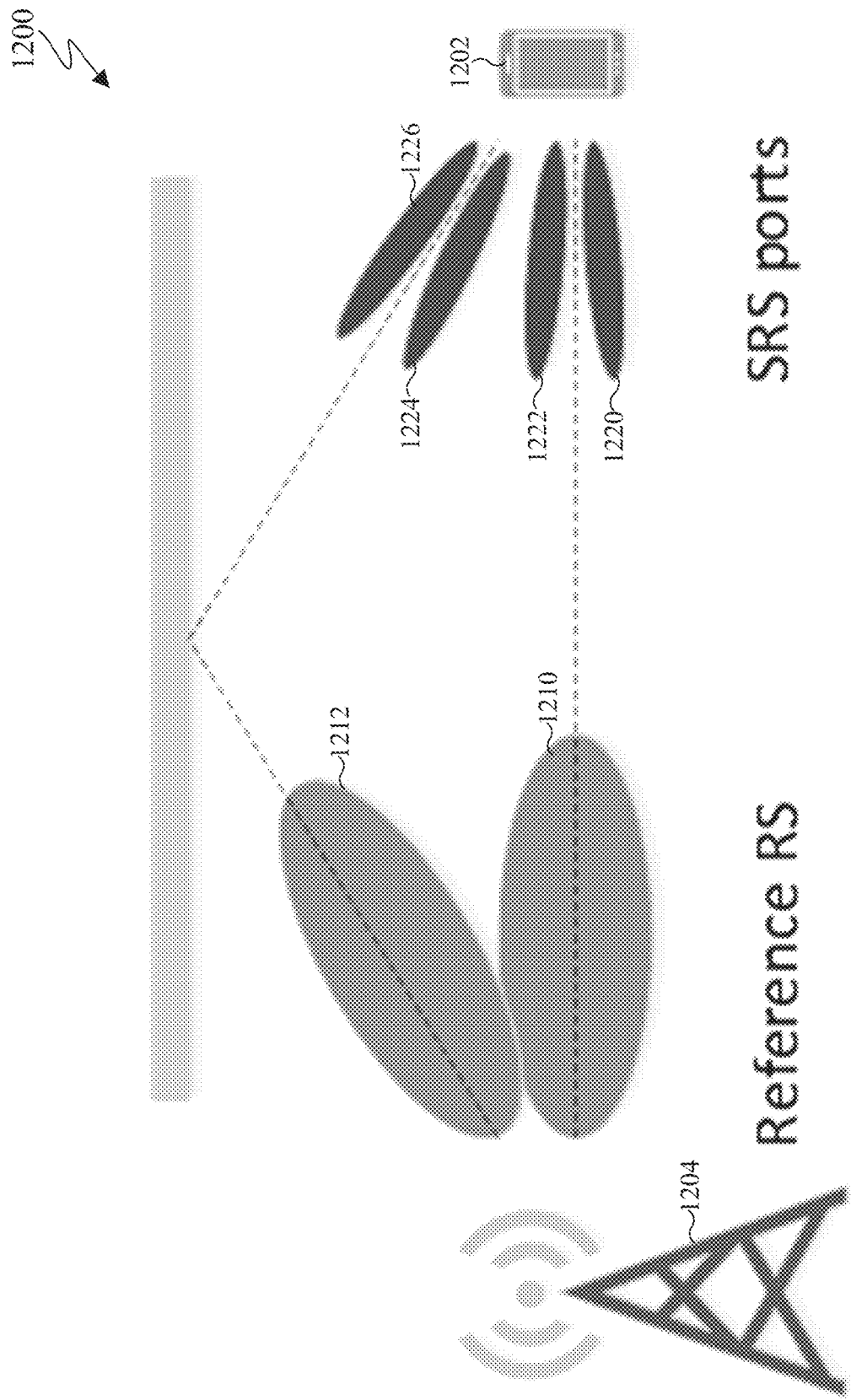
FIG. 12 illustrates an example multi-path environment according to embodiments of the present disclosure.

FIG. 12 illustrates an example multi-path environment 1200 according to embodiments of the present disclosure. The multi-path environment 1200 includes a UE 1202, which can be similar to any of the UEs of FIG. 1, such as the UE 116. The multi-path environment 1200 also includes a BS 1204 which can be similar to any of the BS of FIG. 1, such as the BS 102. The multi-path environment 1200 illustrated in FIG. 12 is for illustration only and other embodiments can be used without departing from the scope of the present disclosure.

In certain embodiments, a beam is determined by either (i) a TCI state, that establishes a quasi-colocation (QCL) relationship between a source reference signal (e.g. SSB and/or CSI-RS) and a target reference signal or (ii) a spatial relation information that establishes an association to a source reference signal, such as SSB or CSI-RS or SRS. In either case, the ID of the source reference signal identifies the beam.

For example, a gNB can transmit reference signals such as Synchronization Signal/PBCH Blocks (SSBs) and/or Channel State Information Reference Signals (CSI-RS). Due to the dispersive multi-path nature of the channel, a UE can receive one or more TX beams from the gNB. Multiple paths between the gNB and the UE might also arise in case of networks with multiple transmission/reception points (multi-TRP) and/or multiple transmission/reception antenna panels.

The multi-path environment 1200 as illustrated in FIG. 12 includes a first path 1210, with a first downlink reference RS, and a second path 1212, with a second downlink reference RS. A reference RS can be a SSB and/or CSI-RS. A UE can be configured to perform a beam measurement, and provide a corresponding report, by measuring the Layer 1 (L1)-RSRP and/or L1-SINR of the reference RS and reporting these measurements to the gNB. Based on the beam measurement report, the gNB can configure a SRS with a spatial relation that is mapped to a reference RS that can be a SSB, a CSI-RS, or a SRS.

In a variant of FIG. 12, the multi-path environment includes a first path from a first TRP and a second multi-path from a second TRP, wherein the first TRP and the second TRP belong to a same cell, i.e. have the same physical cell ID (PCI).

If the UE 1202 report indicates that 2 TX beams (associated with 2 resource indicators) in the beam measurement report that exceed a threshold, the network/gNB (such as the BS 1204) can configure multiple SRS ports with a spatial relation to one or more reference RS of the reported beams. For example, if the network configures two SRS ports with a spatial relation to the reference RS of beam 1210, and another two SRS ports with a spatial relation to the reference RS of beam 1212. The UE can transmit the SRS beam with a spatial relation to each reference RS on orthogonal beams for further channel sounding in the UL and/or further UL beam refinement as shown for UL beams 1220 and 1222 that have a spatial relation to the reference RS of DL beam 1210, and UL beams 1224 and 1226 that have a spatial relation to the reference RS of DL beam 1212.

Although FIG. 12 illustrates one example of multi-path environment 1200, various changes may be made to FIG. 12. For example, the multi-path environment 1200 could include any number and/or type of gNBs and any number of UEs in any suitable arrangement.

The following embodiments and examples describe Beam Measurement Reports from UE to gNB (Component 1):

A beam measurement report from a UE can include a L1-RSRP and/or a L1-SINR of DL reference signals associated with a beam, for example when the L1-RSRP and/or the L1-SINR exceed a threshold or when the UE is configured to report a certain number of L1-RSRP/L1-SINR measurements in a beam measurement report. The threshold can be specified in the system operation or be configured to the UE, for example by higher layers. A DL reference signal can be a SSB and/or a CSI-RS.

In certain embodiments, a beam measurement report is included in a physical uplink shared channel (PUSCH) that is scheduled by a downlink control information (DCI) format in a PDCCH transmission.

For example, a field in the DCI format scheduling the PUSCH triggers the beam measurement report. For another example, a UE autonomously provides the beam measurement report, for example if the measurements change by a configured and/or pre-determined threshold, such as 6 dB or 10 dB. For another example, a PUSCH transmission includes a beam indication report and nothing else. For yet another example, a beam indication report is multiplexed in a PUSCH transmission together with UL-SCH data, and/or UL MAC CEs, and/or other L1 control information.

In certain embodiments, a beam measurement report is included in a type 1 configured grant PUSCH (CG-PUSCH) transmission.

For example, a beam measurement report can be configured by higher layer signaling such as RRC signaling. For another example, a UE autonomously provides a beam measurement report, for instance if the measurements change by a configured and/or pre-determined threshold. For another example, a PUSCH transmission includes a beam indication report and nothing else. For yet another example, a beam indication report is multiplexed in a PUSCH transmission together with UL-SCH data, and/or UL MAC CEs, and/or other L1 control information.

In certain embodiments, a beam measurement report is included in a type 2 configured grant PUSCH transmission.

For example, a field in a DCI format that activates the type 2 CG-PUSCH transmission triggers the beam measurement report. For another example, the beam measurement report can be configured by higher layer signaling such as RRC signaling. For another example, a UE autonomously provides the beam measurement report, for example if the measurements change by a configured and/or pre-determined threshold. For another example, a PUSCH transmission includes a beam indication report and nothing else. For yet another example, a beam indication report is multiplexed with UL-SCH data, and/or UL MAC CEs, and/or other L1 control information on a PUSCH transmission.

In certain embodiments, a UE includes a beam measurement report in a Msg3 PUSCH transmission of type 1 random access procedure.

For example, the UE can include the beam measurement report in response to a corresponding indication in a system information block or by a corresponding field in an UL grant of a random access response (RAR) that schedules the Msg3 PUSCH transmission. For instance, at least for operation in a given frequency range, such as one corresponding to mmWave bands, a UE can always include a beam measurement report in a Msg3 PUSCH transmission. For instance, the beam measurement report can correspond to the SS/PBCH block that the UE used to receive system information associated with the random access procedure and may also include beam measurements for additional SS/PBCH blocks (SSBs) that the UE may have received, such as for example for one additional SS/PBCH block. A UE can provide L1-RSRP and/or L1-SINR measurements of SSBs that exceed a threshold, wherein each SSB measurement is identified by the corresponding SSB index.

In certain embodiments, a UE includes a beam measurement report in a PUSCH transmission of MsgA of type 2 random access procedure.

For example, a preamble index can indicate the inclusion of a beam measurement report in the PUSCH transmission of MsgA. For another example, a field in the PUSCH transmission of MsgA can indicate the inclusion of a beam measurement report in the PUSCH transmission of MsgA. For another example, a PUSCH transmission of MsgA includes a beam indication report and nothing else. For another example, a beam indication report is multiplexed with, UL-SCH data, and/or UL MAC CEs, on a PUSCH transmission of MsgA. For yet another example, the UE can include the beam measurement report in a PUSCH transmission of MsgA in response to a corresponding indication in a system information block and the beam measurement report can be for SSBs as described in the embodiment where the UE includes a beam measurement report in a Msg3 PUSCH transmission of type 1 random access procedure.

In certain embodiments, a UE includes a beam measurement report in a PUCCH transmission.

For example, the PUCCH transmission is configured by higher layers such as by RRC signaling. For another example, the PUCCH transmission is configured by higher layers such as by RRC signaling and is activated as a semi-persistent transmission by L1 or L2 signaling. For yet another example, the PUCCH transmission is configured by higher layers such as by RRC signaling and is triggered by layer 1.

In certain embodiments, a UE is configured with resources for a Beam Measurement Report Request (BMRR). A UE transmits a BMRR to a gNB when the UE determines that a new beam measurement should be provided to the gNB, for example, if the beam measurements changed by a configured and/or pre-determined threshold. A BMRR can be a PUCCH resource that provides one bit of information from the UE to the gNB, wherein a UE transmits on the PUCCH resource when requesting resources for a beam measurement report, otherwise, there is no transmission on the PUCCH resource configured for BMRR. A gNB can schedule to the UE a PUSCH transmission for providing a beam measurement report. Similarly, a UE is configured with resources for a BMRR on different beams, i.e. with different TCI states, or with different spatial relation reference RS. A UE can select a preferred beam for providing a BMRR to the gNB.

FIGS. 13A, 13B, 13C, 13D, and 13E illustrate example beam measurement reports according to embodiments of the present disclosure. The beam management reports of FIGS. 13A-13E are for illustration only and other embodiments can be used without departing from the scope of the present disclosure.

In certain embodiments, a beam measurement report includes the impact of maximum permissible emission (MPE) in a direction. MPE can reduce the transmit power in a certain direction for health safety reasons. In the following examples, MPE effect can include any reason for which the UE can lower its transmission power when transmitting on the measured and reported beam.

For example, the MPE can be separately reported in each reported beam direction. For another example, the effect of the MPE can be included in the measurement report.

For example, the L1-RSRP measurement or the L1-SINR measurement can be reduced by an amount equal to the MPE in a certain direction.

Figure 13A:
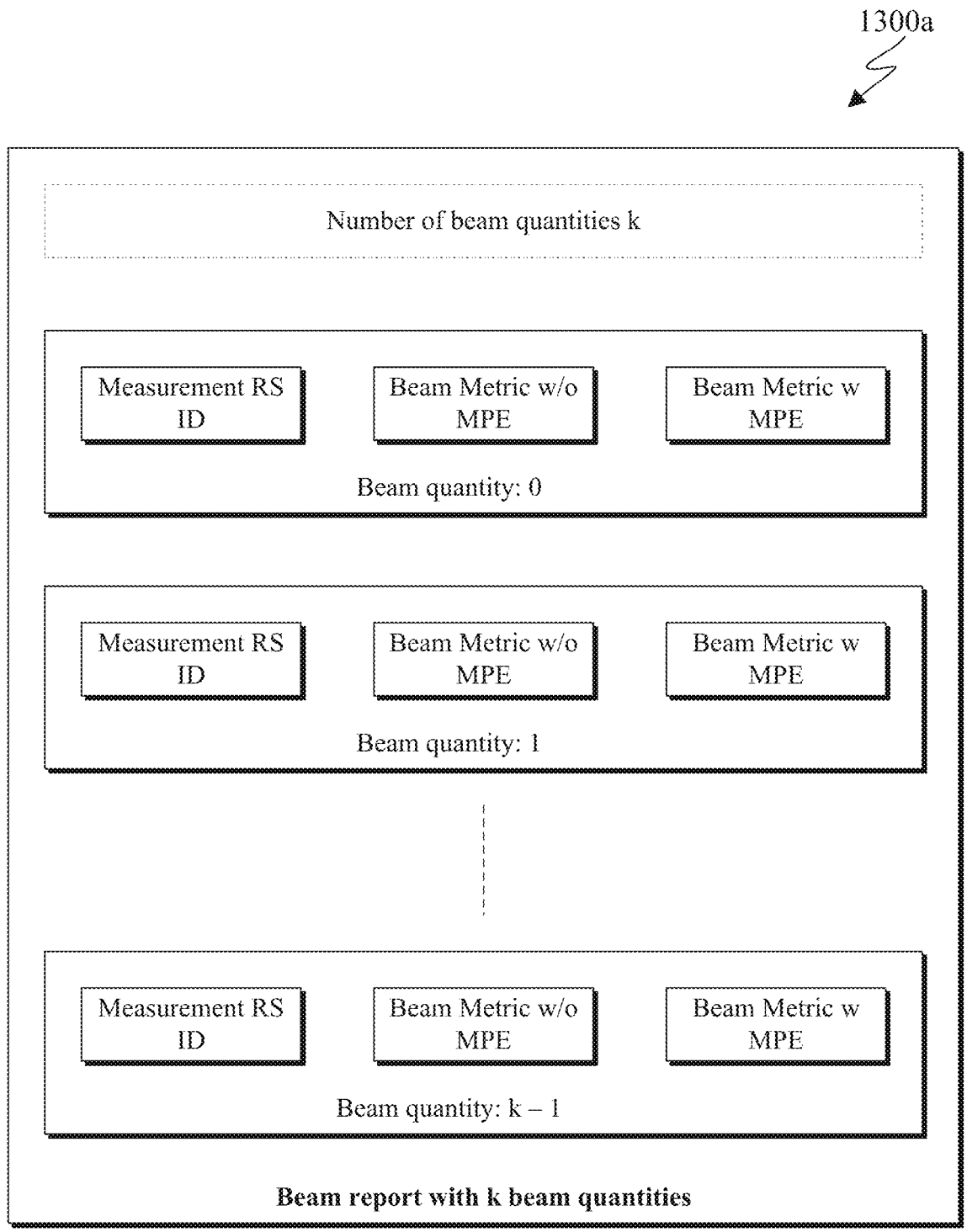

For another example, referring to FIG. 13A, a beam measurement report 1300a includes include up to K beam quantitates, where each beam quantity includes three elements (Measurement RS indicator (e.g. SSBRI or CRI), Beam measurement or metric without including MPE effect (e.g. L1-RSRP or L1-SINR), Beam measurement or metric including the MPE effect (e.g. L1-RSRP or L1-SINR)). The maximum number K of beam quantities in a beam measurement report can be specified by system specification and/or configured or updated by RRC signaling and/or MAC CE signaling. The number k beam quantities included in a beam measurement report, can equal the maximum number K specified in the system specifications and/or configured by RRC signaling and/or MAC CE signaling, i.e. k=K. Alternatively, the number of k beam quantities included in a beam measurement report, can be indicated to the UE in the beam measurement report or in a separate L1 control and/or MAC CE signaling, where k≤K.

Figure 13B:
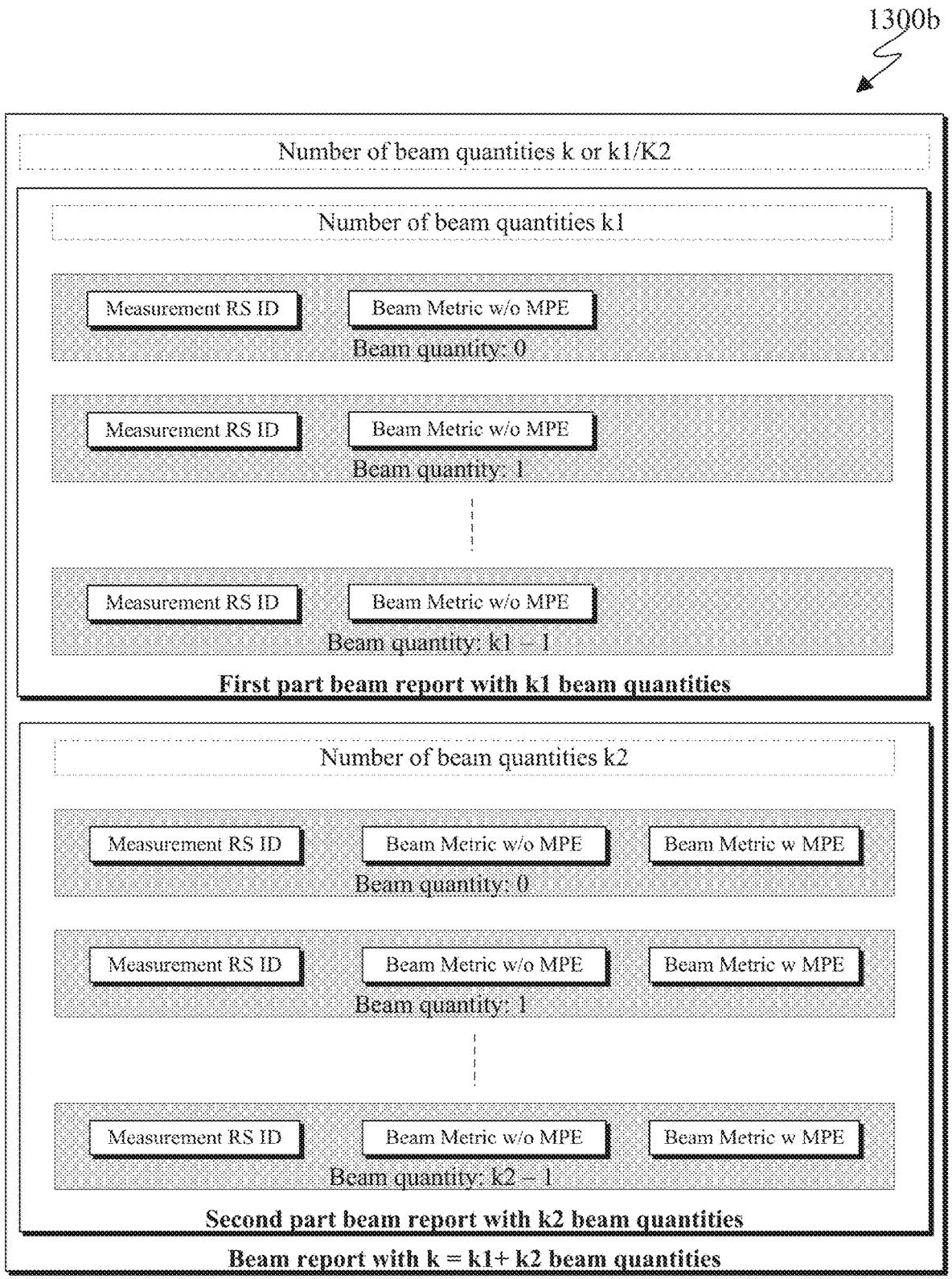

For another example, a beam measurement report 1300b as illustrated in FIG. 13B include two parts. A first part of beam measurement report 1300b can include up to K1 beam quantities, where each beam quantity includes two elements (Measurement RS indicator (e.g. SSBRI or CRI), beam measurement or metric without including MPE effect (e.g. L1-RSRP or L1-SINR). While the second part of the beam measurement report 1300b can include up to K2 (or K−K1) beam quantities, where each beam quantity includes three elements (Measurement RS indicator (e.g. SSBRI or CRI), beam measurement or metric without including MPE effect (e.g. L1-RSRP or L1-SINR), beam measurement or metric including the MPE effect (e.g. L1-RSRP or L1-SINR)). It is noted that the maximum number K1 of beam quantities in a first part of a beam measurement report can be specified by system specification and/or configured or updated by RRC signaling and/or MAC CE signaling. For instance, the number k1 beam quantities included in a first part of a beam measurement report, can equal the maximum number K1 specified in the system specifications and/or configured by RRC signaling and/or MAC CE signaling, i.e. k1=K1. Alternatively, the number of k1 beam quantities included in a first part of a beam measurement report, can be indicated to the UE in the beam measurement report or in a separate L1 control and/or MAC CE signaling, where k1≤K1.

In one instance, the maximum number K2 of beam quantities in a second part of a beam measurement report can be specified by system specification and/or configured or updated by RRC signaling and/or MAC CE signaling. The number k2 beam quantities included in a second part of a beam measurement report, can equal the maximum number K2 specified in the system specifications and/or configured by RRC signaling and/or MAC CE signaling, i.e. k2=K2. Alternatively, the number of k2 beam quantities included in a second part of a beam measurement report, can be indicated to the UE in the beam measurement report or in a separate L1 control and/or MAC CE signaling, where k2≤K2.

Alternatively, in another instance the maximum number K of beam quantities in a first and second part of a beam measurement report can be specified by system specification and/or configured or updated by RRC signaling and/or MAC CE signaling. The number k beam quantities included in a first and second part of a beam measurement report, can equal the maximum number K specified in the system specifications and/or configured by RRC signaling and/or MAC CE signaling, i.e. k=K. Alternatively, the number of k beam quantities included in a first and second part of a beam measurement report, can be indicated to the UE in the beam measurement report or in a separate L1 control and/or MAC CE signaling, where k≤K.

Figure 13C:
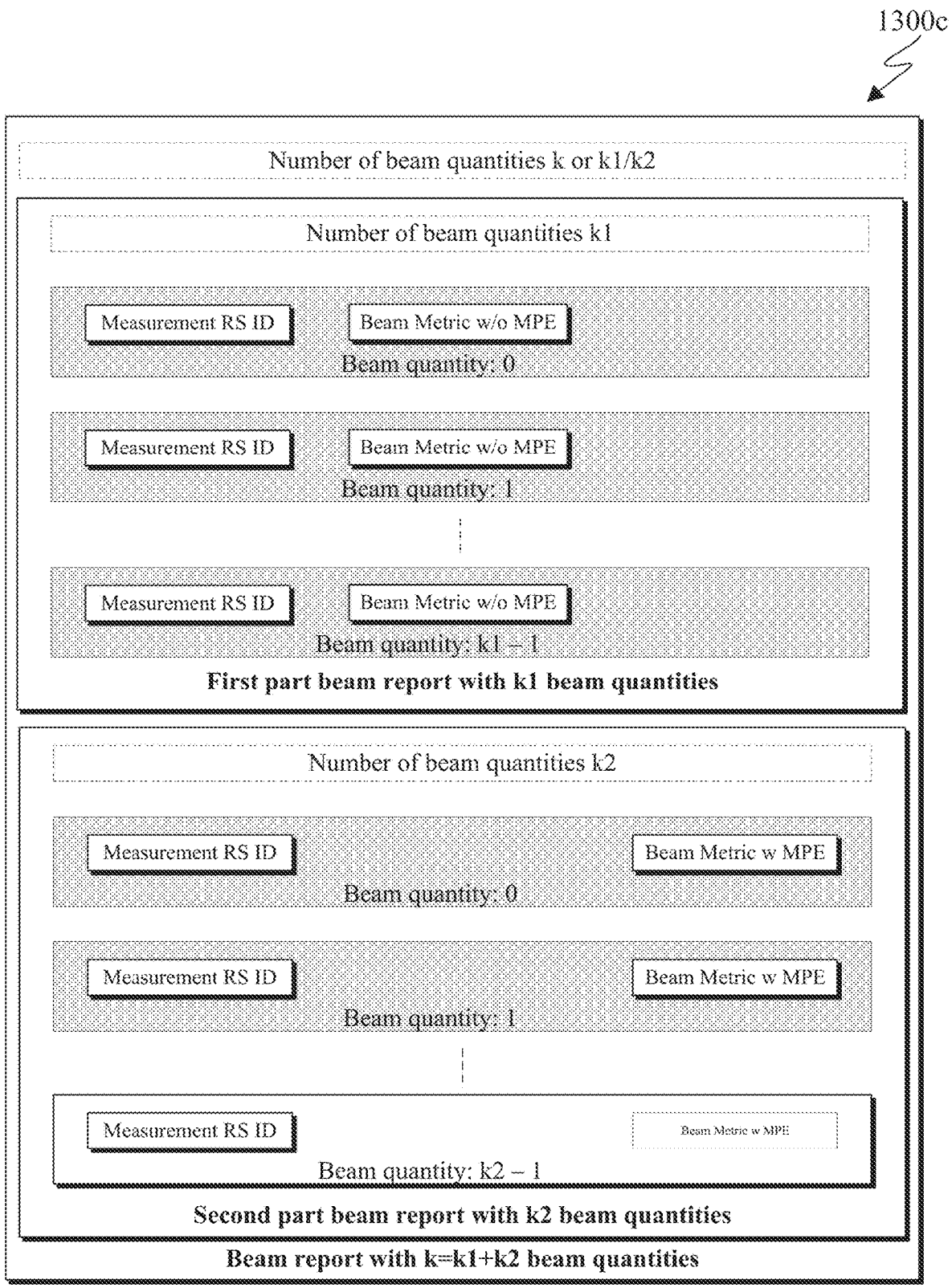

For another example, a beam measurement report 1300c as illustrated in FIG. 13C include two parts. A first part that can include up to K1 beam quantities, where each beam quantity includes two elements (Measurement RS indicator (e.g. SSBRI or CRI), Beam measurement or metric without including MPE effect (e.g. L1-RSRP or L1-SINR). A second part that can include up to K2 (or K−K1) beam quantities, where each beam quantity includes two elements (Measurement RS indicator (e.g. SSBRI or CRI), Beam measurement or metric including the MPE effect (e.g. L1-RSRP or L1-SINR)).

The maximum number K1 of beam quantities in a first part of a beam measurement report can be specified by system specification and/or configured or updated by RRC signaling and/or MAC CE signaling.

The number k1 beam quantities included in a first part of a beam measurement report, can equal the maximum number K1 specified in the system specifications and/or configured by RRC signaling and/or MAC CE signaling, i.e. k1=K1. Alternatively, the number of k1 beam quantities included in a first part of a beam measurement report, can be indicated to the UE in the beam measurement report or in a separate L1 control and/or MAC CE signaling, where k1≤K1.

In one instance, the maximum number K2 of beam quantities in a second part of a beam measurement report can be specified by system specification and/or configured or updated by RRC signaling and/or MAC CE signaling. The number k2 beam quantities included in a second part of a beam measurement report, can equal the maximum number K2 specified in the system specifications and/or configured by RRC signaling and/or MAC CE signaling, i.e. k2=K2. Alternatively, the number of k2 beam quantities included in a second part of a beam measurement report, can be indicated to the UE in the beam measurement report or in a separate L1 control and/or MAC CE signaling, where k2≤K2.

Alternatively, in another instance the maximum number K of beam quantities in a first and second part of a beam measurement report can be specified by system specification and/or configured or updated by RRC signaling and/or MAC CE signaling. The number k beam quantities included in a first and second part of a beam measurement report, can equal the maximum number K specified in the system specifications and/or configured by RRC signaling and/or MAC CE signaling, i.e. k=K. Alternatively, the number of k beam quantities included in a first and second part of a beam measurement report, can be indicated to the UE in the beam measurement report or in a separate L1 control and/or MAC CE signaling, where k≤K.

Figure 13D:
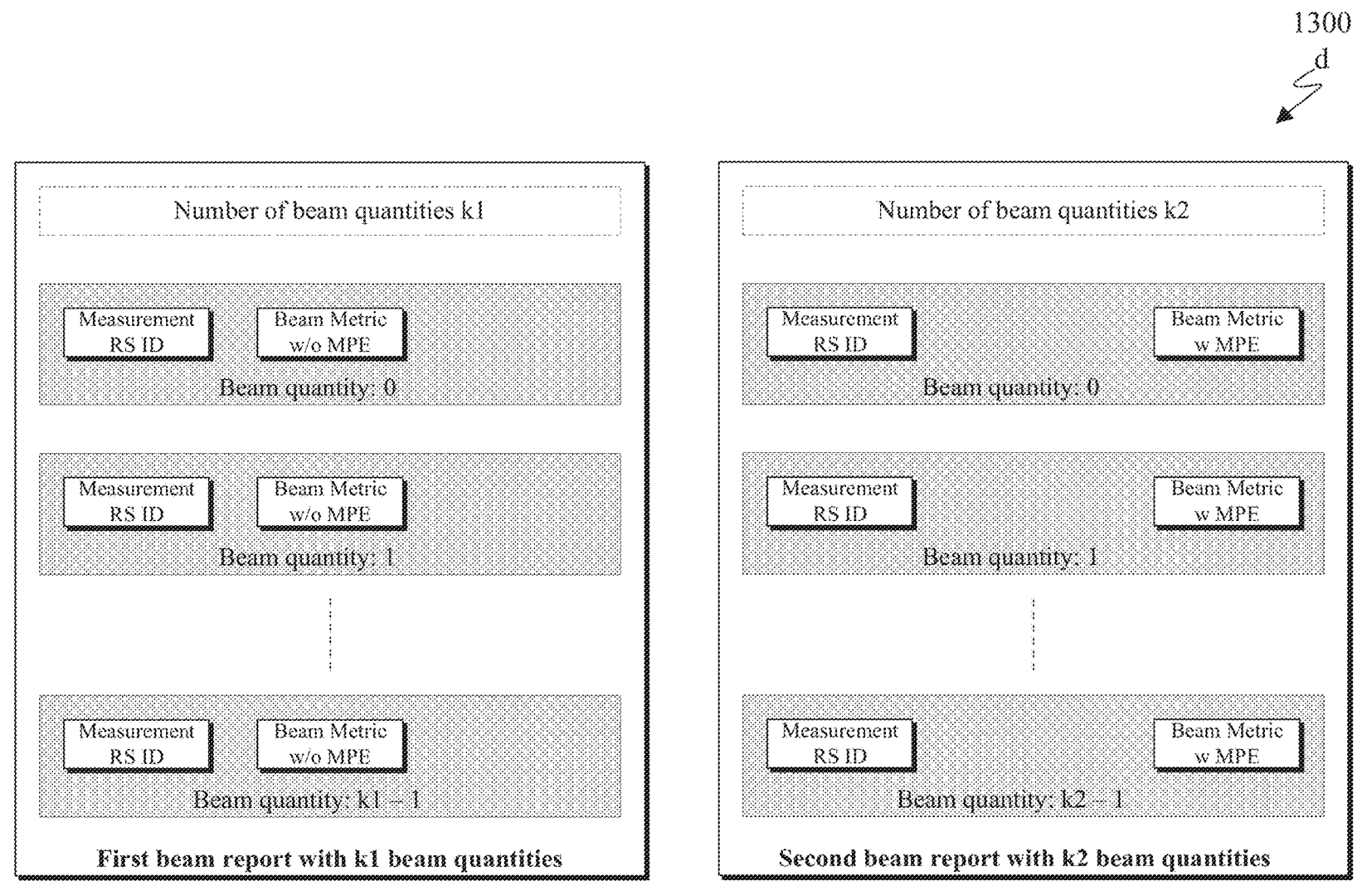

For another example, beam measurement reports 1300d as illustrated in FIG. 13D can be sent by the UE, such as the UE 116 of FIG. 1. A first report that can include up to K1 beam quantities, where each beam quantity includes two elements (Measurement RS indicator (e.g. SSBRI or CRI), Beam measurement or metric without including MPE effect (e.g. L1-RSRP or L1-SINR). A second report that can include up to K2 (or K−K1) beam quantities, where each beam quantity includes two elements (Measurement RS indicator (e.g. SSBRI or CRI), Beam measurement or metric including the MPE effect (e.g. L1-RSRP or L1-SINR)). The maximum number K1 of beam quantities in a first report of a beam measurement report can be specified by system specification and/or configured or updated by RRC signaling and/or MAC CE signaling. The number k1 beam quantities included in a first report of a beam measurement report, can equal the maximum number K1 specified in the system specifications and/or configured by RRC signaling and/or MAC CE signaling, i.e. k1=K1. Alternatively, the number of k1 beam quantities included in a first part of a beam measurement report, can be indicated to the UE in the beam measurement report or in a separate L1 control and/or MAC CE signaling, where k1≤K1.

In one instance, the maximum number K2 of beam quantities in a second report of a beam measurement report can be specified by system specification and/or configured or updated by RRC signaling and/or MAC CE signaling. The number k2 beam quantities included in a second report of a beam measurement report, can equal the maximum number K2 specified in the system specifications and/or configured by RRC signaling and/or MAC CE signaling, i.e. k2=K2. Alternatively, the number of k2 beam quantities included in a second report of a beam measurement report, can be indicated to the UE in the beam measurement report or in a separate L1 control and/or MAC CE signaling, where k2≤K2.

Alternatively, in another instance, the maximum number K of beam quantities in a first and second report of a beam measurement report can be specified by system specification and/or configured or updated by RRC signaling and/or MAC CE signaling. The number k beam quantities included in a first and second reports of a beam measurement report, can equal the maximum number K specified in the system specifications and/or configured by RRC signaling and/or MAC CE signaling, i.e. k=K. Alternatively, the number of k beam quantities included in a first and second reports of a beam measurement report, can be indicated to the UE in the beam measurement report or in a separate L1 control and/or MAC CE signaling, where k≤K.

Figure 13E:
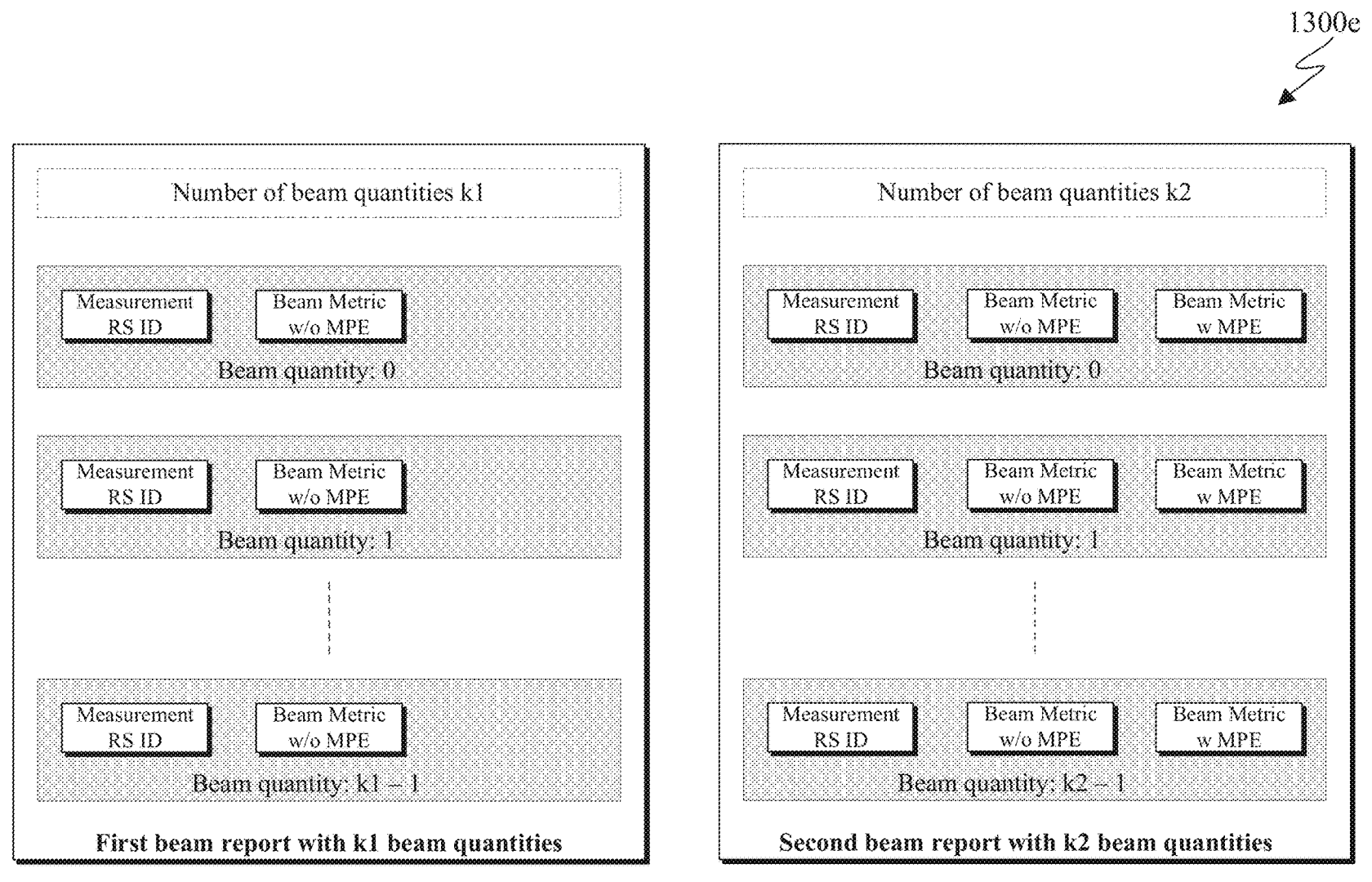

For another example, beam measurement reports 1300e as illustrated in FIG. 13E can be sent by the UE, such as the UE 116 of FIG. 1. A first beam report that can include up to K1 beam where each beam quantity includes two elements (Measurement RS indicator (e.g. SSBRI or CRI), Beam measurement or metric without including MPE effect (e.g. L1-RSRP or L1-SINR)). The first beam report can include a flag to indicate that the beam report includes beam quantities without including MPE effect. A second beam report that can include up to K2 beam quantities, where each beam quantity includes three elements (Measurement RS indicator (e.g. SSBRI or CRI), Beam measurement or metric without including MPE effect (e.g. L1-RSRP or L1-SINR), Beam measurement or metric including the MPE effect (e.g. L1-RSRP or L1-SINR)). The second beam report can include a flag to indicate that the beam report includes beam quantities with and without MPE effect. In one example K1=K2=K, in another example K1≠K2.

The maximum number K and/or K1 and/or K2 of beam quantities in a corresponding beam measurement report can be specified by system specification and/or configured or updated by RRC signaling and/or MAC CE signaling. The number k and/or k1 and/or k2 beam quantities included in a corresponding beam measurement report, can equal the maximum number K and/or K1 and/or K2 specified in the system specifications and/or configured by RRC signaling and/or MAC CE signaling, i.e. k=K and/or k1=K1 and/or k2=K2. Alternatively, the number of k and/or k1 and/or k2 beam quantities included in a corresponding beam measurement report, can be indicated to the UE in the beam measurement report or in a separate L1 control and/or MAC CE signaling, where k≤K and/or k1≤K1 and/or k2≤K2.

Figure 14A:
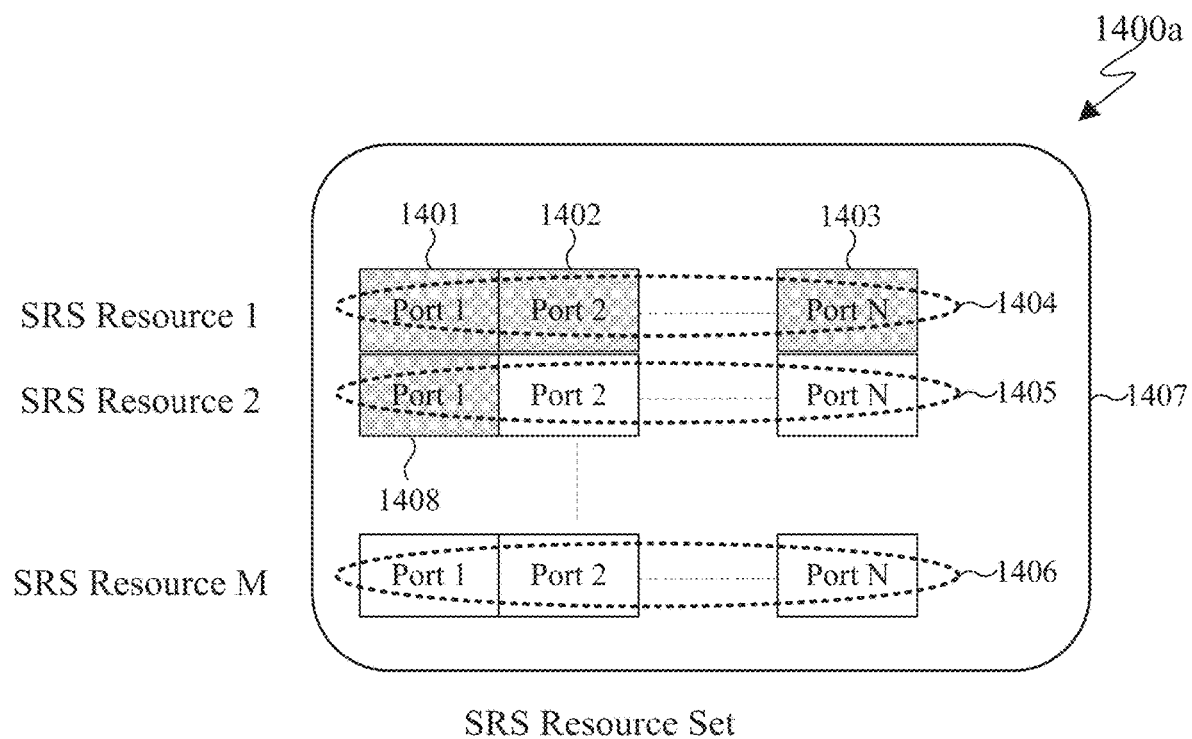
FIG. 14A illustrates configuration of an SRS resource set according to embodiments of the present disclosure.
Figure 14B:
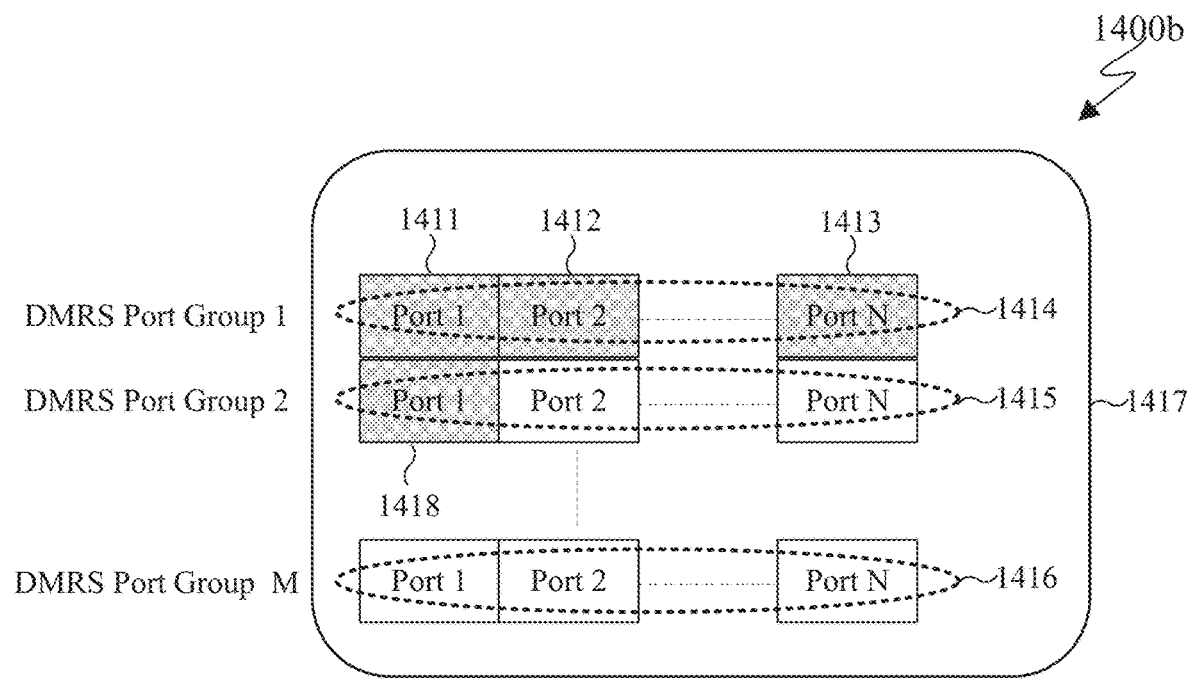
FIG. 14B illustrates an example of a configuration of a DMRS port super group according to embodiments of the present disclosure.

The following embodiments and examples describe a configuration of UL RS resources for beam management (Component 2):

The following embodiments and examples that describe a configuration of UL RS resources for beam management refer to FIGS. 14A and 14B. FIG. 14A. FIG. 14A illustrates configuration 1400a of an SRS resource set according to embodiments of the present disclosure. FIG. 14B illustrates an example of a configuration 1400b of a DMRS port super group according to embodiments of the present disclosure. The configures 1400a and 1400b of FIGS. 14A and 14B are for illustration only and other embodiments can be used without departing from the scope of the present disclosure.

A network/gNB can configure the SRS resource sets, SRS resources, and SRS ports of a UE. The SRS resource set includes can one or more SRS resources. The SRS resource can include one or more SRS ports. When the SRS resource set applicability, configured by higher layer parameter "usage", is set to "beam management", one SRS resource in each of a multiple SRS resource sets can be transmitted at a time instant.

In certain embodiments, the SRS configuration for SRS-based beam management is expanded to support SRS transmission using multiple SRS resources within an SRS resource set. An SRS resource can include multiple SRS ports. Additionally, a spatial relation reference RS, a number of SRS ports included in an SRS resource, and a number of SRS resources in an SRS resource set can be configured to a UE and updated through MAC-CE signaling and/or L1 control signaling.

This example can include a network/gNB configures through RRC signaling to the UE an SRS resource set that includes multiple SRS resources, wherein an SRS resource is configured with a spatial relation with a reference RS associated with a DL beam and includes multiple SRS ports. FIG. 14A illustrates an example of a configuration of an SRS resource set 1407. The SRS resource set includes M SRS resources e.g. 1404, 1405 and 1406. Each SRS resource includes N SRS ports, for example SRS resource 1 (1404) includes SRS ports 1401, 1402 and 1403.

In a variant, the network/gNB can configure to the UE multiple SRS resource sets, wherein an SRS resource set can include a spatial relation with a reference RS associated with a DL beam, and include multiple SRS resources, wherein an SRS resource includes one or multiple SRS ports. In another variant, a spatial relation can include a reference RS associated with an SRS resource and/or SRS resource set.

The above example can also include a configuration of SRS resources through RRC signaling and can include one or more of the following parameters: time and frequency resource allocation, including periodicity, offset and repetition in time domain and frequency hopping in frequency domain, sequence index (e.g. PN sequence or ZC-sequence), orthogonal cover in time and/or frequency domains, sub-carrier comb and cyclic shift. The network/gNB configures to the UE and updates the spatial relation reference RS through: (i) RRC signaling, (ii) MAC CE signaling and/or (iii) L1 control signaling.

The network/gNB can configure to the UE and update the number of SRS resources transmitted in an SRS resource set and the number of SRS ports transmitted in an SRS resource through: (i) MAC CE signaling and/or (ii) L1 control signaling.

As illustrated in FIG. 14A, based on the channel conditions, the network/gNB decides to allow a UE to transmit the SRS resources and ports shaded in grey (1401, 1402, 1403, 1408). In this example, the network/gNB can update through MAC CE signaling and/or through L1 control signaling to the UE the number of SRS resources to two, i.e. SRS resource 1 (1404) and SRS resource 2 (1405), furthermore the network/gNB indicates to the UE N ports for SRS resource 1, e.g. 1401, 1402 and 1403, and 1 port for SRS resource 2, e.g. 1408. This indicates the resources a UE would transmit in an SRS resource set. In a variant, the number of SRS ports in the transmitted SRS resources is the same. Here, the network/gNB can configure to the UE and update the number of SRS resource sets transmitted through: (i) MAC CE signaling and/or (ii) L1 control signaling.

For example, the number of ports in each SRS resource is one (i.e., N=1). The NW/gNB can update/configure through MAC CE signaling and/or through L1 control signaling to the UE a number (M1) and/or indices of SRS resources for SRS transmission, where M1<M and is either fixed or configured (via RRC or MAC CE or DCI format). In response, the UE (such as the UE 116 of FIG. 1) transmits SRS on all SRS ports of the updated/configured SRS resources.

For another example, the number of ports in each SRS resource is fixed (such as, N>=1). The NW/gNB can update/configure through MAC CE signaling and/or through L1 control signaling to the UE a number (M1) and/or indices of SRS resources for SRS transmission, where M1<M and is either fixed or configured (via RRC or MAC CE or DCI format). In response, the UE (such as the UE 116 of FIG. 1) transmits SRS on all SRS ports of the updated/configured SRS resources.

For another example, the number of SRS resources is one (i.e., M=1). The NW/gNB can update/configure through MAC CE signaling and/or through L1 control signaling to the UE the number (N1) and/or indices of SRS ports for SRS transmission, where N1<N and is either fixed or configured (via RRC or MAC CE or DCI format). In response, the UE (such as the UE 116 of FIG. 1) transmits SRS on the updated/configured SRS ports of the SRS resource.

For another example, the number of SRS resources is fixed (i.e., M>=1). The NW/gNB can update/configure through MAC CE signaling and/or through L1 control signaling to the UE the number (N1) and/or indices of SRS ports for SRS transmission, where N1<N and is either fixed or configured (via RRC or MAC CE or DCI format). In response, the UE (such as the UE 116 of FIG. 1) transmits SRS on the updated/configured SRS ports of the M SRS resources.

For another example, the number of SRS ports in two SRS resources (from the M SRS resources) can be same or different. In general, let $N^{(i)}$ be the number of SRS ports in the i-th SRS resource where i=0,1, . . . , M-1. Then, $N^{(i)}$ can be same or different from $N^{(j)}$ where i≠j. The set of candidate values for $N^{(i)}$ can be {1,2} or {1,2,4} or {1,2,3,4}. For instance, the NW/gNB can update/configure through MAC CE signaling and/or through L1 control signaling to the UE the number (M1) and/or indices of SRS resources for SRS transmission). In response, the UE (such as the UE 116 of FIG. 1) transmits SRS on all ports of the updated/configured SRS resources. For another instance, the NW/gNB can update/configure through MAC CE signaling and/or through L1 control signaling to the number (M1) and/or indices of SRS resources for SRS transmission. If $N^{(i)}$>1 for an updated/configured SRS resource with index i, then the NW/gNB can additionally configure the number $(N_1^{(i)})$ and/or indices of SRS ports in the i-th SRS resource for SRS transmission. In response, the UE (such as the UE 116 of FIG. 1) transmits SRS on either all SRS ports or configured SRS ports of the updated/configured SRS resources.

For another example, a gNB can update one or more parameters, through a UE specific DCI format. The parameters can include (i) the number M1 of SRS resources and/or indices of SRS resources and (ii) for each SRS resource, the corresponding spatial relation reference RS or TCI state. In addition to (i) and (ii), the parameters also include either (A) if the SRS ports can be different for each SRS resource, the corresponding number of ports $(N_1^{(i)})$ and/or indices of SRS ports of the i-th SRS resource, for each SRS resource i, or (B) the number of SRS ports N and/or SRS ports. A UE specific DCI format, for example can be a DCI format for beam indication and/or a DCI format for scheduling UL and/or DL transmissions.

For another example, a gNB can update one or more parameters through a group common DCI format. The parameters can include (i) the number M1 of SRS resources and/or indices of SRS resources and (ii) for each SRS resource, the corresponding spatial relation reference RS or TCI state. In addition to (i) and (ii), the parameters also include either (A) if the SRS ports can be different for each SRS resource, the corresponding number of ports $(N_1^{(i)})$ and/or indices of SRS ports of the i-th SRS resource, for each SRS resource i, or (B) the number of SRS ports N and/or SRS ports. A group common DCI format, for example can include a DCI format for group common beam indication and/or a DCI format for group common SRS update.

For another example, a gNB can update one or more of the following parameters through a MAC Control Element. The parameters include (i) the number M1 of SRS resources and/or indices of SRS resources and (ii) for each SRS resource, the corresponding spatial relation reference RS or TCI state. In addition to (i) and (ii), the parameters also include either (A) if the SRS ports can be different for each SRS resource, the corresponding number of ports $(N_1^{(i)})$ and/or indices of SRS ports of the i-th SRS resource, for each SRS resource i or (B) the number of SRS ports N and/or SRS ports.

For yet another example, a gNB can update one or more of the following parameters through RRC signaling. The parameters include (i) the number M1 of SRS resources and/or indices of SRS resources and (ii) for each SRS resource, the corresponding spatial relation reference RS or TCI state. In addition to (i) and (ii), the parameters also include either (A) if the SRS ports can be different for each SRS resource, the corresponding number of ports $(N_1^{(i)})$ and/or indices of SRS ports of the i-th SRS resource, for each SRS resource i or (B) the number of SRS ports N and/or SRS ports.

In certain embodiments, the network/gNB (such as the BS 102 of FIGS. 1 and 2) configures the UE DMRS ports for uplink-DMRS-based beam management. The DMRS ports can be associated with a PUSCH transmission and/or a PUCCH transmission. It is noted that uplink-DMRS for beam management can be configured instead of or in addition to SRS. Similarly, uplink-DMRS ports for beam management can be configured instead of or in addition DMRS ports for channel estimation. The DMRS ports for beam management can be time division multiplexed with a PUSCH and/or a PUCCH transmission.

This example includes a first DMRS port for beam management can be time division multiplexed and/or frequency division multiplexed and/or code/sequence division multiplexed with a second DMRS port for beam management. The example also includes a set of N DMRS ports can constitute a DMRS port group, wherein a DMRS port group includes a spatial relation with a reference RS, and wherein N is an integer that is greater than or equal to 1. The example further includes a set of M DMRS port groups can constitute a DMRS port super-group, wherein M is an integer that is greater than or equal to 1. Additionally, the example includes the network/gNB configures to the UE through RRC signaling a DMRS super-group, wherein, a configuration can include the configuration of M and N.

FIG. 14B, illustrates the configuration 1400b of a DMRS port super group 1417. The DMRS port super group includes M DMRS port groups e.g. 1414, 1415 and 1416. Each DMRS port group includes N DMRS ports, for example DMRS port group 1 (1414) includes DMRS ports 1411, 1412 and 1413. A configuration can also include one or more of the following parameters: time and frequency resource allocation, including periodicity, offset and repetition in time domain and frequency hopping in frequency domain, sequence index (e.g. PN sequence or ZC-sequence), orthogonal cover in time and/or frequency domains, sub-carrier comb and cyclic shift.

The network/gNB (such as the BS 102 of FIGS. 1 and 2) can configure to the UE (such as the UE of FIGS. 1 and 3) and update the spatial relation reference RS of a DMRS port group through at least one of (i) RRC signaling, (ii) MAC CE signaling, and/or (iii) L1 control signaling.

The network/gNB (such as the BS 102 of FIGS. 1 and 2) can configure to the UE (such as the UE of FIGS. 1 and 3) and update the number of DMRS ports transmitted in a DMRS port group and the number of DMRS port groups transmitted in a DMRS port super-group through MAC CE signaling and/or L1 control signaling.

In the example, illustrated in FIG. 14B, based on the channel conditions, the network/gNB (such as the BS 102 of FIGS. 1 and 2) decides to allow a UE (such as the UE of FIGS. 1 and 3) to transmit the DMRS port groups and DMRS ports shaded in grey (1201, 1202, 1203, 1208). In this example, the network/gNB can configured and update through MAC CE signaling and/or through L1 control signaling to the UE the number of DMRS port groups to two, i.e. DMRS port group 1 (1414) and DMRS port group 2 (1415). Furthermore, the network/gNB indicates to the UE N DMRS ports for DMRS port group 1, e.g. 1411, 1412 and 1413, and 1 DMRS port for DMRS port group 2, e.g. 1418. This indicates the resources a UE would transmit in a DMRS port super group. In a variant, the number of DMRS ports in the transmitted DMRS port groups is the same.

For example, the number of ports in each DMRS port group is one (i.e., N=1). The NW/gNB can update/configure through MAC CE signaling and/or through L1 control signaling to the UE the number (M1) and/or indices of DMRS port groups for DMRS transmission, where M1<M and is either fixed or configured (via RRC or MAC CE or DCI format). In response, the UE (such as the UE 116 of FIGS. 1 and 3) transmits DMRS on all DMRS ports of the updated/configured DMRS port groups.

For another example, the number of ports in each DMRS port group is fixed (i.e., N>=1). The NW/gNB can update/configure through MAC CE signaling and/or through L1 control signaling to the UE the number (M1) and/or indices of DMRS port groups for DMRS transmission, where M1<M and is either fixed or configured (via RRC or MAC CE or DCI format). In response, the UE (such as the UE 116 of FIGS. 1 and 3) transmits DMRS on all DMRS ports of the updated/configured DMRS port groups.

For another example, the number of DMRS port groups is one (i.e., M=1). The NW/gNB can update/configure through MAC CE signaling and/or through L1 control signaling to the UE the number (N1) and/or indices of DMRS ports for DMRS transmission, where N1<N and is either fixed or configured (via RRC or MAC CE or DCI format). In response, the UE (such as the UE 116 of FIGS. 1 and 3) transmits DMRS on the updated/configured DMRS ports of the DMRS port group.

For another example, the number of DMRS port groups is fixed (i.e., M>=1). The NW/gNB can update/configure through MAC CE signaling and/or through L1 control signaling to the UE the number (N1) and/or indices of DMRS ports for DMRS transmission, where N1<N and is either fixed or configured (via RRC or MAC CE or DCI format). In response, the UE (such as the UE 116 of FIGS. 1 and 3) transmits DMRS on the updated/configured DMRS ports of the M DMRS port groups.

For another example, the number of DMRS ports in two DMRS port groups (from the M DMRS port groups) can be same or different. In general, let $N^{(i)}$ be the number of DMRS ports in the i-th DMRS port group where i=0,1, . . . , M−1. Then, $N^{(i)}$ can be same or different from $N^{(j)}$ where i≠j. The set of candidate values for $N^{(i)}$ can be {1,2} or {1,2,4} or {1,2,3,4}. For instance, the NW/gNB can update/configure through MAC CE signaling and/or through L1 control signaling to the UE the number (M1) and/or indices of DMRS port groups for DMRS transmission. In response, the UE (such as the UE 116 of FIGS. 1 and 3) DMRS on all ports of the updated/configured DMRS port groups. For another instance, the NW/gNB can update/configure through MAC CE signaling and/or through L1 control signaling to the UE the number (M1) and/or indices of DMRS port group for DMRS transmission. If $N^{(i)}$>1 for an updated/configured DMRS port group with index i, then the NW/gNB can additionally configure the number ($N_1^{(i)}$) and/or indices of DMRS ports in the i-th DMRS port group for DMRS transmission. In response, the UE (such as the UE 116 of FIGS. 1 and 3) transmits DMRS on either all DMRS ports or configured DMRS ports of the updated/configured DMRS port groups.

For another example, a gNB can update one or more of the following parameters through a UE specific DCI format. The parameters include (i) the number M1 of DMRS port groups and/or indices of DMRS port groups and (ii) for each DMRS port group the corresponding spatial relation reference RS or TCI state. In addition to (i) and (ii), the parameters also include either (A) if the DMRS ports can be different for each DMRS port group, the corresponding number of ports ($N_1^{(i)}$) and/or indices of DMRS ports of the i-th DMRS port group, for each DMRS port group i or (B) the number of DMRS ports N and/or DMRS ports. The UE specific DCI format can include, for example, a DCI format for beam indication and/or a DCI format for scheduling UL and/or DL transmissions.

For another example, a gNB can update one or more of the following parameters through a group common DCI format. The parameters include (i) the number M1 of DMRS port groups and/or indices of DMRS port groups and (ii) for each DMRS port group the corresponding spatial relation reference RS or TCI state. In addition to (i) and (ii), the parameters also include either (A) if the DMRS ports can be different for each DMRS port group, the corresponding number of ports (N) and/or indices of DMRS ports of the i-th DMRS port group, for each DMRS port group i or (B) the number of DMRS ports N and/or DMRS ports. The group common DCI format can include for example a DCI format for group common beam indication and/or a DCI format for group common DMRS update.

For another example, a gNB can update one or more of the following parameters through a MAC Control Element. The parameters include (i) the number M1 of DMRS port groups and/or indices of DMRS port groups and (ii) for each DMRS port group the corresponding spatial relation reference RS or TCI state. In addition to (i) and (ii), the parameters also include either (A) if the DMRS ports can be different for each DMRS port group, the corresponding number of ports ($N_1^{(i)}$) and/or indices of DMRS ports of the i-th DMRS port group, for each DMRS port group i or (B) the number of DMRS ports N and/or DMRS ports.

For yet another example, a gNB can update one or more of the following parameters through RRC signaling. The parameters include (i) the number M1 of DMRS port groups and/or indices of DMRS port groups and (ii) for each DMRS port group the corresponding spatial relation reference RS or TCI state. In addition to (i) and (ii), the parameters also include either (A) if the DMRS ports can be different for each DMRS port group, the corresponding number of ports ($N_1^{(i)}$) and/or indices of DMRS ports of the i-th DMRS port group, for each DMRS port group i or (B) the number of DMRS ports N and/or DMRS ports.

Figure 15A:
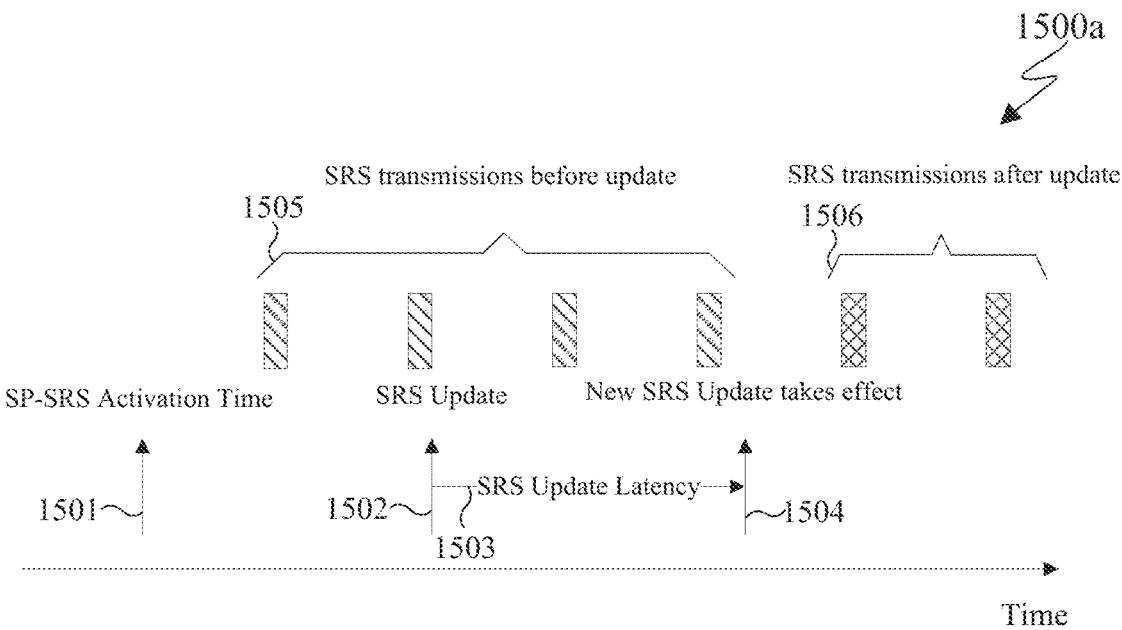
FIG. 15A illustrates a semi-persistent SRS resource set according to embodiments of the present disclosure.
Figure 15B:
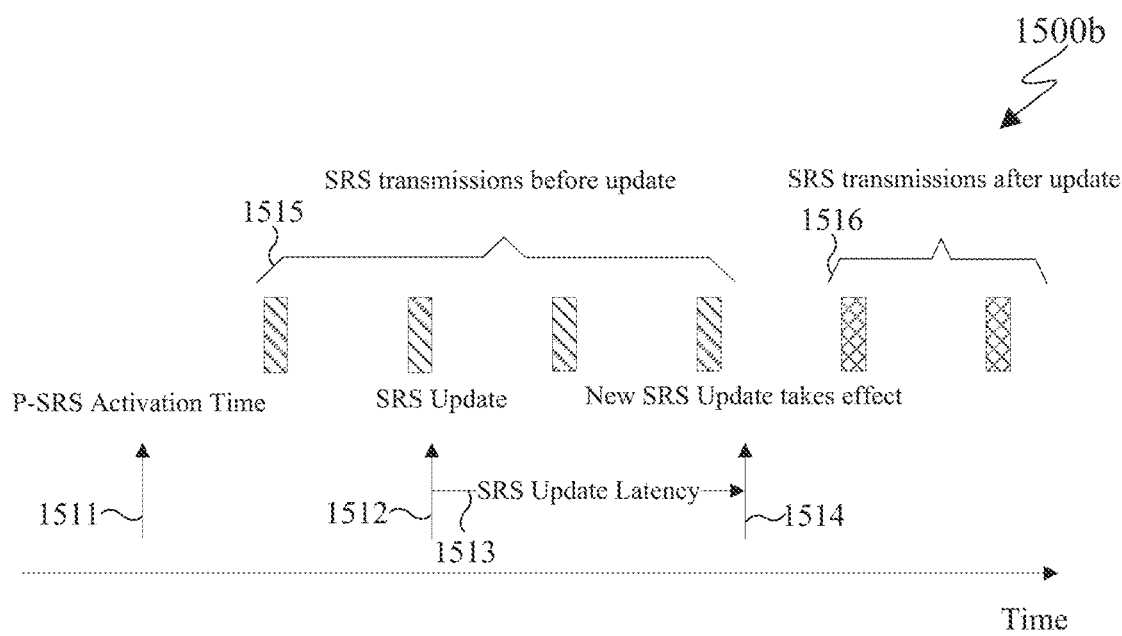
FIG. 15B illustrates a periodic SRS resource set according to embodiments of the present disclosure.
Figure 16:
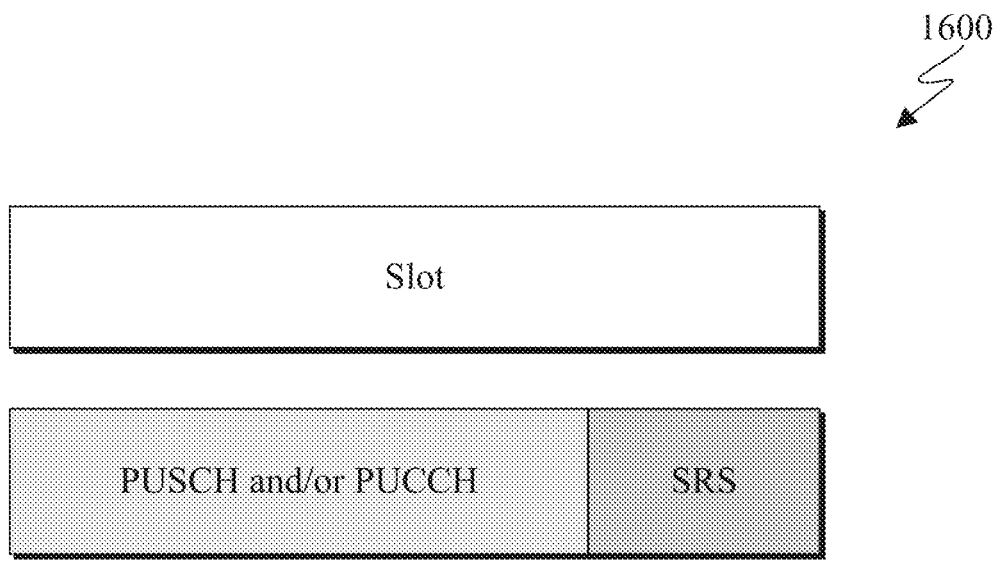
FIG. 16 illustrates an SRS resource set that is transmitted after a PUSCH and/or PUCCH transmission according to embodiments of the present disclosure.

The following embodiments and examples describe transmitting of SRS Ports (Component 3):

The following embodiments and examples that describe the transmission of SRS ports, refer to FIGS. 15A, 15B, and 16. FIG. 15A illustrates a semi-persistent SRS resource set 1500a according to embodiments of the present disclosure. FIG. 15B illustrates a periodic SRS resource set 1500b according to embodiments of the present disclosure. FIG. 16 illustrates an SRS resource set 1600 that is transmitted after a PUSCH and/or PUCCH transmission according to embodiments of the present disclosure. The examples of FIGS. 15A, 15B, and 16 are for illustration only and other embodiments can be used without departing from the scope of the present disclosure.

In certain embodiments, a UE (such as the UE of FIGS. 1 and 3) can transmit the SRS ports and SRS resources of an SRS resource set(s) following a configuration that is similar to that of FIG. 14A and its associated examples described above. A first SRS resource includes a spatial relation to a first reference RS, and a second SRS resource includes a spatial relation to a second reference RS. Alternatively, a first SRS resource set includes a spatial relation to a first reference RS, and a second SRS resource set includes a spatial relation to a second reference RS.

For example, SRS resource set is of resourceType aperiodic. An SRS resource set transmission can be triggered by L1 control signaling.

For another example, an SRS resource set is of resourceType semi-persistent (SP). As described in FIG. 15A, a SP-SRS resource set transmission can be activated by MAC CE signaling and/or L1 control signaling, e.g. time 1501 of FIG. 15A. A possible scenario as illustrated in FIG. 15A is that (i) the spatial relation reference RS resources, (ii) the number of transmitted SRS ports of an SRS resource, (iii) the number of transmitted SRS resources of an SRS resource set, and/or (iv) the number of transmitted SRS resource sets is updated after semi-persistent SRS activation at time 1502. After an SRS update latency (1503), that corresponds to the time required for a UE to process the SRS update signaling and activate the updated parameters, the update parameters take effect at time 1504. The SRS transmissions 1505 occur before update and the SRS transmissions 1506 occur after the update. In another example, the SP-SRS activation, and the SRS update occur at a same time, or substantially at a same time, or are included in a same signaling message.

For another example, an SRS resource set is of resourceType periodic (P). As described in FIG. 15B, a P-SRS resource set can be configured by RRC signaling, e.g. 1511 of FIG. 15B. A possible scenario, as illustrated in FIG. 15B, is that the spatial relation reference RS resources, and/or the number of transmitted SRS ports of an SRS resource, and/or the number of transmitted SRS resources of an SRS resource set, and/or the number of transmitted SRS resource sets is updated at time 1512. After an SRS update latency (1513), that corresponds to the time required for a UE to process the SRS update signaling and activate the updated parameters, the update parameters take effect at time 1514. The SRS transmissions 1515 occur before update and the SRS transmissions 1516 occur after the update.

For another example, an SRS resource set(s) is transmitted in association with a PUSCH and/or PUCCH transmission. For instance, an SRS resource set(s) is transmitted in a same slot as a PUSCH transmission and/or in a same slot as a PUCCH transmission. In one instance, an SRS resource set is transmitted after a PUSCH and/or PUCCH transmission as illustrated in FIG. 16. In another instance, an SRS resource set is transmitted before a PUSCH and/or PUCCH transmission.

The transmission of an SRS resource set in a same slot as PUSCH and/or PUCCH is enabled or disabled by RRC signaling and/or MAC CE signaling and/or DCI format, when enabled it continues until it is disabled. In one variant, the transmission of an SRS resource set in a same slot as a PUSCH and/or PUCCH occurs when enabled and none of the SRS symbols overlaps a PUSCH symbol or a PUCCH symbol. In a second variant, the transmission of an SRS resource set in same slot as a PUSCH and/or PUCCH occurs when enabled and following the last PUSCH symbol or PUCCH symbol of a slot as long as there are sufficient symbols to transmit an SRS resource set. In a third variant, the transmission of an SRS resource set in a same slot as a PUSCH and/or PUCCH occurs when enabled and for SRS symbols that do not overlap a PUSCH symbol or a PUCCH symbol. In a fourth variant, the transmission of an SRS resource set in a same slot as a PUSCH and/or PUCCH occurs when enabled and following the last PUSCH symbol or PUCCH symbol such that the number of SRS symbols does not exceed the remaining symbols of the slot after the last PUSCH symbol or PUCCH symbol and does not exceed the number of symbols of an SRS resource set.

The transmission of an SRS resource set in a same slot as a PUSCH and/or a PUCCH is triggered by a DCI format, for example a DCI format scheduling PUSCH for transmission in a same slot as PUSCH or a DCI format scheduling PDSCH or an SPS PDSCH release for transmission in a same slot as PUCCH. In one variant, the transmission of an SRS resource set in a same slot as a PUSCH and/or PUCCH occurs when enabled and none of the SRS symbols overlaps a PUSCH symbol or a PUCCH symbol. In a second variant, the transmission of an SRS resource set in same slot as a PUSCH and/or PUCCH occurs when enabled and following the last PUSCH symbol or PUCCH symbol of a slot as long as there are sufficient symbols to transmit an SRS resource set. In a third variant, the transmission of an SRS resource set in a same slot as a PUSCH and/or PUCCH occurs when enabled and for SRS symbols that do not overlap a PUSCH symbol or a PUCCH symbol. In a fourth variant, the transmission of an SRS resource set in a same slot as a PUSCH and/or PUCCH occurs when enabled and following the last PUSCH symbol or PUCCH symbol such that the number of SRS symbols does not exceed the remaining symbols of the slot after the last PUSCH symbol or PUCCH symbol and does not exceed the number of symbols of an SRS resource set.

In certain embodiments, a UE (such as the UE of FIGS. 1 and 3) can transmit the DMRS ports for beam management and DMRS port groups of a DMRS port super-group following a configuration that is similar to that of FIG. 14B and its associated examples, described above. A first DMRS port group includes a spatial relation to a first reference RS, and a second DMRS port group includes a spatial relation to second reference RS. A DMRS port super group for beam management is transmitted in association with a PUSCH and/or PUCCH transmission. In one example, a DMRS port super group for beam management is transmitted after a PUSCH and/or PUCCH transmission. In another example, a DMRS port super group for beam management is transmitted before a PUSCH and/or PUCCH transmission.

The following embodiments and examples describe a configuration of UL transmissions based on SRS measurements (Component 4):

A gNB can receive and measure SRS and/or DMRS transmissions from a UE wherein the SRS and/or DMRS are transmitted from ports configured by the UE. Based on the measured SRS and/or DMRS, and possibly the MPE associated with each SRS or the reference RS with which the SRS has a spatial relation, the gNB can determine the UL SRS port(s)/DMRS port(s), the UE can use for UL transmission and the DL reference RS to quasi-co-location (QCL) for DL transmission.

For example, a gNB can signal SRS port(s)/DMRS port(s) in a DCI format scheduling a PUSCH transmission. For another example, a gNB can signal or activate UL SRS port(s)/DMRS port(s) in a MAC CE. For yet another example, a gNB can signal the UL SRS port(s)/DMRS port(s) in a beam indication channel/message.

In certain embodiments, a gNB can signal SRS port(s)/DMRS port(s) in a DCI format triggering a PUCCH transmission. For instance, if the PUCCH transmission is on one port and multiple SRS ports/DMRS ports are signaled, the PUCCH transmission is on the first SRS port/DMRS port, wherein first can refer to a port with the lowest index, or to the port at the first position within a corresponding configuration message.

For example, a gNB can signal a reference RS as a QCL source for a DL transmission in a DCI format scheduling of a PDSCH transmission. For another example, a gNB can signal or activate a reference RS as a QCL source for a DL transmission in a MAC CE. For another example, a gNB can signal a reference RS as a QCL source for a DL transmission in a beam indication channel/message. For another example, the gNB can signal or activate UL SRS port(s)/DMRS port(s) in a MAC CE that can be used by a UE for UL transmissions and DL receptions. For yet another example, the gNB can signal in a beam indication channel/message, the UL SRS port(s)/DMRS port(s) that can be used by a UE for UL transmissions and DL receptions.

Figure 17:
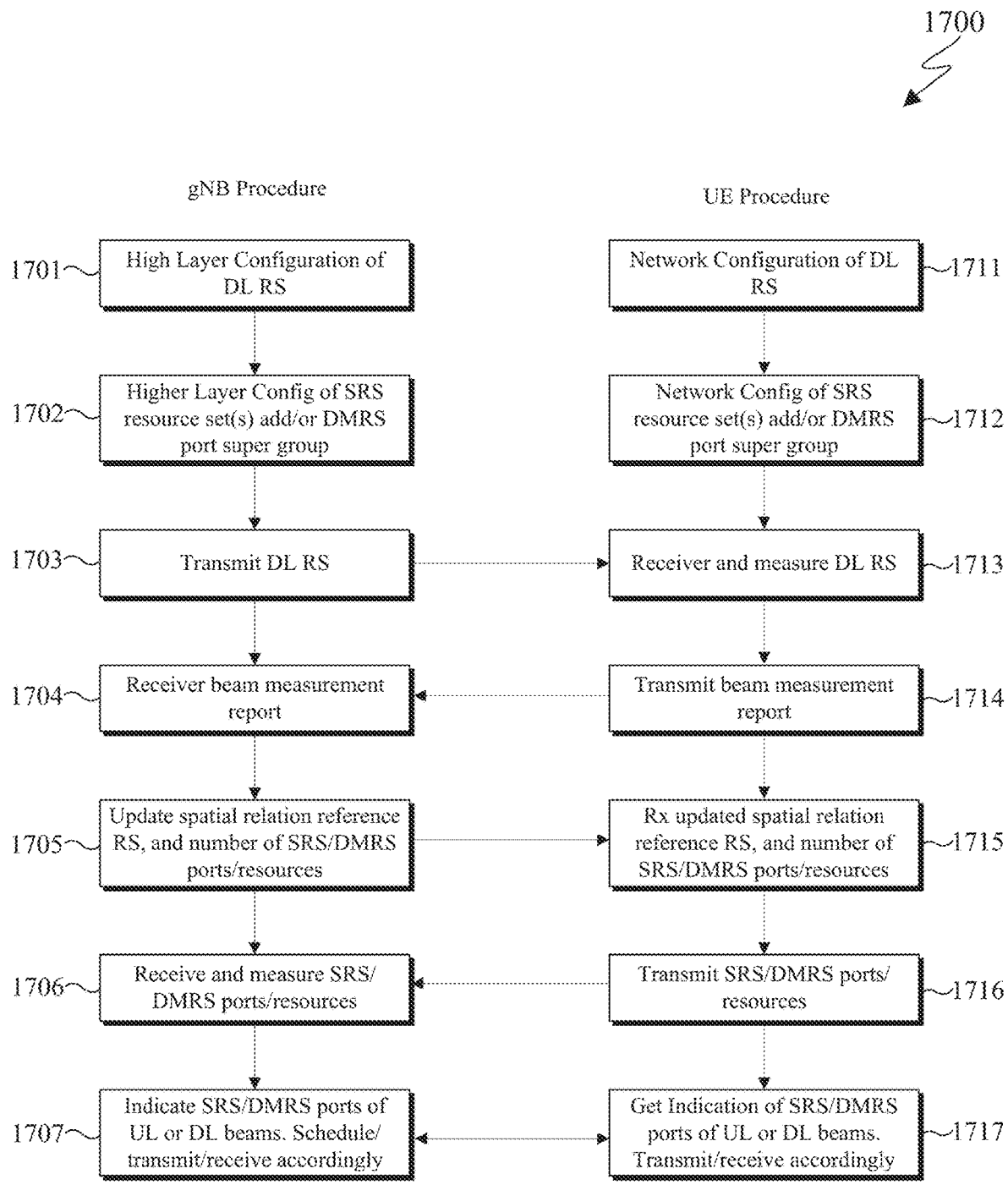
FIG. 17 illustrates an example procedure according to embodiments of the present disclosure.

FIG. 17 illustrates an example method 1700 according to embodiments of the present disclosure. The steps of the method 1700 can be performed by the any of the UEs 111-116 of FIG. 1, such as the UE 116 of FIG. 3. The steps of the method 1700 can also be performed by any of the BSs 101-103 of FIG. 1 such as the BS of FIG. 2. The embodiments of FIG. 17 are for illustration only and other embodiments can be used without departing from the scope of the present disclosure.

FIG. 17 illustrates the method 1700 according to the examples of the earlier described components. For ease of reference, the steps 1701-1707 can be performed by any of the BSs 101-103 of FIG. 1 and the BS 102 of FIG. 2. Similarly, the steps 1711-1717 can be performed by any of the UEs 111-116 of FIG. 1 and the UE 116 of FIG. 3.

In step 1701, higher layers configure to a UE downlink reference signals such as SSB and/or CSI-RS, where an association can be established between a beam (e.g. spatial domain filter) and an ID of a reference RS. The network configuration of the reference signals is provided to a UE in step 1711. The downlink reference signal can provide a Type-D QCL source for downlink channels and signals, and spatial relation source for uplink channels and signals (e.g. SRS resource set(s) and/or DMRS port super groups of step 1702).

In step 1702, higher layers configure SRS resources set(s) and/or DMRS port super groups following the examples of Component 2, above. The network configuration of the SRS resources set(s) and/or DMRS ports super group is provided to a UE in step 1712.

In step 1703, a gNB transmits the DL reference RS (e.g. SSB and/or CSI-RS). In step 1713, a UE can measure the DL reference RS, where a measurement can include a signal strength and/or a signal quality as described in Component 1, above.

In step 1714, a UE provides a measurement report of the DL RS to a gNB following the example of Component 1, above. The measurement report can also include the MPE effect. In step 1704, a gNB receives such a report. A UE can measure the DL reference RS at any time based on a network configuration or according to a UE implementation, and provide measurement results to the network/gNB. The measured results can be provided to the network/gNB at a configured time, and/or when a UE detects a change in channel conditions according to configured conditions. In another example, a UE can send a beam measurement report request (BMRR) to the gNB to be configured with UL resources for reporting the beam measurement.

In step 1705, the gNB determines, for beam management, the SRS/DMRS ports/resources to be transmitted by the UE, and the corresponding reference RS for spatial relation. This is indicated to the UE following the examples of Component 2, above. In step 1715, the UE receives such indications, updates the SRS/DMRS ports/resources accordingly.

In step 1716, the UE transmits the SRS/DMRS ports/resources according to the indication in step 1715 and following the examples of Component 3, above. In step 1706, the gNB receives and measures the transmitted SRS/DMRS ports/resources. Based on the measured SRS/DMRS ports/resources, the gNB determines the SRS/DMRS ports and corresponding reference RS as determined by a spatial relation to be used for transmission and reception of data and control channels, and signals these to the UE in step 1707 following the examples of Component 4, above. The gNB can monitor the SRS/DMRS ports/resources when transmitted by the UE and accordingly update the set of SRS/DMRS ports/resource used for transmission/reception of data/control channels at the gNB and UE in steps 1707 and 1717. Furthermore, the gNB can update SRS/DMRS ports/resources according to step 1705.

In step 1707 and 1717, the gNB and the UE transmit and receive data and/or control channels according to the indicated SRS/DMRS ports/resources.

Although FIG. 17 illustrates the method 1700, various changes may be made to FIG. 17. For example, while method 1700 of FIG. 17 is shown as a series of steps, various steps could overlap, occur in parallel, occur in a different order, or occur multiple times. In another example, steps may be omitted or replaced by other steps. For example, steps of the method 1700 can be executed in a different order. For instance, it is possible that the gNB (such as the BS 102) transmits the DL RS (i.e. step 1703) before the gNB provides to a UE a higher layer configuration of an SRS resource set (step 1702). Furthermore, some steps can be executed concurrently, for instance the UE (such as the UE 116) can receive and measure DL RS (i.e. step 1713), in a same slot where the UE transmits SRS/DMRS ports/resources.

Embodiments of the present disclosure also describes additional design aspects related to uplink beam management. To assist with uplink beam management for a PUCCH transmission in response to a downlink control information (DCI) format (e.g. a PUCCH transmission in response to a PDSCH scheduled by a DCI format, or a PUCCH transmission triggered by a DCI format), a UE can assume for the PUCCH transmission a spatial relation reference RS to be the source RS with QCL Type-D of an indicated TCI state in the DCI format or a separate DCI format dedicated for TCI state update, alternatively a UE may assume an uplink Tx spatial filter for the PUCCH transmission to be that of an SRS port (or SRS resource) of an SRS resource (or SRS resource set) with a spatial relation RS following the source RS with QCL Type-D of the indicated TCI state in the DCI format or a separate DCI format dedicated for TCI state update, wherein, the SRS port (or SRS resource) is indicated to the UE.

To assist with uplink beam management for a PUSCH transmission or PUCCH transmission in response to a DCI format (e.g. a PUSCH transmission scheduled by a DCI format), a UE can assume for the PUSCH transmission or PUCCH transmission a spatial relation reference RS to be the source RS with QCL Type D of an indicated TCI state in the DCI format or a separate DCI format dedicated for TCI state update, alternatively a UE may assume an uplink Tx spatial filter for the PUSCH transmission or PUCCH transmission to be that of an SRS port (or SRS resource) of an SRS resource (or SRS resource set) with a spatial relation RS following the source RS with QCL Type D of the indicated TCI state in the DCI format or a separate DCI format dedicated for TCI state update, wherein, the SRS port (or SRS resource) is indicated to the UE.

Additionally, to assist with uplink beam management for uplink configured transmissions or UE initiated transmissions (e.g. PUSCH configured grant, periodic PUCCH, semi-persistent PUCCH or RACH), a UE can assume for the uplink transmission a spatial relation reference RS to be the source RS with QCL Type D of an indicated TCI state in a DCI format or a separate DCI format dedicated for TCI state update received by the UE before the uplink transmission subject to the UE's processing time restrictions, alternatively a UE may assume an uplink Tx spatial filter for the uplink transmission to be that of an SRS port (or SRS resource) of an SRS resource (or SRS resource set) with a spatial relation RS following the source RS with QCL Type D of the indicated TCI state in a DCI format or a separate DCI format dedicated for TCI state update received by the UE before the uplink transmission, wherein, the SRS port (or SRS resource) is indicated to the UE before the uplink transmission and subject to the UE's processing time restrictions.

Further, to assist with beam management and reduce latency, a UE can indicate in an uplink transmission (e.g. PUSCH or PUCCH) a beam that indicates a preferred beam. The indication can be through explicit signaling or implicit signaling. The presence of a beam indication in an uplink transmission can be enabled or disabled through gNB signaling. In case the beam is multiplexed with other UL control traffic, a field can indicate the presence or absence of the beam indication, furthermore, if the UL control channel payload exceeds the maximum payload, a field in the uplink transmission can indicate the type of payload included in the uplink transmission.

Embodiments of the present disclosure take into consideration that beam management framework can be different for different channels. A beam management framework that is different for different channels increases the overhead of beam management and could lead to less robust beam-based operation. For example, for PUCCH, the spatial relation of a PUCCH resource is updated by MAC CE signaling, which is separate from the framework for the updating the beam indication of downlink channels. This creates unnecessary overhead, and longer latency which reduces the robustness of beam management. As the PUCCH hybrid automatic repeat request-acknowledgement (HARQ-ACK) feedback is associated with a downlink PDSCH transmission, a common beam management framework can be used for PDSCH and PUCCH HARQ-ACK with common signaling.

Additionally, embodiments of the present disclosure take into consideration that a network can be informed of new beam information through a CSI report that includes CSI-RS resource index (CRI) with RSRP and/or SINR information or SSB-index with RSRP information. Such reports can increase the reporting overhead in the uplink and incur some latency. Therefore, to help reduce the overhead and latency at which new beams are reported, embodiments of the present disclosure provide a mechanism to include the beam information with the HARQ-ACK information.

Accordingly, the present disclosure considers design aspects related to uplink beam management, wherein a source RS with QCL Type D of TCI state in a downlink control information (DCI) format or a separate DCI format dedicated for TCI state update is a spatial relation reference RS for an uplink transmission. In one example, the uplink transmission is a PUSCH transmission or PUCCH transmission or PRACH transmission. In another example, the uplink transmission is an SRS transmission, wherein, a PUSCH transmission or PUCCH transmission or PRACH transmission has a same uplink Tx spatial filter as an SRS port/resource of the SRS transmission, and the SRS port/resource of the SRS transmission is indicated to the UE. Furthermore, this disclosure considers the indication of a beam in an uplink PUCCH transmission or PUSCH transmission, wherein the beam indication can be multiplexed with other uplink control information, the presence of the beam indication field or other uplink control information field can be indicated by a field in the payload.

Figure 18:
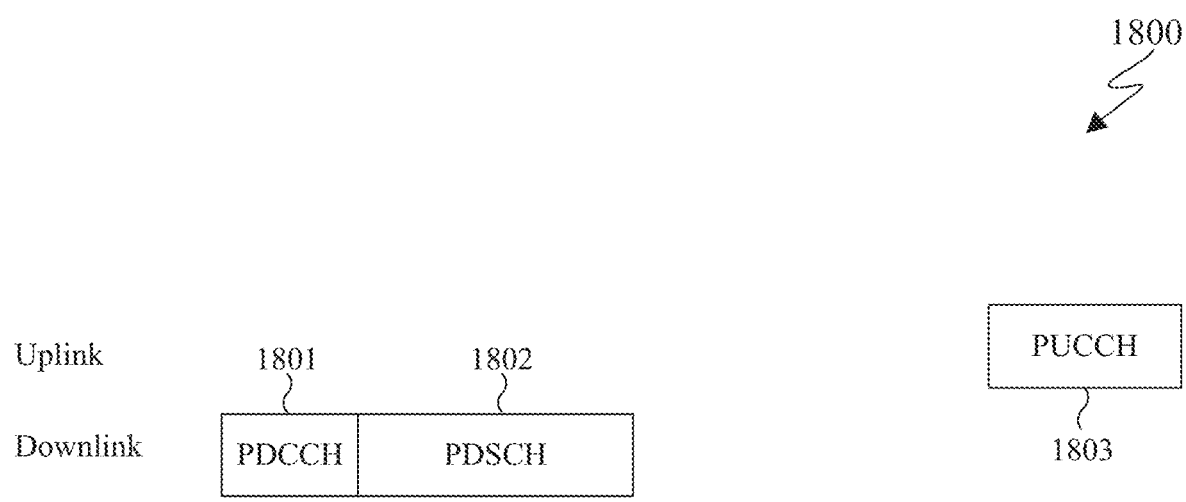
FIG. 18 illustrates an example embodiment of a downlink transmission from a BS to a UE according to embodiments of the present disclosure.

FIG. 18 illustrates an example embodiment 1800 of a downlink transmission from a BS to a UE according to embodiments of the present disclosure. The example embodiment 1800 of FIG. 18 is for illustration only and other embodiments can be used without departing from the scope of the present disclosure.

A downlink transmission on PDSCH (1802) to a UE from a gNB, as illustrated in FIG. 18 can be scheduled by a downlink assignment transmitted on a PDCCH channel (1801). An uplink transmission on a PUCCH channel (1803) from the UE to the gNB carries the HARQ-ACK response to the downlink transmission. Wherein, the HARQ-ACK response indicates an ACK if the downlink PDSCH channel is successfully received, otherwise the HARQ-ACK response indicates a NACK. It is noted that the UE of the embodiment 1800 can be any of the UEs 111-116 of FIG. 1, such as the UE 116 of FIGS. 1 and 3. The gNB of the embodiment 1800 can be any of the BSs 101-103 of FIG. 1 such as the BS of FIGS. 1 and 2.

A downlink assignment on a PDCCH channel can include a transmission configuration indication (TCI) state and a PUCCH resource indicator (PCI). It is noted that, a transmission configuration indication (TCI) is a state that determines a source reference signal (RS) quasi-co-located (QCLed) type D with the DMRS of the PDSCH transmission. Additionally, a PUCCH resource indicator (PCI) determines a PUCCH resource for HARQ-ACK.

The spatial filter of a PUCCH transmission is determined by a spatial relation to a reference RS. The spatial relation information is activated/deactivated by a MAC control element (MAC-CE). In case a UE (such as the UE 116) has beam correspondence, a UE can determine a spatial filter for transmission to a gNB or transmission reception point (TRP) based on a spatial filter used for reception from the gNB/TRP. The UE can determine the spatial filter of the PUCCH TX beam based on the spatial filter used to receive the PDCCH channel and/or the PDSCH channel.

An uplink transmission on PUSCH from a UE to a gNB can be scheduled by an uplink grant transmitted on a PDCCH channel. An uplink grant includes an SRS resource indicator that establishes a spatial relation to a reference RS for the PUSCH transmission. By exploiting the beam correspondence of a UE the UE can determine the spatial filter of the PUSCH TX beam based on the spatial filter used for a downlink TCI state used for the downlink channels.

A UE can be configured with one or more SRS resource sets. An SRS resource set includes one or more SRS resources. An SRS resource can have a spatial relation to a reference RS, such as a synchronization signal/PBCH Block (SSB), a channel state information (CSI)-RS, or another SRS. An SRS resource can include one or more SRS ports. A network can configure an SRS resource set for beam management. By exploiting beam correspondence at the UE, the spatial relation reference RS of an SRS resource or an SRS resource set can follow the source RS with QCL Type-D of a TCI state, wherein the SRS ports or SRS resources can provide additional spatial filter refinement in the uplink.

Figure 19:
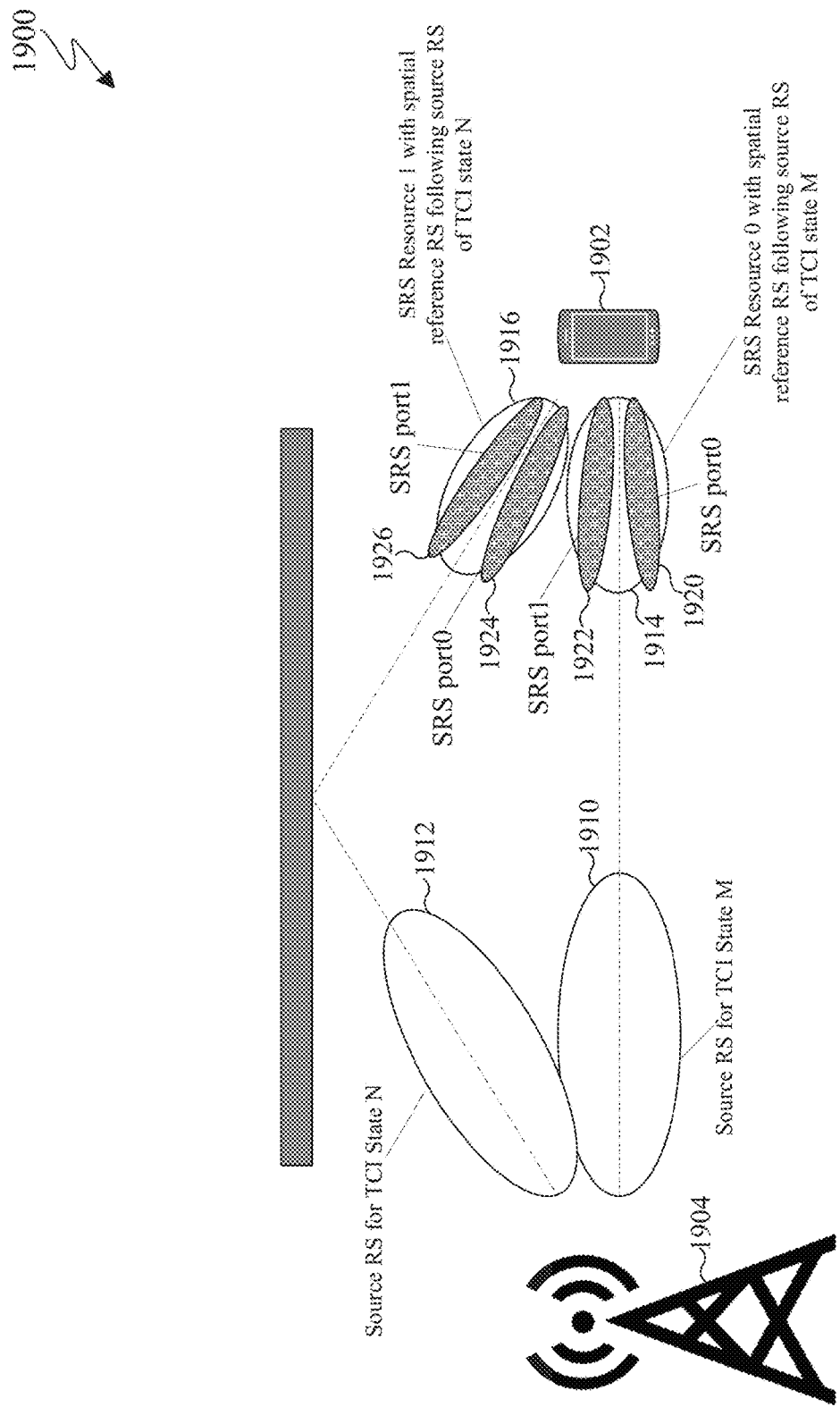
FIG. 19 illustrates an example multi-path environment according to embodiments of the present disclosure.

FIG. 19 illustrates an example multi-path environment 1900 according to embodiments of the present disclosure. The embodiment of FIG. 1900 is similar to the embodiment 1200 of FIG. 12. The example multi-path embodiment 1900 of FIG. 19 is for illustration only and other embodiments can be used without departing from the scope of the present disclosure.

The multi-path environment 1900 includes a UE 1902, which can be similar to any of the UEs of FIG. 1, such as the UE 116. The multi-path environment 1900 also includes a BS 1904 which can be similar to any of the BS of FIG. 1, such as the BS 102.

In a variant of FIG. 19, the multi-path environment includes a first path from a first TRP and a second multi-path from a second TRP, wherein the first TRP and the second TRP belong to a same cell, i.e. have the same physical cell ID (PCI).

As shown in FIG. 19, $q_m$ is the source RS with QCL type D for TCI state M be, and $q_n$ is the source RS with QCL type D for TCI state N. The spatial filter for $q_m$ is 1910, and the spatial filter for $q_n$ is 1912. The UE 1902 is configured with an SRS resource set that includes SRS resource 0 (1914) with a spatial relation reference RS $q_m$, and SRS resource 1 (1916) with a spatial relation reference RS $q_n$. SRS resource 0 includes 2 SRS ports SRS port0 (1920), and SRS port1 (1922), that can provide additional UL beam refinement corresponding to downlink transmissions using TCI state M. Similarly, SRS resource 1 includes 2 SRS ports SRS port0 (1924), and SRS port1 (1926), that can provide additional UL beam refinement corresponding to downlink transmissions using TCI state N.

The following embodiments and examples, it is noted that overlap of two or more would be transmissions refers to overlap in time (partial overlap or full overlap). In the frequency domain, transmissions can have separate frequency resources or partially overlapping frequency resources or fully overlapping frequency resources.

The following embodiments and examples describe an indication of TCI state or spatial relation for UL Transmission (Component 5):

In some of the embodiments and examples described below with respect to Component 5, a network/gNB can configure a UE with SRS resources or SRS resource sets that have an association to a TCI state. The spatial relation reference RS for the SRS resource or the SRS resource set is the source RS with QCL type D of the TCI state. Alternatively, the spatial Tx filter for the SRS resource or the SRS resource set is based on the spatial Rx filter of the TCI state.

In a variant, a network/gNB can configure a UE with DMRS port groups or DMRS port super groups that have an association to a TCI state. The spatial relation reference RS for the DMRS port group or the DMRS port super group is the source RS with QCL type D of the TCI state. Alternatively, the spatial Tx filter for the DMRS port group or the DMRS port super group is based on the spatial Rx filter of the TCI state.

In certain embodiments (referred to as Example 1.1), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for a corresponding PUCCH transmission.

In certain embodiments (referred to as Example 1.2), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for an SRS resource (termed the SRS resource A). A spatial relation for a corresponding PUCCH transmission can be indicated according to one or more of the following examples.

For example (denoted as Example 1.2.1), the spatial relation of the PUCCH resource is that of an SRS port included in SRS resource A, wherein the SRS port index is included in the downlink DCI format, or a separate DCI format dedicated for TCI state update.

For another example (denoted as Example 1.2.2), the spatial relation of the PUCCH resource is that of an SRS port included in SRS resource A, wherein the SRS port index is included in the TCI state signaled in the TCI state update (whether via a DL-related DCI format or a separate DCI format dedicated for TCI state update).

For another example (denoted as Example 1.2.3), the spatial relation of the PUCCH resource is that of an SRS port included in SRS resource A., wherein the SRS port index is included in the PUCCH resource index. Each resource in the PUCCH resource set includes an SRS port index. TABLE 1 illustrates an example of including an SRS port index in a PUCCH resource, where, in this example, an SRS resource has two SRS port indices. This is illustrated by way of example in TABLE 1.

TABLE 1

A PUCCH resource set with an SRS Port index
included with the PUCCH resource

| PUCCH Resource Index | SRS Port Index |
|---|---|
| 0 | Port index 0 |
| 1 | Port index 0 |
| 2 | Port index 0 |
| 3 | Port index 0 |
| 4 | Port index 1 |
| 5 | Port index 1 |
| 6 | Port index 1 |
| 7 | Port index 1 |

It is noted that the size of the PUCCH resource set can be increased to include more resources. For instance, the size can be increased to 16 elements, and the PCI index field in the DCI format is increased from 3 to 4 bits. In case of PUCCH format 0, or PUCCH format 1, where the size of the PUCCH resource set is 32, with 2 bits indicated implicitly, the size of the PUCCH resource set can be increased to 64, i.e. 4-bit PCI with 2-bits indicated implicitly.

Figure 20A:
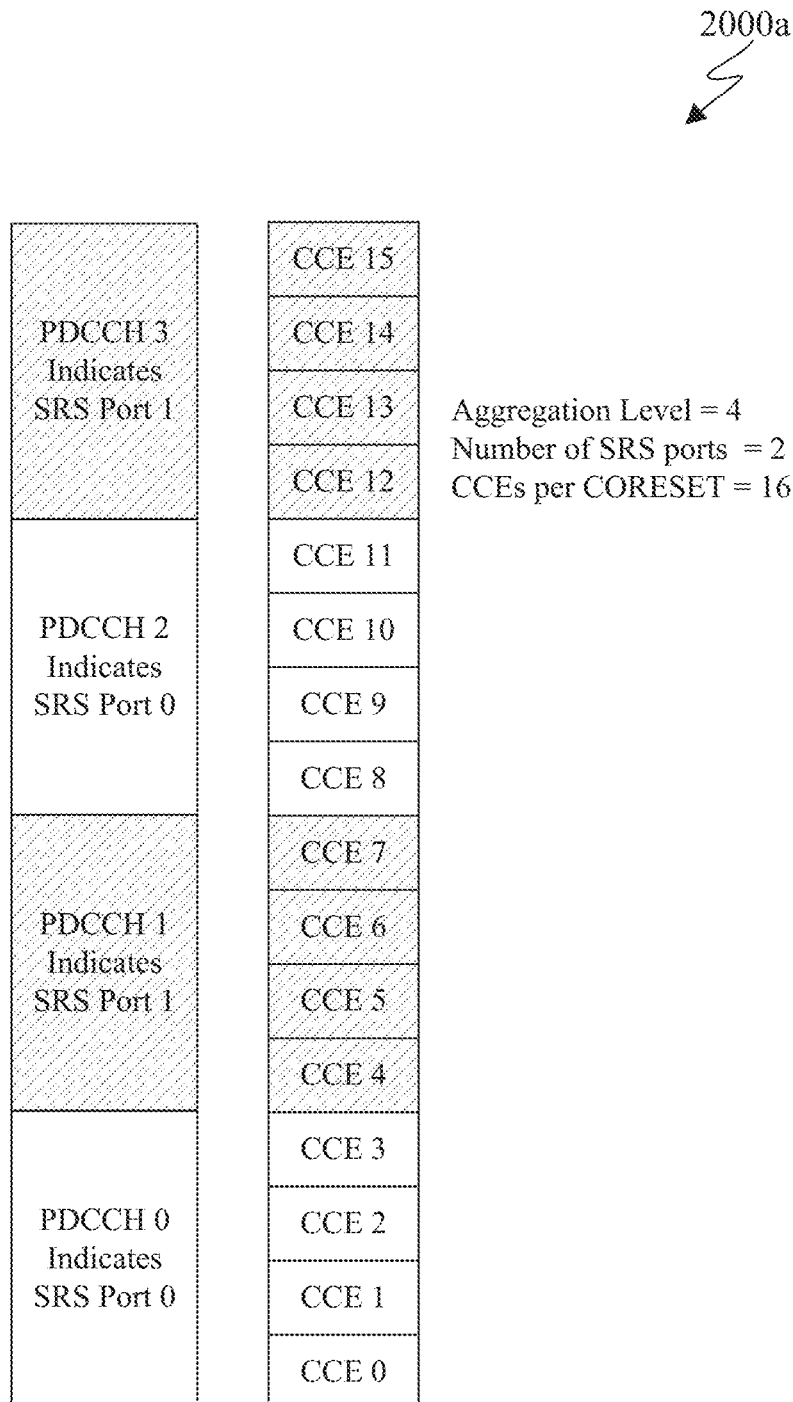
FIGS. 20A and 20B illustrate example SRS ports according to embodiments of the present disclosure.
Figure 20B:
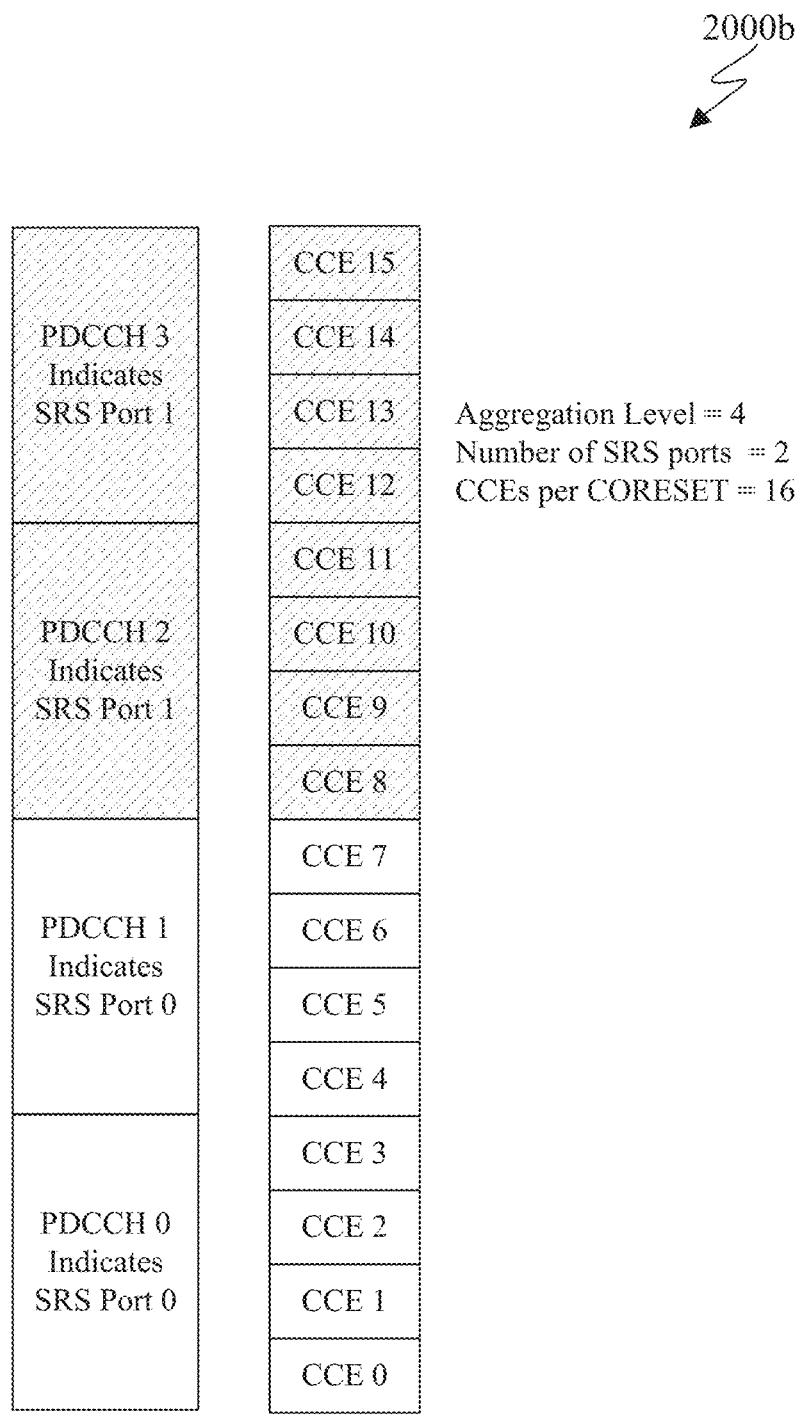
Figure 21A:
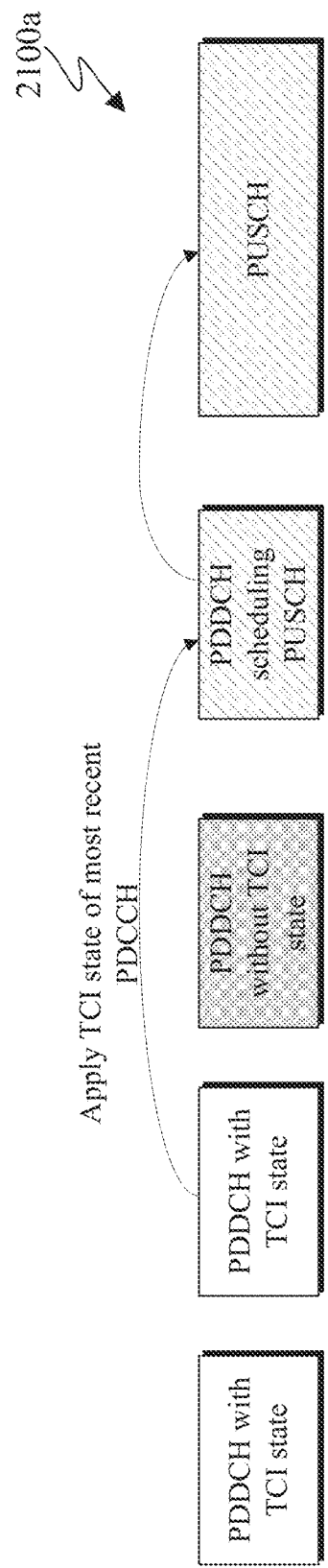
Figure 21B:
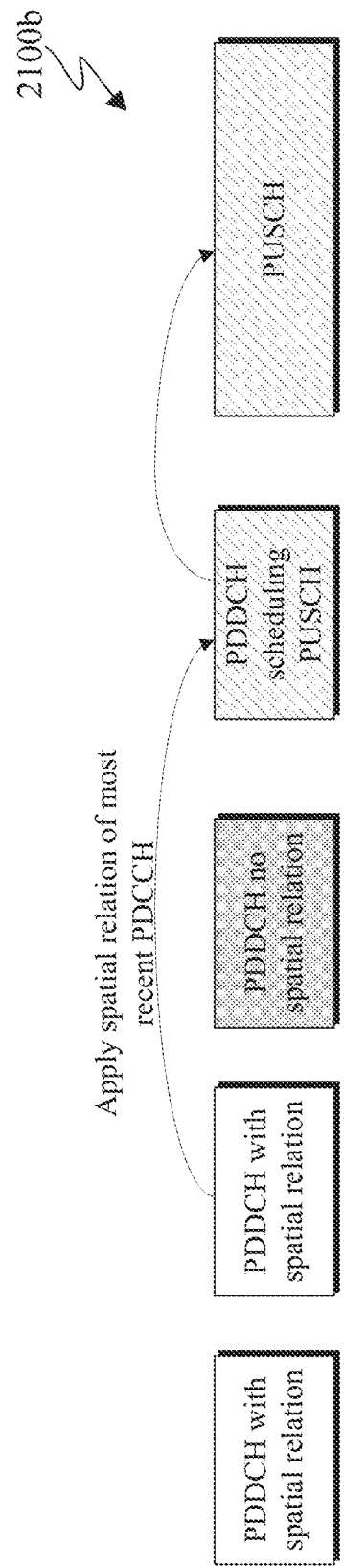

For another example (denoted as Example 1.2.4), the spatial relation of the PUCCH resource is that of an SRS port included in SRS resource A, wherein the SRS port index is implicitly indicated (i.e. the SRS port index can be derived from another signaling and/or another system parameter value). For example, the SRS port index can be implicitly indicated based on the starting control channel element (CCE) of the corresponding PDDCH. For example with two SRS ports, as illustrated in the embodiment 2000a of FIG. 20A, a PDCCH with floor (starting CCE/aggregation level) odd uses one SRS port index, while a PDCCH with floor (starting CCE/aggregation level) even uses another SRS port index. In another example with two SRS ports, as illustrated in the embodiment 2000b of FIG. 20B, a PDCCH with a starting CCE in the first half of a CORESET uses one SRS port index, while a PDCCH with a starting CCE in the second half of a CORESET uses another SRS port index. It is noted that the FIGS. 20A and 20B illustrate example SRS ports according to embodiments of the present disclosure. The example embodiments FIGS. 20A and 20B are for illustration only and other embodiments can be used without departing from the scope of the present disclosure.

For another example (denoted as Example 1.2.5), the spatial relation of the PUCCH resource is that of an SRS port included in SRS resource A, wherein the SRS port index is indicated/updated by a MAC CE.

For another example (denoted as Example 1.2.6), the number of SRS ports and/or SRS port indices included in an SRS resource (e.g. SRS resource A), can be updated by higher layer RRC signaling and/or MAC CE signaling and/or L1 control signaling. The size of the corresponding field in the DCI format for indication of the SRS port can be updated accordingly, or the implicit mapping rule can take into account the updated number of SRS ports to include for implicit mapping for the updated number of SRS ports.

For another example (denoted as Example 1.2.7), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for a DMRS port group. A spatial relation for a corresponding PUCCH transmission can be indicated according to one or more of the previous examples, such as Examples 1.2.1 through 1.2.6, wherein an SRS port is replaced by a DMRS port.

For another example (denoted as Example 1.2.8), a PUCCH transmission for HARQ-ACK can overlap another PUCCH transmission, wherein, the HARQ-ACK information and other UL control information are included in a PUCCH resource, and the spatial relation of the PUCCH resource can be determined according to examples 1.2.1 through 1.2.7.

For yet another example (denoted as Example 1.2.9), a PUCCH transmission for HARQ-ACK can overlap a PUSCH transmission, wherein, the HARQ-ACK information is multiplexed on PUSCH, and the spatial relation of the PUSCH transmission can be determined according to examples 1.2.1 to 1.2.7.

In certain embodiments (referred to as Example 1.3), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for an SRS resource set (termed the SRS resource set A). A spatial relation for a corresponding PUCCH transmission can be indicated according to one or more of the following examples.

For example (denoted as Example 1.3.1), the spatial relation of the PUCCH resource is that of an SRS resource included in SRS resource set A, wherein the SRS resource index is included in the downlink DCI format, or a separate DCI format dedicated for TCI state update.

For another example (denoted as Example 1.3.2), the spatial relation of the PUCCH resource is that of an SRS resource included in SRS resource set A, wherein the SRS resource index is included in the TCI state signaled in the TCI state update (whether via a DL-related DCI format or a separate DCI format dedicated for TCI state update).

For another example (denoted as Example 1.3.3), the spatial relation of the PUCCH resource is that of an SRS resource included in SRS resource set A, wherein the SRS resource index is included in the PUCCH resource index, wherein each resource in the PUCCH resource set includes an SRS resource index. TABLE 2, below, illustrates an example of including an SRS resource index in a PUCCH resource, where, in this example, an SRS resource set has two SRS resources. This is illustrated by way of example in TABLE 2.

TABLE 2

A PUCCH resource set with an SRS resource
index included with the PUCCH resource

| PUCCH Resource Index | SRS Resource |
|---|---|
| 0 | Resource index 0 |
| 1 | Resource index 0 |
| 2 | Resource index 0 |
| 3 | Resource index 0 |
| 4 | Resource index 1 |
| 5 | Resource index 1 |
| 6 | Resource index 1 |
| 7 | Resource index 1 |

The size of the PUCCH resource set can be increased to include more resources, for example, the size can be increased to 16 elements, and the PCI index field in the DCI format is increased from 3 to 4 bits. In case of PUCCH format 0, or PUCCH format 1, where the size of the PUCCH resource set is 32, with 2 bits indicated implicitly, the size of the PUCCH resource set can be increased to 64, i.e. 4-bit PCI with 2-bits indicated implicitly.

For another example (denoted as Example 1.3.4), the spatial relation of the PUCCH resource is that of an SRS resource included in SRS resource set A, wherein the SRS resource index is implicitly indicated (i.e. the SRS resource index can be derived from another signaling and/or another system parameter value).

For another example (denoted as Example 1.3.5), the spatial relation of the PUCCH resource is that of an SRS resource included in SRS resource set A, wherein the SRS resource index is indicated/updated by a MAC CE.

For another example (denoted as Example 1.3.6), the number of SRS resources and/or SRS resource indices included in an SRS resource set (e.g. SRS resource set A), can be updated by higher layer RRC signaling and/or MAC CE signaling and/or L1 control signaling. The size of the corresponding field in the DCI format for indication of the SRS resource can be updated accordingly, or the implicit mapping rule can take into account the updated number of SRS resources to include for implicit mapping for the updated number of SRS resources.

For another example (denoted as Example 1.3.7), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for a DMRS port super group. A spatial relation for a corresponding PUCCH transmission can be indicated according to one or more of the previous examples, such as Examples 1.3.1 through 1.3.6, wherein an SRS resource is replaced by a DMRS port group.

For another example (denoted as Example 1.3.8), a PUCCH transmission for HARQ-ACK overlaps another PUCCH transmission. The HARQ-ACK information and other UL control information can be included in a PUCCH resource. The spatial relation of the PUCCH resource can be determined according to examples 1.3.1 through 1.3.7.

For yet another example (denoted as Example 1.3.9), a PUCCH transmission for HARQ-ACK can overlap a PUSCH transmission, The HARQ-ACK information can be multiplexed on PUSCH. The spatial relation of the PUSCH transmission can be determined according to examples 1.3.1 through 1.3.7.

In certain embodiments (referred to as Example 1.4), a DCI Format with a CSI request, includes a TCI state. The source RS, with Type D QCL as indicated by a TCI state in the DCI format, or a separate DCI format dedicated for TCI state update, is a spatial relation reference RS for a corresponding PUCCH transmission.

For example (denoted as Example 1.4.1), a PUCCH transmission for CSI overlaps another PUCCH transmission, wherein, the CSI information and other UL control information are included in a PUCCH resource, and the spatial relation of the PUCCH resource can be determined according to the source RS, with Type D QCL as indicated by a TCI state in the DCI format, or a separate DCI format dedicated for TCI state update.

For yet another example (denoted as Example 1.4.2), a PUCCH transmission for CSI overlaps a PUSCH transmission. The CSI can be multiplexed on PUSCH. The spatial relation of the PUSCH transmission can be determined according to the source RS, with Type D QCL as indicated by a TCI state in the DCI format, or a separate DCI format dedicated for TCI state update.

In certain embodiments (referred to as Example 1.5), a DCI Format with a CSI request, includes a TCI state. The source RS, with Type D QCL as indicated by a TCI state in the DCI format, or a separate DCI format dedicated for TCI state update, is a spatial relation reference RS for an SRS resource (termed the SRS resource A). A spatial relation for a corresponding PUCCH transmission can be indicated according to one or more of the following examples.

For example (denoted as Example 1.5.1), the spatial relation of the PUCCH resource is that of an SRS port included in SRS resource A. The SRS port index is included in the DCI format, or a separate DCI format dedicated for TCI state update.

For another example (denoted as Example 1.5.2), the spatial relation of the PUCCH resource is that of an SRS port included in SRS resource A. The SRS port index can be included in the TCI state signaled in the TCI state update (whether via a DL-related DCI format or a separate DCI format dedicated for TCI state update).

For another example (denoted as Example 1.5.3), the spatial relation of the PUCCH resource is that of an SRS port included in SRS resource A. The SRS port index can be implicitly indicated. For instance, the SRS port index can be derived from another signaling and/or another system parameter value.

For another example (denoted as Example 1.5.4), the spatial relation of the PUCCH resource is that of an SRS port included in SRS resource A. The SRS port index is indicated/updated by a MAC CE.

For another example (denoted as Example 1.5.5), the number of SRS ports and/or SRS port indices included in an SRS resource (e.g. SRS resource A), can be updated by higher layer RRC signaling and/or MAC CE signaling and/or L1 control signaling. The size of the corresponding field in the DCI format for indication of the SRS port can be updated accordingly, or the implicit mapping rule can take into account the updated number of SRS ports to include for implicit mapping for the updated number of SRS ports.

For another example (denoted as Example 1.5.6), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for a DMRS port group. A spatial relation for a corresponding PUCCH transmission can be indicated according to one or more of the previous examples, such as Examples 1.5.1 through 1.5.5, wherein an SRS port is replaced by a DMRS port.

For another example (denoted as Example 1.5.7), a PUCCH transmission for CSI overlaps another PUCCH transmission. The CSI and other UL control information can be included in a PUCCH resource, and the spatial relation of the PUCCH resource can be determined according to the examples 1.5.1 through 1.5.6.

For yet another example (denoted as Example 1.5.8), a PUCCH transmission for CSI overlaps a PUSCH transmission. The CSI is multiplexed on PUSCH, and the spatial relation of the PUSCH transmission can be determined according to examples 1.5.1 through 1.5.6.

In certain embodiments (referred to as Example 1.6), a DCI Format with a CSI request, includes a TCI state. The source RS, with Type D QCL as indicated by a TCI state in a DCI format, or a separate DCI format dedicated for TCI state update, is a spatial relation reference RS for an SRS resource set (termed the SRS resource set A). A spatial relation for a corresponding PUCCH transmission can be indicated according to one or more of the following examples.

For example (denoted as Example 1.6.1), the spatial relation of the PUCCH resource can be that of an SRS resource included in SRS resource set A, wherein the SRS resource index is included in the DCI format, or a separate DCI format dedicated for TCI state update.

For another example (denoted as Example 1.6.2), the spatial relation of the PUCCH resource can be that of an SRS resource included in SRS resource set A. The SRS resource index can be included in the TCI state signaled in the TCI state update (whether via a DL-related DCI format or a separate DCI format dedicated for TCI state update).

For another example (denoted as Example 1.6.3), the spatial relation of the PUCCH resource can be that of an SRS resource included in SRS resource set A. The SRS resource index can be implicitly indicated (i.e. the SRS resource index can be derived from another signaling and/or another system parameter value).

For another example (denoted as Example 1.6.4), the spatial relation of the PUCCH resource is that of an SRS resource included in SRS resource set A, wherein the SRS resource index is indicated/updated by a MAC CE.

For another example (denoted as Example 1.6.5), the number of SRS resources and/or SRS resource indices included in an SRS resource set (e.g. SRS resource set A), can be updated by higher layer RRC signaling and/or MAC CE signaling and/or L1 control signaling. The size of the corresponding field in the DCI format for indication of the SRS resource can be updated accordingly, or the implicit mapping rule can take into account the updated number of SRS resources to include for implicit mapping for the updated number of SRS resources.

For another example (denoted as Example 1.6.6), the source RS, with Type D QCL as indicated by a TCI state in a DL DCI format (e.g. DCI Format 1_0 or DCI Format 1_1 or DCI Format 1_2), or a separate DCI format dedicated for TCI state update, is a spatial relation reference RS for a DMRS port super group. A spatial relation for a corresponding PUCCH transmission can be indicated according to one or more of the Examples 1.6.1 through 1.6.5, wherein an SRS resource is replaced by a DMRS port group.

For another example (denoted as Example 1.6.7), a PUCCH transmission for CSI can overlap another PUCCH transmission. The CSI and other UL control information can be included in a PUCCH resource, and the spatial relation of the PUCCH resource can be determined according to the above described Examples 1.6.1 through 1.6.6.

For yet another example (denoted as Example 1.6.8), a PUCCH transmission for CSI overlaps a PUSCH transmission. The CSI can be multiplexed on PUSCH, and the spatial relation of the PUSCH transmission can be determined according to the above described Examples 1.6.1 through 1.6.6.

In certain embodiments (referred to as Example 1.7), a DCI Format for scheduling a PUSCH transmission, includes a TCI state, wherein a spatial relation for a corresponding PUSCH transmission can be indicated and determined similar to the above described examples 1.4, 1.5, and 1.6, where the PUSCH transmission replaces a PUCCH transmission.

FIGS. 21A, 21B, 21C, and 21D illustrate example embodiments of UEs determining special relationships according to embodiments of the present disclosure. The example embodiments FIGS. 21A, 21B, 21C, and 21D are for illustration only and other embodiments can be used without departing from the scope of the present disclosure.

In certain embodiments (referred to as Example 1.8), a DCI format for scheduling a PUCCH transmission or a PUSCH transmission does not include a TCI state, but rather includes or indicates an SRS port index or an SRS resource index. Following examples 1.5 or 1.6, described above, a UE (such as the UE 116 of FIGS. 1 and 3) can determine a spatial relation for a corresponding PUCCH transmission or PUSCH transmission based on the indicated SRS port index or SRS resource index and the TCI state included in the most recent PDCCH reception, that includes a TCI state, with respect to the time of the reception of the DCI format scheduling the PUCCH transmission or the PUSCH transmission. This is illustrated in embodiment 2100a of FIG. 21A.

In a variant, a DCI format for scheduling a PUCCH transmission or a PUSCH transmission does not include a TCI state, but includes or indicates a DMRS port index or a DMRS port group index.

In certain embodiments (referred to as Example 1.9), a DCI format for scheduling a PUCCH transmission or a PUSCH transmission does not include a TCI state and does not include or indicate an SRS port index or an SRS resource index. A UE (such as the UE 116 of FIGS. 1 and 3) can determine a spatial relation for a corresponding PUCCH transmission or PUSCH transmission based on the spatial relation determined by the most recent PDCCH reception, that determines a spatial relation for an uplink transmission, with respect to the time of the reception of the DCI format scheduling the PUCCH transmission or the PUSCH transmission. This is illustrated in embodiment 2100b of FIG. 21B.

In a variant, a DCI format for scheduling a PUCCH transmission or a PUSCH transmission does not include a TCI state, and does not include or indicate a DMRS port index or a DMRS port group index. A UE can determine a spatial relation for a corresponding PUCCH transmission or PUSCH transmission based on the spatial relation determined by the most recent PDCCH reception, that determines a spatial relation for an uplink transmission, with respect to the time of the reception of the DCI format scheduling the PUCCH transmission or the PUSCH transmission.

In certain embodiments (referred to as Example 1.10), an uplink transmission is an uplink transmission without a grant, such as a periodic PUCCH transmission, a semi-persistent PUCCH transmission, a PUSCH configured grant transmission, or a RACH transmission. A UE can determine a spatial relation for a corresponding UL transmission based on the spatial relation determined by the most recent PDCCH reception, based on the earlier examples, that determines a spatial relation for an uplink transmission, that is earlier than the UL transmission time by at least the UE processing latency time. This is illustrated in embodiment 2100c of FIG. 21C.

In certain embodiments (referred to as Example 1.11), an uplink transmission is an uplink transmission without a grant, such as a periodic PUCCH transmission, a semi-persistent PUCCH transmission, a PUSCH configured grant transmission, or a RACH transmission. A UE can determine a spatial relation for a corresponding UL transmission based on the spatial relation determined by the most recent PDCCH reception, based on the earlier examples, corresponding to an uplink transmission that starts at or earlier than the uplink transmission without a grant, and subject to the UE's processing time restrictions. This is illustrated in embodiment 2100d of FIG. 21D.

The following embodiments and examples describe updating of spatial relation or TCI state in PUCCH (Component 6):

Embodiments of the present disclosure describe that a UE can update the TCI state or spatial relation in a PUCCH transmission with HARQ-ACK information corresponding to a downlink transmission, in order to reduce the latency associated with beam switching.

In certain embodiments (referred to as Example 2.1), a PUCCH transmission includes a HARQ-ACK. Additionally, a PUCCH transmission includes a field that indicates a TCI state and/or a spatial relation reference RS for a downlink transmission and/or an uplink transmission.

For example, (denoted as Example 2.1.1), a UE (such as the UE 116 of FIGS. 1 and 3) can be configured with a set of TCI states. For instance, the set of TCI states has M TCI state elements, where $N=\lceil \log_2 M \rceil$. The PUCCH transmission includes an N-bit field that indicates a preferred TCI state. The set of M TCI states can be updated by higher layer RRC signaling and/or MAC-CE signaling and/or L1 control signaling. The N-bit field corresponds to a code-point in the updated TCI state set. For example, if the set of M TCI states configured is $\{T_0, T_1, T_2, T_3\}$, an N bit field can correspond to the TCI states according to TABLE 3, below. The set of TCI states that can be indicated in PUCCH can be a subset of the set of TCI states that are used for beam indication in PDCCH.

TABLE 3

Mapping N bit field to a set of M TCI states

| N bit field | TCI State |
|---|---|
| 00 | $T_0$ |
| 01 | $T_1$ |
| 10 | $T_2$ |
| 11 | $T_3$ |

For instance, referring to TABLE 3, "10" would indicate TCI state $T_2$.

If the M TCI states is updated to $\{T_0, T_1, T_4, T_5\}$, such that the mapping to the N bit field is according to TABLE 4, shown below.

TABLE 4

Updated mapping N bit field to a set of M TCI states

| N bit field | TCI State |
|---|---|
| 00 | $T_0$ |
| 01 | $T_1$ |
| 10 | $T_4$ |
| 11 | $T_5$ |

For instance, referring to TABLE 4, "10" would indicate TCI state $T_4$.

For another example, (denoted as Example 2.1.2), a UE can be configured with a set of spatial relation reference RS resources. For instance, the set of spatial relation reference RS resources has M spatial relation reference RS resources, where $N=\lceil \log_2 M \rceil$. The PUCCH transmission includes an N-bit field that indicates a preferred spatial relation reference RS. The set of M spatial relation reference RS resources can be updated by higher layer RRC signaling and/or MAC-CE signaling and/or L1 control signaling. The N-bit field corresponds to a code-point in the updated TCI state set.

For another example, (denoted as Example 2.1.3), a UE can include, in a PUCCH transmission for HARQ-ACK, a field for beam indication (i.e. spatial filter indications), wherein, the field consists of multiple sub-fields, and each sub-field follows one of the above discussed examples such as examples of 2.1.1 and 2.1.2. For instance, the field for beam indication can include two sub-fields, wherein, a first sub-field can be an indication of a preferred TCI state following example 2.1.1 for a downlink transmission, and a second sub-field can be an indication of a preferred spatial relation reference RS following example 2.1.2 for an uplink transmission.

For another example, (denoted as Example 2.1.4), the presence of a field for a beam indication in a PUCCH that includes a HARQ-ACK can be enabled and/or disabled by higher layer RRC signaling and/or MAC-CE signaling and/or L1 signaling.

For another example, (denoted as Example 2.1.5), a field for beam indication can be transmitted once every K slots/subframes/frames in a PUCCH transmission with HARQ-ACK. It is noted that K can be configured and/or updated to a UE by higher layer RRC signaling and/or MAC-CE signaling and/or L1 signaling. For instance, a UE can determine an index i for a such slot/subframe/frame, if i is the first index of a PUCCH transmission with HARQ-ACK at or after a slot/subframe/frame with index j, such that (j+O) mod K=0. Where, O is an offset that can be configured and/or updated to a UE by higher layer RRC signaling and/or MAC-CE signaling and/or L1 signaling. An example is illustrated in FIG. 22.

Figure 22:
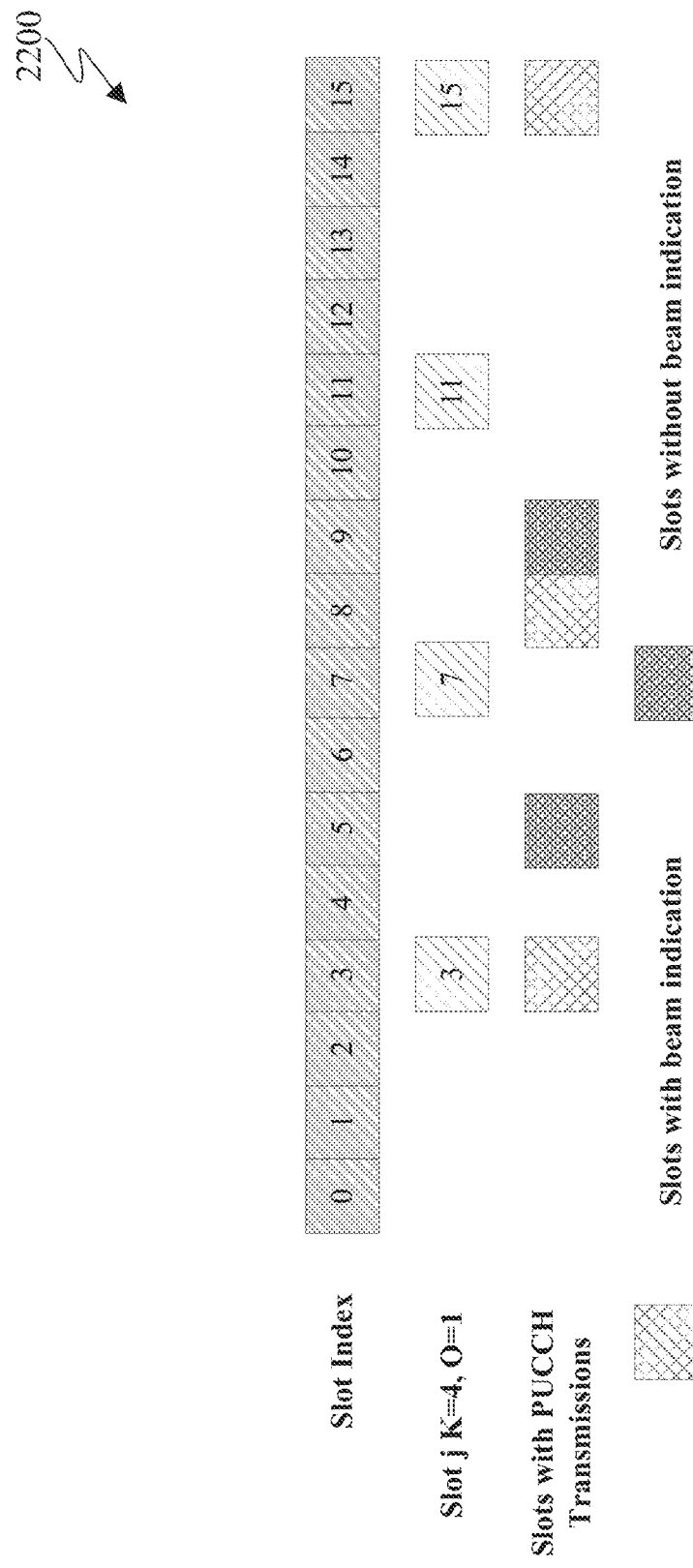
FIG. 22 illustrates an example embodiment of an offset according to embodiments of the present disclosure.

FIG. 22 illustrates an example embodiment 2200 of an offset according to embodiments of the present disclosure. The example embodiment 2200 of FIG. 22 is for illustration only and other embodiments can be used without departing from the scope of the present disclosure.

In this example, as shown in FIGS. 22, K=4 and O=1, the slots corresponding to index j are; $\{3, 7, 11, \ldots\}$. The slots corresponding to index i, where a beam indication can be transmitted are the first slot starting at or after a slot with index j that includes HARQ-ACK information. In a variant, a slot/subframe/frame with index j, can be determined such that (j) mod K=O.

In certain embodiments (referred to as Example 2.2), PUCCH transmission includes a HARQ-ACK and beam indication field with N-bits following the examples of example 2.1. A UE is configured with $2^N$ PUCCH resources for HARQ-ACK. A UE indicates the N-bits of beam indication by selection of a PUCCH resource, within the set of $2^N$ PUCCH resources. For example, if N=2. The UE is configured a set of 4 PUCCH resources, i.e. Resource0, Resource1, Resource2 and Resource3. The UE can signal the beam indication field by selection of the corresponding PUCCH resource for example, according to TABLE 5, below.

TABLE 5

Beam indication through selection of PUCCH resource

| Beam Indication (2-bits) | PUCCH Resource |
|---|---|
| 00 | Resource0 |
| 01 | Resource1 |
| 10 | Resource2 |
| 11 | Resource3 |

It is noted that the gNB can perform multiple decoding hypothesis to determine the resource transmitted by the UE.

In a variant, M PUSCH resources are configured for HARQ-ACK, wherein $M \leq 2^N$ and only M beam indications can be signaled by the N-bits beam indication field.

In certain embodiments (referred to as Example 2.3), a PUCCH transmission includes a HARQ-ACK. A UE determines if there is a change in preferred beam to be signaled to a gNB. If there is a change in preferred beam, the UE signals the preferred beam following the examples of example 2.1. Otherwise, there is no change in preferred beam, the beam indication is not included in the PUCCH transmissions. In this example, the UE can decide which one of two PUCCH resources it can transmit, a first PUCCH resource that includes a HARQ-ACK and a beam indication or a second PUCCH resource that includes a HARQ-ACK. The gNB can perform multiple decoding hypothesis to determine the resource transmitted by the UE.

In certain embodiments (referred to as Example 2.4), a PUCCH transmission includes a HARQ-ACK and beam indication field with N-bits following the examples of example 2.1. The size of the PUCCH transmission in bits is $S_{ACK}+N+1$. Where, $S_{ACK}$ is the size of the HARQ-ACK report. A UE determines if there is a change in preferred beam to be signaled to a gNB.

If there is a change in preferred beam, the content of the PUCCH payload is described in TABLE 6, below. The payload includes: presence indication, $S_{ACK}$ bits for the beam the indication report, and N bits for beam indication. It is noted that the presence indication uses one bit to indicate that beam indication is included, e.g. this bit can have a value of "1".

If there is no change in preferred beam, the content of the PUCCH payload is described in the fourth row of TABLE 6, below. The payload would then include: presence indication, $S_{ACK}$ bits for the beam the indication report, and N bits for beam indication are set to a pre-determined value, for example, they can be set to "0". It is noted that the presence indication: One bit to indicate that beam indication is not included, e.g. this bit can have a value of"0".

TABLE 6

PUCCH payload, with presence indicator, HARQ-ACK information and beam indication

| Presence indicator | HARQ-ACK information | Beam Indication |
|---|---|---|
| 1 bit | $S_{ACK}$ bits | N bits |
| "1" | HARQ-ACK information | Beam Indication |
| "0" | HARQ-ACK information | All zeros |

A gNB can decode a PUCCH resource and based on the value of the presence indication it can determine if the beam indication field is present, or if it is set to a predetermined value (e.g. all zero). If set to a predetermined valued, it can use the predetermined value to enhance the decoding performance of the HARQ-ACK report.

For example, (denoted as Example 2.4.1), a PUCCH payload, in addition to the presence indication, the HARQ-ACK report and the beam indication, can include other fields such CSI report, scheduling request, and other L1 control fields.

For example, (denoted as Example 2.4.2), a UE determines a maximum size for a PUCCH transmission, and if the PUCCH payload exceeds the maximum size, the UE can drop PUCCH fields following certain rules, starting with lowest priority fields, e.g. lowest priority CSI. The UE may drop the HARQ-ACK report (or part it), or it may drop N-bit TCI field as indicated by the presence indicator.

For instance, if the size of the PUCCH payload is 5 bits, the $S_{ACK}$=3, and N=4. The presence indicator can determine the content of the PUCCH payload according to TABLE 7, below.

TABLE 7

PUCCH payload according to one example.

| Presence indicator | HARQ-ACK information | Beam Indication |
|---|---|---|
| 1 bit | $S_{ACK}$ bits | N bits |
| "1" | No HARQ-ACK Info-0 bits | Beam Indication-4 bits |
| "0" | HARQ-ACK info-3 bits | "0"-1 bit |

For another instance, if the size of the PUCCH payload is 6 bits, the $S_{ACK}$=5, and N=4. The presence indicator can determine the content of the PUCCH payload according to TABLE 8, below.

TABLE 8

PUCCH payload according to one example.

| Presence indicator | HARQ-ACK information | Beam Indication |
|---|---|---|
| 1 bit | $S_{ACK}$ bits | N bits |
| "1" | No/partial HARQ-ACK Info-1 bit Bit can be set to 0, or 1 bit of HARQ-ACK info | Beam Indication-4 bits |
| "0" | HARQ-ACK info-5 bits | No information-0 bits |

In another example 2.5, a would be PUCCH transmission that can include HARQ-ACK information and a beam indication, overlaps in time with a PUSCH transmission. The uplink control information that can include HARQ-ACK information and/or beam indication according to the previous examples of component 2, can be multiplexed on the PUSCH transmission, with no PUCCH transmission. In variant, the PUCCH and PUSCH transmissions can be transmitted simultaneously, on different frequency resources.

Figure 23:
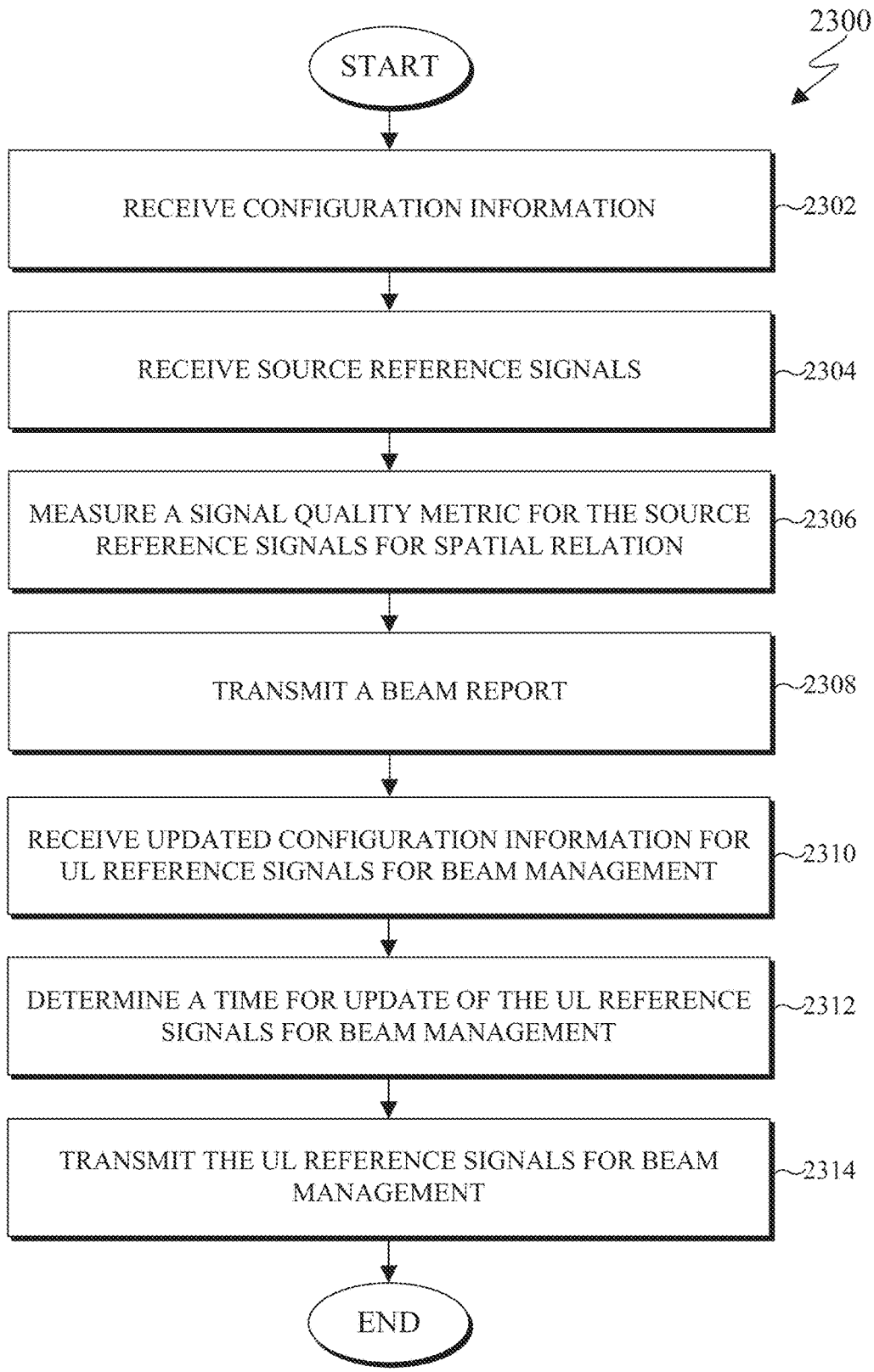
FIG. 23 illustrates an example method for transmission of UL reference signals according to embodiments of the present disclosure.

FIG. 23 illustrates a method 2300 for transmission of UL reference signals according to embodiments of the present disclosure. An embodiment of the method 2300 shown in FIG. 23 is for illustration only. For example, the method 2300 is performed by a UE such as UE 116 in FIG. 1 and a complementary method may be performed by a BS such as BS 102 in FIG. 1. One or more of the components illustrated in FIG. 23 can be implemented in specialized circuitry configured to perform the noted functions or one or more of the components can be implemented by one or more processors executing instructions to perform the noted functions.

The method 2300 begins with the UE receiving configuration information (step 2302). For example, in step 2302, the configuration information can include one or more of configuration information for UL reference signals for beam management, configuration information for source reference signals for spatial relation, and configuration information for a beam report. In various embodiments, the UL reference signal for beam management is a UL DMRS for beam management or one or more SRS resource sets. The UL DMRS for beam management can be time division multiplexed with a PUSCH or a PUCCH. In various embodiments, the source reference can be a type D quasi-colocation (QCL) source reference signal of a TCI state, a source reference signal for UL transmit spatial reference or a measurement reference signal.

The UE then receives the source reference signals (step 2304). For example, in step 2304, the UE can receive the source reference signals according to the configuration information for the source reference signals. Thereafter, the UE measures a signal quality metric for the source reference signals for spatial relation (step 2306) and transmits a beam report (step 2308). For example, in step 2308, the UE generates and transmits the beam report based on the measured signal quality metric. In some embodiments, the beam report includes a preferred spatial domain identifier and is included in an UL transmission for HARQ-ACK feedback of downlink transmissions. In some embodiments, the UE is configured with a beam measurement report request on a plurality of beams, determines a beam of the plurality of beams on which to signal the beam measurement report request, transmits the beam measurement report request on the determined beam, receives an UL grant for a beam measurement report, and transmits the beam measurement report on resources granted by the UL grant. In various embodiments, the beam report is one or more beam reports that includes one or more beam quantities including some combination of a measurement resource ID, a beam metric without regard to a MPE effect, and a beam metric considering the MPE effect. In some embodiments a UE can initiate a transmission of a beam report or a beam measurement report request upon detecting a change in the spatial environment.

The UE then receives updated configuration information for UL reference signals for beam management (step 2310). For example, in step 2310, the updated configuration information is in response to the transmitted beam report. In various embodiments, the updated configuration information for the UL reference signals for beam management includes an indication of a set of the UL reference signals for beam management to be transmitted by the UE and an indication of a source reference signal for spatial relation for each of the one or more groups of UL reference signals for beam management. Here, the set of UL reference signals for beam management can be organized into one or more groups of UL reference signals for beam management where one or more UL reference signals in the set with a same source reference signal for spatial relation constitute a group of UL reference signals in the one or more groups.

Thereafter, the UE determines a time for update of the UL reference signals for beam management (step 2312). For example, in step 2312, the UE may determine the time based on the configuration information. The UE then transmits the UL reference signals for beam management (step 2314). For example, in step 2314, the transmission is based on the updated configuration information and is transmitted at the determined time. In some embodiments, the UE can determine an UL spatial domain filter for an uplink transmission based on a transmission configuration indication (TCI) state indicated to the UE and an UL reference signal resource indicator for an UL reference signal within the group of UL reference signals for beam management. Here, the TCI state indicates a source reference signal for spatial relation and the source reference signal for spatial relation indicates a group of UL reference signals for beam management having a same source reference signal for spatial relation.

Although FIG. 23 illustrates example methods, various changes may be made to FIG. 23. For example, while the method 2300 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to receive:
      configuration information for: (i) uplink (UL) reference signals for beam management, (ii) source reference signals for spatial relation, and (iii) a beam report, and
      the source reference signals; and
   a processor operably connected to the transceiver, the processor configured to measure a signal quality metric for the source reference signals,
   wherein the transceiver is further configured to:
      transmit the beam report based on the measured signal quality metric, and
      receive, in response to the beam report, updated configuration information for the UL reference signals for beam management,
   wherein the processor is further configured to:
      determine a time for update of the UL reference signals for beam management, and
      determine an UL spatial domain filter for an UL transmission based on:
         (i) a transmission configuration indication (TCI) state indicated to the UE, and
         (ii) an UL reference signal resource indicator for an UL reference signal within a group of UL reference signals for beam management,
   wherein the TCI state indicates a source reference signal from the source reference signals,
   wherein the source reference signal indicates the group of UL reference signals for beam management having a same source reference signal for spatial relation, and
   wherein the transceiver is further configured to transmit the UL reference signals for beam management based on the updated configuration information using the UL spatial domain filter at the determined time.

2. The UE of claim 1, wherein the updated configuration information for the UL reference signals for beam management includes:
an indication of a set of the UL reference signals for beam management to be transmitted by the UE, wherein the set of UL reference signals for beam management are organized into one or more groups of UL reference signals for beam management and wherein one or more UL reference signals in the set with a same source reference signal for spatial relation constitute a group of UL reference signals in the one or more groups, and
an indication of a source reference signal for spatial relation for each of the one or more groups of UL reference signals for beam management.

3. The UE of claim 1, wherein the UL reference signal for beam management is at least one of:
a UL demodulation reference signal (DMRS) for beam management, wherein the UL DMRS for beam management is time division multiplexed with a physical uplink shared channel (PUSCH) or a physical uplink control channel (PUCCH), and
one or more sounding reference signal (SRS) resource sets.

4. The UE of claim 1, wherein the beam report includes a preferred spatial domain identifier and is included in an UL transmission for hybrid automatic repeat request-acknowledgement (HARQ-ACK) feedback of downlink transmissions.

5. The UE of claim 1, wherein:
the UE is configured with a beam measurement report request on a plurality of beams,
the processor is further configured to determine a beam of the plurality of beams on which to signal the beam measurement report request, and
the transceiver is further configured to:
transmit the beam measurement report request on the determined beam,
receive an UL grant for a beam measurement report, and
transmit the beam measurement report on resources granted by the UL grant.

6. The UE of claim 1, wherein the beam report includes one or more of:
a report including a beam quantity, wherein the beam quantity includes a measurement resource identifier (ID), a beam metric without regard to a maximum permissible exposure (MPE) effect, and a beam metric considering the MPE effect;
a report including a beam quantity, wherein the beam quantity includes a measurement resource ID and a beam metric without regard to the MPE effect;
a report including a beam quantity, wherein the beam quantity includes a measurement resource ID and a beam metric considering the MPE effect;
a first report and a second report, wherein:
the first report includes a beam quantity, wherein the beam quantity includes a measurement resource ID and a beam metric without regard to the MPE effect, and
the second report includes a beam quantity, wherein the beam quantity includes a measurement resource ID and a beam metric considering the MPE effect; or a first report and a second report, wherein:
the first report includes a beam quantity, wherein the beam quantity includes a measurement resource ID and a beam metric without regard to the MPE effect, and
the second report includes a beam quantity, wherein the beam quantity includes a measurement resource ID, a beam metric without regard to the MPE effect, and a beam metric considering the MPE effect.

7. A base station (BS) comprising:
a transceiver configured to:
transmit configuration information for: (i) uplink (UL) reference signals for beam management, (ii) source reference signals for spatial relation, and (iii) a beam report,
transmit the source reference signals, and
receive the beam report; and
a processor operably connected to the transceiver, the processor configured to:
determine, in response to the beam report, updated configuration information for the UL reference signals for beam management, and
determine a time of update of the UL reference signals for beam management, and
determine an UL spatial domain filter for an UL reception based on:
(i) a transmission configuration indication (TCI) state indicated to a user equipment, and
(ii) an UL reference signal resource indicator for an UL reference signal within a group of UL reference signals for beam management,
wherein the TCI state indicates a source reference signal from the source reference signals,
wherein the source reference signal indicates the group of UL reference signals for beam management having a same source reference signal for spatial relation, and
wherein the transceiver is further configured to:
transmit updated configuration information for the UL reference signals for beam management, and
receive the UL reference signals for beam management based on the updated configuration information using the UL spatial domain filter at the determined time.

8. The BS of claim 7, wherein the updated configuration information for the UL reference signals for beam management includes:
an indication of a set of the UL reference signals for beam management to be transmitted by a user equipment, wherein the set of UL reference signals for beam management are organized into one or more groups of UL reference signals for beam management and wherein one or more UL reference signals in the set with a same source reference signal for spatial relation constitute a group of UL reference signals in the one or more groups, and
an indication of a source reference signal for spatial relation for each of the one or more groups of UL reference signals for beam management.

9. The BS of claim 7, wherein the UL reference signal for beam management is at least one of:
a UL demodulation reference signal (DMRS) for beam management, wherein the UL DMRS for beam management is time division multiplexed with a physical uplink shared channel (PUSCH) or a physical uplink control channel (PUCCH), and
one or more sounding reference signal (SRS) resource sets.

10. The BS of claim 7, wherein the beam report includes a preferred spatial domain identifier and is included in an UL transmission for hybrid automatic repeat request-acknowledgement (HARQ-ACK) feedback of downlink transmissions.

11. The BS of claim 7, wherein the transceiver is further configured to:
transmit configuration information for transmission of a beam measurement report request on a plurality of beams;
receive the beam measurement report request transmitted on a beam of the plurality of beams;
transmit an UL grant for a beam measurement report based on the beam of the received measurement report request; and
receive the beam measurement report on resources granted by the UL grant.

12. The BS of claim 7, wherein the beam report includes one or more of:
a report including a beam quantity, wherein the beam quantity includes a measurement resource identifier (ID), a beam metric without regard to a maximum permissible exposure (MPE) effect, and a beam metric considering the MPE effect;
a report including a beam quantity, wherein the beam quantity includes a measurement resource ID and a beam metric without regard to the MPE effect;
a report including a beam quantity, wherein the beam quantity includes a measurement resource ID and a beam metric considering the MPE effect;
a first report and a second report, wherein:
the first report includes a beam quantity, wherein the beam quantity includes a measurement resource ID and a beam metric without regard to the MPE effect, and
the second report includes a beam quantity, wherein the beam quantity includes a measurement resource ID and a beam metric considering the MPE effect; or
a first report and a second report, wherein:
the first report includes a beam quantity, wherein the beam quantity includes a measurement resource ID and a beam metric without regard to the MPE effect, and
the second report includes a beam quantity, wherein the beam quantity includes a measurement resource ID, a beam metric without regard to the MPE effect, and a beam metric considering the MPE effect.

13. A method of operating a user equipment (UE), the method comprising:
receiving configuration information for: (i) uplink (UL) reference signals for beam management, (ii) source reference signals for spatial relation, and (iii) a beam report;
receiving the source reference signals;
measuring a signal quality metric for the source reference signals;
transmitting a beam report based on measured signal quality metric;
receiving, in response to the beam report, updated configuration information for the UL reference signals for beam management;
determining a time for update of the UL reference signals for beam management;
determining an UL spatial domain filter for an uplink transmission based on:
(i) a transmission configuration indication (TCI) state indicated to the UE, and
(ii) an UL reference signal resource indicator for an UL reference signal within a group of UL reference signals for beam management,
wherein the TCI state indicates a source reference signal from the source reference signals, and
wherein the source reference signal indicates the group of UL reference signals for beam management having a same source reference signal for spatial relation; and
transmitting the UL reference signals for beam management based on the updated configuration information using the UL spatial domain filter at the determined time.

14. The method of claim 13, wherein:
the updated configuration information for the UL reference signals for beam management includes:
an indication of a set of the UL reference signals for beam management to be transmitted by the UE, wherein, the set of UL reference signals for beam management are organized into one or more groups of UL reference signals for beam management and wherein one or more UL reference signals in the set with a same source reference signal for spatial relation constitute a group of UL reference signals in the one or more groups, and
an indication of a source reference signal for spatial relation for each of the one or more groups of UL reference signals for beam management, and
the UL reference signal for beam management is at least one of:
a UL demodulation reference signal (DMRS) for beam management, wherein the UL DMRS for beam management is time division multiplexed with a physical uplink shared channel (PUSCH) or a physical uplink control channel (PUCCH), and
one or more sounding reference signal (SRS) resource sets.

15. The method of claim 13, wherein the beam report includes a preferred spatial domain identifier and is included in an UL transmission for hybrid automatic repeat request-acknowledgement (HARQ-ACK) feedback of downlink transmissions.

16. The method of claim 13, further comprising:
receiving configuration information for a beam measurement report request on a plurality of beams;
determining a beam of the plurality of beams on which to signal the beam measurement report request;
transmitting the beam measurement report request on the determined beam;
receiving an UL grant for a beam measurement report; and
transmitting the beam measurement report on resources granted by the UL grant.

17. The method of claim 13, wherein the beam report includes one or more of:
a report including a beam quantity, wherein the beam quantity includes a measurement resource identifier (ID), a beam metric without regard to a maximum permissible exposure (MPE) effect, and a beam metric considering the MPE effect;
a report including a beam quantity, wherein the beam quantity includes a measurement resource ID and a beam metric without regard to the MPE effect;
a report including a beam quantity, wherein the beam quantity includes a measurement resource ID and a beam metric considering the MPE effect;

a first report and a second report, wherein:
  the first report includes a beam quantity, wherein the beam quantity includes a measurement resource ID and a beam metric without regard to the MPE effect, and
  the second report includes a beam quantity, wherein the beam quantity includes a measurement resource ID and a beam metric considering the MPE effect; or
a first report and a second report, wherein:
  the first report includes a beam quantity, wherein the beam quantity includes a measurement resource ID and a beam metric without regard to the MPE effect, and
  the second report includes a beam quantity, wherein the beam quantity includes a measurement resource ID, a beam metric without regard to the MPE effect, and a beam metric considering the MPE effect.

* * * * *